(12) United States Patent
Sharma et al.

(10) Patent No.: US 10,938,711 B2
(45) Date of Patent: Mar. 2, 2021

(54) COMMUNICATIONS METHODS, APPARATUS AND SYSTEMS FOR PROVIDING SCALABLE MEDIA SERVICES IN SDN SYSTEMS

(71) Applicant: Ribbon Communications Operating Company, Inc., Westford, MA (US)

(72) Inventors: Ashish Sharma, Bangalore (IN); Justin Hart, Purton (GB); Kevin Riley, Amesbury, MA (US)

(73) Assignee: Ribbon Communications Operating Company, Inc., Westford, MA (US)

(*) Notice: Subject to any disclaimer, the term of this patent is extended or adjusted under 35 U.S.C. 154(b) by 0 days.

(21) Appl. No.: 16/814,847

(22) Filed: Mar. 10, 2020

(65) Prior Publication Data

US 2020/0213221 A1 Jul. 2, 2020

Related U.S. Application Data

(63) Continuation of application No. 15/882,571, filed on Jan. 29, 2018, now Pat. No. 10,587,502, which is a (Continued)

(30) Foreign Application Priority Data

May 22, 2017 (IN) .............................. 201741017878
May 22, 2017 (IN) .............................. 201741017879

(51) Int. Cl.
*H04L 12/24* (2006.01)
*H04L 12/721* (2013.01)
(Continued)

(52) U.S. Cl.
CPC .......... *H04L 45/38* (2013.01); *H04L 41/0806* (2013.01); *H04L 41/0869* (2013.01); *H04L 41/0893* (2013.01); *H04L 41/12* (2013.01); *H04L 41/5054* (2013.01); *H04L 43/026* (2013.01); *H04L 43/0894* (2013.01); *H04L 45/50* (2013.01); *H04L 65/1006* (2013.01); *H04L 65/1069* (2013.01); *H04L 65/601* (2013.01); *H04L 45/30* (2013.01); *H04L 45/42* (2013.01); *H04L 45/64* (2013.01)

(58) Field of Classification Search
None
See application file for complete search history.

(56) References Cited

U.S. PATENT DOCUMENTS

2018/0337849 A1* 11/2018 Sharma ................... H04L 45/38

\* cited by examiner

*Primary Examiner* — Ayanah S George
(74) *Attorney, Agent, or Firm* — Straub & Straub; Stephen T. Straub; Michael P. Straub

(57) ABSTRACT

The present invention relates to communications methods, apparatus and systems for providing media micro flow services in a scalable manner using SDN principles. In an exemplary method embodiment a session border controller in a SDN network is operated to receive first signaling information for establishing a first media session, the first media session including a first media packet flow that passes through a first programmable switch of the SDN network; generate instructions to implement a media micro flow service on the first programmable switch through which the first media packet flow passes; and send the instructions to a SDN controller which controls the first programmable switch.

20 Claims, 28 Drawing Sheets

Related U.S. Application Data continuation-in-part of application No. 15/821,475, filed on Nov. 22, 2017, now Pat. No. 10,397,316, and a continuation-in-part of application No. 15/803,435, filed on Nov. 3, 2017.

(60) Provisional application No. 62/507,171, filed on May 16, 2017.

(51) Int. Cl.
*H04L 29/06* (2006.01)
*H04L 12/723* (2013.01)
*H04L 12/26* (2006.01)
*H04L 12/715* (2013.01)
*H04L 12/717* (2013.01)
*H04L 12/725* (2013.01)

TYPE-2 MEDIA FLOW

TYPE-3 MEDIA FLOW

| 1402 | 1404 | 1406 | 1408 | 1410 | 1412 | 1414 | 1416 | 1420 | 1422 |
|---|---|---|---|---|---|---|---|---|---|
| ID | PRIORITY | SRC IP/PREFIX | SRC PORT | DST IP/PREFIX | DST PORT | SRC MAC ADDRESS | DST MAC ADDRESS | ACTION | OUTPUT PORT |
| TAG04 | 1 | IP_E/32 | Port_E | SBC_IP_J/32 | SBC_Port_J | MAC_E | SBC_MAC_J | SRC IP ← SBC_IP_G ADDRESS<br>SRC PORT ← SBC_PORT_G1<br>SRC MAC ← SBC_MAC_G ADDRESS<br>DST IP ← MID_IP_H ADDRESS<br>DST PORT ← MID_PORT_H1<br>DST MAC ← MID_MAC_H ADDRESS | TO MID |
| TAG05 | 1 | MID_IP_H/32 | MID_PORT_H2 | SBC_IP_G/32 | SBC_Port_G2 | MID_MAC_H | SBC_MAC_G | SRC IP ← SBC_IP_K ADDRESS<br>SRC PORT ← SBC_PORT_K<br>SRC MAC ← SBC_MAC_K ADDRESS<br>DST IP ← IP_F ADDRESS<br>DST PORT ← Port_F<br>DST MAC ← MAC_F ADDRESS | To external network |

FIGURE 14

| FIGURE 20A |
| FIGURE 20B |
| FIGURE 20C |
| FIGURE 20D |
| FIGURE 20E |
| FIGURE 20F |

CONTINUATION OF
GENERATE, BY THE SBC, INSTRUCTIONS TO IMPLEMENT A MEDIA MICRO FLOW SERVICE ON THE FIRST PROGRAMMABLE SWITCH OF THE SOFTWARE DEFINED NETWORK
STEP 2026

WHEN THE SBC DETERMINES THAT THE FIRST MEDIA PACKET FLOW TO BE ESTABLISHED IS A TYPE-2 MEDIA PACKET FLOW, GENERATING, BY THE SBC, INSTRUCTIONS TO IMPLEMENT A MEDIA RELAY SERVICE AS PART OF THE MEDIA MICRO FLOW SERVICE

GENERATING INSTRUCTIONS THAT INCLUDE INFORMATION BY WHICH THE FIRST PROGRAMMABLE SWITCH CAN IDENTIFY PACKETS OF THE FIRST MEDIA PACKET FLOW AND AN ACTION/COMMAND THAT THE FIRST PROGRAMMABLE SWITCH IS TO:

(A) REWRITE THE SOURCE PORT NUMBER, SOURCE IP ADDRESS AND SOURCE MAC ADDRESS OF ANY MEDIA PACKETS RECEIVED BY THE FIRST PROGRAMMABLE SWITCH AND IDENTIFIED BY THE FIRST PROGRAMMABLE SWITCH AS BEING PART OF THE FIRST MEDIA PACKET FLOW TO BE A SOURCE PORT NUMBER, SOURCE IP ADDRESS, AND SOURCE MAC ADDRESS ALLOCATED AND/OR ASSIGNED TO THE SBC; AND (B) REWRITE THE DESTINATION PORT NUMBER, DESTINATION IP ADDRESS, AND DESTINATION MAC ADDRESS OF ANY MEDIA PACKETS RECEIVED BY THE FIRST PROGRAMMABLE SWITCH AND IDENTIFIED BY THE FIRST PROGRAMMABLE SWITCH AS BEING PART OF THE FIRST MEDIA PACKET FLOW TO BE A DESTINATION PORT NUMBER, DESTINATION IP ADDRESS, AND DESTINATION MAC ADDRESS ALLOCATED AND/OR ASSIGNED TO THE FLOW DESTINATION DEVICE

WHEN THE SBC DETERMINES THAT THE FIRST MEDIA PACKET FLOW TO BE ESTABLISHED IS A TYPE-3 MEDIA PACKET FLOW, GENERATING, BY THE SBC, INSTRUCTIONS TO IMPLEMENT A MEDIA INTERWORKING SERVICE AS PART OF THE MEDIA MICRO FLOW SERVICE

GENERATING INSTRUCTIONS THAT INCLUDE INFORMATION BY WHICH THE FIRST PROGRAMMABLE SWITCH CAN IDENTIFY PACKETS OF THE FIRST MEDIA PACKET FLOW AND AN ACTION/COMMAND THAT THE FIRST PROGRAMMABLE SWITCH IS TO:

(A) REWRITE A SOURCE PORT NUMBER, A SOURCE IP ADDRESS AND A SOURCE MAC ADDRESS OF ANY MEDIA PACKETS RECEIVED BY THE FIRST PROGRAMMABLE SWITCH AND IDENTIFIED BY THE FIRST PROGRAMMABLE SWITCH AS BEING PART OF THE FIRST MEDIA PACKET FLOW TO BE A SOURCE PORT NUMBER, SOURCE IP ADDRESS, AND SOURCE MAC ADDRESS ALLOCATED AND/ OR ASSIGNED TO THE SBC; AND (B) REWRITE A DESTINATION PORT NUMBER, A DESTINATION IP ADDRESS, AND A DESTINATION MAC ADDRESS OF ANY MEDIA PACKETS RECEIVED BY THE FIRST PROGRAMMABLE SWITCH AND IDENTIFIED BY THE FIRST PROGRAMMABLE SWITCH AS BEING PART OF THE FIRST MEDIA PACKET FLOW TO BE A DESTINATION PORT NUMBER, DESTINATION IP ADDRESS, AND DESTINATION MAC ADDRESS ALLOCATED AND/OR ASSIGNED TO A MEDIA INTERWORKING DEVICE, E.G. T-SBC OR TRANSCODER, TO REDIRECT RECEIVED PACKETS OF THE FIRST MEDIA PACKET FLOW TO THE MEDIA INTERWORKING DEVICE

FIGURE 20D

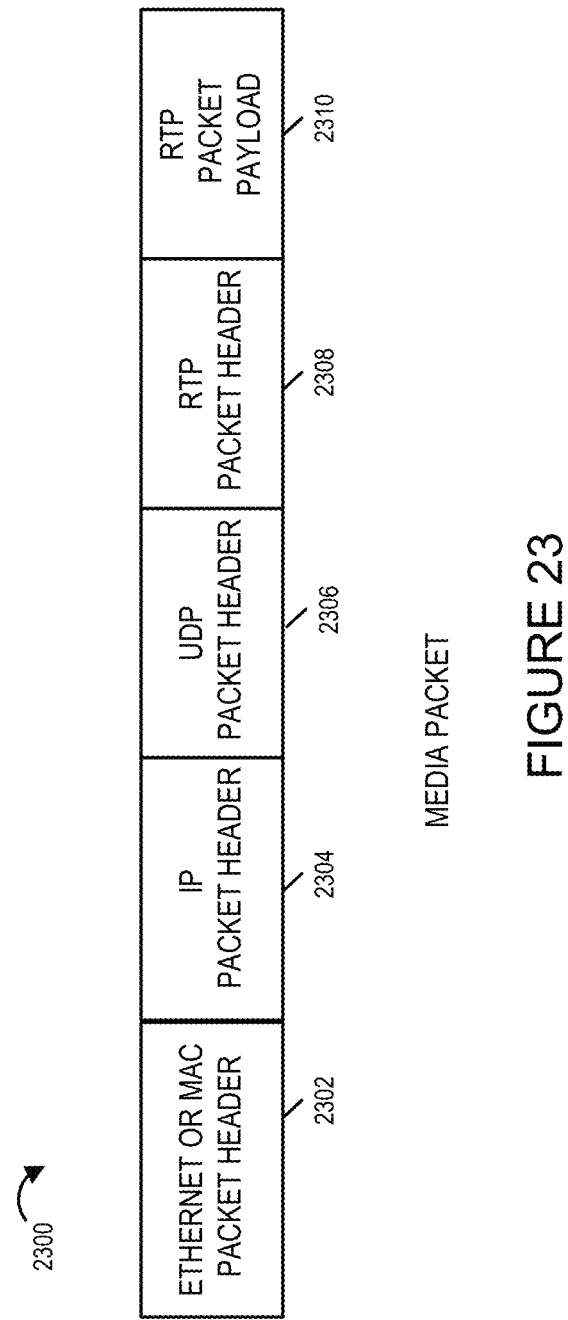

COMMUNICATIONS METHODS, APPARATUS AND SYSTEMS FOR PROVIDING SCALABLE MEDIA SERVICES IN SDN SYSTEMS

RELATED APPLICATION

The present application is a continuation of U.S. patent application Ser. No. 15/882,571 filed on Jan. 29, 2018 and published as U.S. Patent Application Publication No. US 2018-0337849 A1 on Nov. 22, 2018 which is a continuation in part of U.S. patent application Ser. No. 15/803,435 filed on Nov. 3, 2017 which published as U.S. Patent Application Publication No. US 2018-0337862 A1 on Nov. 22, 2018 and is a continuation in part of U.S. patent application Ser. No. 15/821,475 filed on Nov. 22, 2017 and issued as U.S. Pat. No. 10,397,316 on Aug. 27, 2019 and claims the benefit of U.S. Provisional Patent Application Ser. No. 62/507,171 filed on May 16, 2017 and claims the benefit of Indian Provisional Patent Applications Serial Numbers: 201741017878 and 201741017879 both of which were filed on May 22, 2017. All of the aforementioned applications are hereby expressly incorporated by reference in their entirety.

FIELD OF INVENTION

The present invention relates to communications methods, systems and apparatus for identifying and processing real time multimedia flows in a scalable manner in Software Defined Networks (SDNs).

BACKGROUND

Software Defined Networking defines an architectural approach to building networks, primarily focusing on the separation of controller and data plane to allow more flexibility in how the controller plane is built and what it exposes to applications. The specific way to achieve this separation, the protocols and technologies used are all implementation and vendor specific at this time. Despite this variation in approach, the common theme remains, that of re-engineering how network switches are controlled and opening more power to applications to affect this control. As more networks adopt SDN concepts, it opens up opportunities to re-imagine how an application such as an Session Border Controller (SBC) functions in an SDN environment.

The traditional model for an SBC is an integrated unit consisting of control and data plane. The control plane handles call signaling (Session Initiation Protocol), and specifies how the Internet Protocol (IP) packets for media pass through its data plane. And by virtue of this interaction the SBC is able to police, control, modify and otherwise impact the packets that are specifically routed through it.

Although this traditional approach has performed as required for many years, it has limitations and could be far more effective if the SBC were able to influence Internet Protocol flows at other points in the network and not just as the packets hit the SBC's media plane. For example, it is typically desirable to block "bad" flows/packets, e.g., denial of service attack flow/packets as early as possible by moving the decision to forward or drop as close to the source as possible. Likewise an SBC is often expected to guarantee bandwidth for certain classes of traffic and indeed prioritize how to allocate contended bandwidth among flows based on one or more policies or rules. There is a limit to the SBC's effectiveness to do this task, when it is only able to perform this function at the point where the packets cross its data plane. The SBC has no visibility or influence on how bandwidth is utilized at other points in the network.

A conventional integrated or distributed SBC provides media services that include, among other things, Denial of Service (DOS)/Distributed Denial of Service (DDOS) protection, bandwidth policing, topology hiding, IPv4/IPv6 interworking, VLAN (Virtual Local Area Network) tagging, DSCP (Differentiated Services Code Point) marking, Network Address and Port Translation (NAPT), Far end Network Address and Port Translation Learning, and RTP/RTCP (Real-time Transport Protocol) Inactivity detection. These services need to be provided independent of whether the flow is relayed or requires media interworking. However, in conventional approach the SBC is only able to effectuate these functions by taking action when it receives the media packets of a media packet flow for a media stream that is when the packet flow hits the SBC's data plane. This results in congestion and bottlenecks at the SBC and requires that for the SBC to able to scale up as the number of sessions increases the SBC must be able to scale both its session establishment and control processing capabilities (SIP capabilities) as well as it media resources capabilities. As the SBC is limited in the number of media sessions it can service by the amount of media resources/bandwidth it has available. If it only has media resources for N call sessions, e.g., Voice Over Internet Protocol sessions, it can only handle the control signaling for establishing N call sessions.

From the aforementioned reasons, it is apparent that there is a need for new and or improved systems and/or SBCs that are more efficient and effective which can provide and/or effectuate media services and impact packets/flows closer to their sources. There is also a need for systems that can provide media services in a scalable manner wherein providing media services is independent of dedicated media resources in an SBC controlling the signaling for the media session. There is a further need for new and improved methods, apparatus and systems that allow for SBCs to provide media services without anchoring the media sessions or flows at the SBC even though the SBC is anchoring the control signaling for the session.

SUMMARY

The present invention is directed to various features relating to communications methods, systems and apparatus. One or more embodiments of the present invention addresses one or more of the various technical problems described above and herein and improves upon the efficiency and scalability of systems and/or SBCs.

Various embodiments of the present invention have one or more of the following advantages over conventional systems: (1) SBC flows are realized from a network wide perspective using the underlying SDN aware network; (2) enables a highly scalable and resilient model that is not otherwise realizable with a conventional SBC integrated or distributed SBC model; (3) reduces backhaul costs and additional hardware resources for media termination since media relay network elements are no longer required; and (4) provides end-to-end Service Level Agreement (SLA) control.

One exemplary embodiment of the invention includes a method of operating a session border controller in a software defined network, the method comprising the steps of: receiving, by the session border controller, first signaling information for establishing a first media session, said first media session including a first media packet flow that passes through a first network programmable switch of the software defined network; generating, by the session border controller, instructions to implement a media micro flow service on the first programmable switch of the software defined network through which the first media packet flow passes; sending, from the session border controller, said instructions to a software defined network (SDN) controller which controls said first network programmable switch. In some embodiments, the first media packet flow is a Real-time Transport Protocol (RTP) packet flow. In some embodiments, the first media packet flow is a Real-time Transport Control Protocol (RTCP) packet flow. In some embodiments, the first programmable switch is one of the following: an OpenFlow programmable switch, an OVSDB programmable switch, a NETCONF switch, a Cisco ASIC programmable switch or an OPFlex programmable switch.

In some embodiments, the method further includes determining, by the session border controller, what type of media packet flow is to be established based on the received first signaling information prior to generating said instructions to implement the first media micro flow service on the first programmable switch of the software defined network through which the packets of the first media packet flow passes. The type of media packet flow, in some embodiments, is one of the following: (i) a type-1 media packet flow, (ii) a type-2 media packet flow, or (iii) a type-3 media packet flow, said type-1 media packet flow being a media packet flow with either data link layer connectivity or network layer connectivity between a flow origination device and a flow destination device, said type-2 media packet flow being a media packet flow that requires a media relay service to provide network layer connectivity between said flow origination device and said flow destination device, and said type-3 media packet flow being a media packet flow that requires a media interworking service to provide network layer connectivity and perform media interworking between said flow origination device and said flow destination device.

The received signaling information upon which the session border controller determines what type of media packet flow is to be established may, and in some embodiments does, include signaling information contained in an SDP offer message received by the SBC from the flow origination device and an SDP answer message received by the SBC from the flow destination device, the first media packet flow originating at the flow origination device and terminating at the flow destination device. In some of those embodiments the signaling information in the SDP offer and answer messages used in determining the type of flow includes: (i) a source transport number, (ii) a source IP address, (iii) a destination transport number, (iv) a destination IP address, and (v) a protocol type to be used for sending media packets of the first media packet flow from the flow origination device to the flow destination device. The term transport number is sometimes referred to herein as port number or port. The signaling information in the SDP offer and the SDP answer messages used in determining the type of flow may and typically does also include the codecs negotiated to be used by the flow origination device and the flow destination device for the first media packet flow.

In another method embodiment, the method further comprises the steps of: accessing, by the SBC, network topology information about connectivity between the flow origination device and the flow destination device; and wherein the session border controller in determining what type of media packet flow is to be established bases the determination at least in part on the accessed network topology information.

The method may, and in some embodiments does, include that when said session border controller determines that the first media packet flow to be established is a type-1 media packet flow with data link layer connectivity between said flow origination device and said flow destination device, the step of generating instructions to implement said media micro flow service includes generating instructions to implement a media bypass service as part of the media micro flow service. The media bypass service being a service that does not re-write any of: (i) a source transport number, (ii) a source Internet Protocol (IP) address, (iii) a source Media Access Control (MAC) address, (iv) a destination transport number, (v) a destination Internet Protocol (IP) address, or (vi) a destination Media Access Control (MAC) address of any media packets received by the first programmable switch and identified by the first programmable switch as being part of said first media packet flow.

When said session border controller determines that the first media packet flow to be established is a type-1 media packet flow with network layer connectivity between said flow origination device and said flow destination device, the step of the method of generating instructions to implement the media micro flow service in some embodiments, includes generating instructions to implement a media bypass service as part of the media micro flow service. The media bypass service being a service that re-writes a source MAC address and a destination MAC address of media packets received by the first programmable switch and identified by the first programmable switch as being part of said first media packet flow.

In some embodiments, when the session border controller determines that the first media packet flow to be established is a type-2 media packet flow, the SBC generates instructions to implement a media relay service as part of the media micro flow service. The media relay service being a service that provides Network Address and Port Number Translation services. The media relay service in some embodiments is a service that re-writes a source transport number, a source IP address, a source MAC address, a destination transport number, a destination IP address and a destination MAC address of media packets received by the first programmable switch and identified by the first programmable switch as being part of said first media packet flow.

In some embodiments, when said session border controller determines that the first media packet flow to be established is a type-3 media packet flow, the step of generating said instructions to implement said media micro flow service includes generating instructions to implement a media interworking service as part of the media micro flow service. The media interworking service in some such embodiments is a service that re-writes a source transport number, a source IP address, a source MAC address, a destination transport number, a destination IP address and a destination MAC address of media packets received by the first programmable switch and identified by the first programmable switch as being part of said first media packet flow to redirect the received media packets of the first media packet flow to a media interworking device.

In some method embodiments, the first media packet flow is a Real-time Transport Protocol (RTP) packet flow; and the step of generating, by the session border controller, instructions to implement the media micro flow service includes generating instructions to implement one or more of the following actions: (i) bandwidth policing of packets received by the first programmable switch and identified as belonging to the first media packet flow, (ii) detection of RTP packet flow inactivity of the first media packet flow by the first programmable switch; (iii) rogue media detection of packets received by the first programmable switch having an SBC media interface address and UDP port range but for which no media flow exists, (iv) forking of received packets identified as belonging to the first media packet flow to a recordation device by the first programmable switch, and (v) performing DSCP marking or pass-through for received packets identified as belonging to the first media packet flow.

Another method embodiment in accordance with the present invention is a communications method including the steps of: (i) operating a session border controller (SBC) in a software defined network to receive first signaling information for establishing a first media session, said first media session including a first media packet flow that passes through a first network programmable switch of the software defined network; operating the SBC to generate instructions to implement a media micro flow service on the first programmable switch of the software defined network through which the first media packet flow passes; (ii) operating the SBC to send said instructions to a software defined network (SDN) controller which controls said first network programmable switch; (iii) operating the SDN controller to receive the instructions for the media micro flow service from the SBC; (iv) operating the SDN controller to identify one or more SDN programmable switches on which to install the instructions for the media micro flow service; and (v) operating the SDN controller to install the instructions for the media micro flow service on one or more of the identified SDN programmable switches.

In some embodiments, the method further includes the steps of operating the SDN controller to determine whether the identified SDN switches have the capacity to implement the media micro flow service; and when the SDN controller determines that the identified SDN switches do not have the capacity to implement the media micro flow services dynamically reconfiguring the SDN network.

In another embodiment of the method, the method includes the additional step of installing a session border controller (SBC) into a pre-existing software defined network (SDN) that does not include a SBC prior to operating the SBC to receive first signaling information for establishing a first media session, said first media session including a first media packet flow that passes through a first network programmable switch of the software defined network.

The present invention is applicable to apparatus and system embodiments wherein one or more devices implement the steps of the method embodiments. In some apparatus embodiments the SBC, SDN controller and SDN switches, e.g., Open Flow switches, include one or more processors and a memory. The memory including instructions when executed by the one or more processors control the apparatus to operate to perform the steps of various method embodiments of the invention.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 14 illustrates exemplary instructions in the form of flow table entries for a SDN programmable switch for the type-3 media flow illustrated in FIG. 10.

FIG. 20D illustrates a fourth part of a flowchart of an exemplary method in accordance with an embodiment of the present invention.

FIG. 23 illustrates the structure of an exemplary media packet.

DETAILED DESCRIPTION

SDN (Software Defined Networking) defines an architectural approach to building networks, primarily focusing on the separation of the control and data planes to allow more flexibility in how the control plane is built and what it exposes to applications. As more networks adopt SDN concepts, it opens up opportunities to redefine how an application such as a Session Border Controller (SBC) functions in an SDN environment.

As previously discussed, the traditional model for an SBC is a more or less vertically integrated unit, with a tightly coupled control and data plane of its own. The control plane is call signaling (Session Initiation Protocol) aware, and uses this information to dictate how the Internet Protocol (IP) packets for media pass through its data plane. And by virtue of this interaction the SBC is able to police, control, modify and otherwise impact on the packets that are specifically routed through it.

Be it an integrated SBC model or a distributed SBC model, the SBC is able to police media traffic specifically routed through it. However, the conventional SBC is constrained in that it is limited to providing media services to only those flows/packets which are specifically routed through it as the media packets/flows pass through it.

With the advent of Software Defined Networking, the entire network's forwarding plane (i.e., SDN-enabled switch infrastructure) can be used as one big data plane for the SBC. By using the SBC control plane (acting similar to an application on top of the SDN controller) and programming flow forwarding rules (typically via a controller) in SDN switches (e.g., programmable switches such as Open Flow (OF) enabled switches, the SBC can adjust the flow behavior of packets dynamically across the network. In other words, media forwarding rules can be applied at programmable switches directly as opposed to routing media streams through the SBC or to another media-aware node such as for example a media processing node. While the OpenFlow protocol is the most well-known of the SDN protocol for southbound Application Programming Interfaces (APIs), it is not the only one available. The same or similar approach can be used for non-openflow enabled or vendor specific switches using Network Configuration Protocol (NetConf), HTTP, or OPFlex to communicate with the switches and routers to install and make configuration changes.

Figure 1:
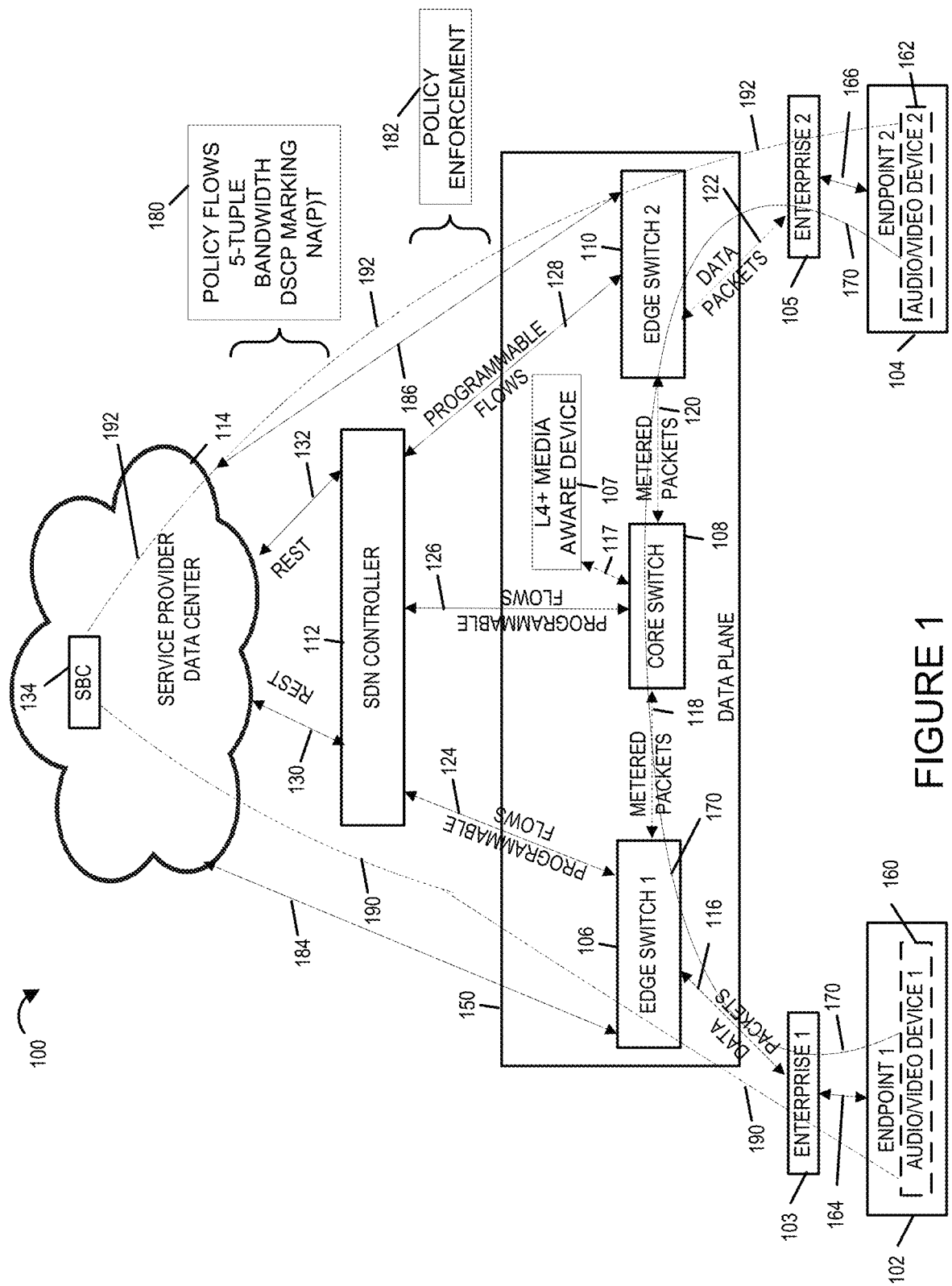
FIG. 1 illustrates an exemplary SDN network system in accordance with an embodiment of the present invention.

FIG. 1 illustrates an exemplary system 100 including IP Endpoint 1 102, Enterprise 1 103, IP Endpoint 2 104, Enterprise 2 105 coupled to a SDN Network including Edge Switch 1 106 (e.g., an OpenFlow Access Switch), Core Switch 108 (e.g., an OpenFlow Core Switch), Edge Switch 2 110 (e.g., an OpenFlow Access Switch), a Layer 4+ Media Aware Device 107, SDN controller 112, cloud service provider data center 114 and communications links 116, 117, 118, 120, 122, 124, 126, 128, 130, 132, 164, 166, 184, and 186. The IP Endpoint device 1 102 optionally includes a multimedia device 1 160 for recording and/or playing audio/video/data. The IP Endpoint device 2 104 optionally includes a multimedia device 2 162 for recording and/or playing audio/video/data such as audio/video/data exchanged during a multimedia session between the IP Endpoint device 1 102 and the IP Endpoint device 2 104. The IP Endpoint device 1 102 is part of or coupled to Enterprise 1 103. The IP Endpoint device 2 104 is part of or coupled to Enterprise 2 105. The cloud service provider data center 114 includes SBC 134 node/device. In some embodiments, the SBC 134, is a hardware device including a processor, memory, hardware input/output interfaces including transmitters and receivers and programming instructions which is executed to operate the SBC 134. In some embodiments, the cloud service provider data center 114 is a cloud computing system/network in which the SBC 134 is an application operating on a compute node in the cloud computing system/network operated by the service provider. Communications link 116 couples/connects Enterprise 103 to edge switch 1 106. Communications link 117 couples/connects the Core Switch 108 to the Level 4+ media aware device 107. Communications link 118 couples/connects IP edge switch 1 106 to core switch 1 108. Communications link 120 couples/connects core switch 108 to end switch 2 110. Communications link 122 couples/connects edge switch 2 to Enterprise 2 105. Communications link 124 couples/connects edge switch 1 to SDN controller 112. Communications link 126 couples/connects core switch 108 to SDN controller 112. Communications link 128 couples/connects edge switch 2 110 to SDN controller 112. Communications links 130 and 132 couples/connects the SDN controller 112 to the cloud service provider data center 114. Communications link 184 couples the edge switch 1 106 to the SBC 134. Communications link 186 couples the edge switch 2 110 to the SBC 134. While exemplary communications links 184 and 186 have been shown it should be understood that the SDN network is a network in which the SBC is coupled to network that connects the various elements, nodes and devices of the network together which includes the L4+ media aware device 107. Communications link 164 couples endpoint device 1 102 to the Enterprise 103. Communications link 166 couples endpoint device 2 104 to Enterprise 105. Enterprise 103 and 105 are enterprise communications systems. Line 170 shows a media flow path between the multimedia device 1 160 and multimedia device 2 162. The media packets of the media flow shown by line 170 pass through Enterprise 103, edge switch 1 106, core switch 108, edge switch 2 110, and Enterprise 2 105 as they are communicated over the communications links 164, 116, 118, 120, 122, 166. The control signaling for the media flow shown by line 170 is terminated at the SBC 134 in the SDN network. Lines 190 and 192 represent control signaling traffic communicated between endpoint device 1 160 and endpoint device 2 162 via edge switch 1 106, SBC 134, edge switch 2 110 and communications links 164, 116, 184, 186, 122, and 166.

Box 180 indicates that the SBC 134 is able to provide instructions to the SDN Controller regarding policy flow instructions, 5-tuple information (source transport number, source Internet Protocol address, destination transport number, destination Internet Protocol address, and Protocol type (e.g., UDP or TCP)), bandwidth, DSCP marking, and Network Address and Port Translation. As box 182 shows the SDN controller dynamically sends policy enforcement instructions to the devices of the SDN network, e.g., SDN programmable switches, to enforce the policies.

The SBC 134 communicates with the SDN Controller 112 in some embodiments using a protocol that is not bounded. In some embodiments, the communication protocol used to communicate between the SDN controller 112 and various devices in the cloud service provider data center is based on extending a representational state transfer Application Programming Interface (REST API) provided by the SDN Controller to the device, e.g., SBCs of the cloud. The SDN controller 112 dynamically programs flows in the SDN system 100.

The signaling plane of the SBC 134 receives the signaling packets and uses this to determine what type of session (or other traffic) they relate to. The SBC 134 decodes the Session Description Protocol (SDP)/Open Logical Channel (OLC) and Terminal Capability Set (TCS) information in Session Initiation Protocol (SIP)/H.323 messages and determines the IP 5-tuple information (source IP address/transport number, destination IP address/transport number and the IP protocol in use) pertaining to a flow (RTP or RTCP). Based on the session state information that the SBC 134 maintains, the SBC 134 determines if the packets should be discarded, rate limited, simply forwarded after providing topology hiding, or routed to some specific agent (such as a transcoding device) for media manipulation. Having determined the appropriate action(s) to take, the SBC 134 then uses the SDN control plan interface to communicate one or more rules that the SBC 134 wants propagated into the network. The SDN controller 112 determines how to apply these rules and depending on the implementation may translate the rules into lower level primitives and install them into the programmable network switches, e.g., SDN OpenFlow switches. In some embodiments, the SBC 134 is a signaling component of the SBC (S-SBC). A S-SBC (also sometimes referred to herein as a signaling SBC) is a service/component that anchors signaling and exposes signal interface(s) to the external peers and chains other SBC service components e.g., T-SBC (sometimes referred to herein as a transcoding SBC) which is a service/component that anchors media only if media transcoding/processing is required.

The SBC 134 in the SDN network is able to provide various media services via the underlying SDN configurable switches (e.g., OpenFlow switches). For example, the SBC 134 provides media services that include, among other things, Denial of Service (DOS)/Distributed Denial of Service (DDOS) protection, rate limiting/policing (e.g., allowing RTP packets to pass through only from established session and perform bandwidth policing based on the codec negotiated), topology hiding (e.g., based on the Session Description Protocol messages exchanged in the Session Initiation Protocol signaling, the SBC 134 (e.g., S-SBC) (via SDN controller 112) can instruct the SDN programmable switches (e.g., OpenFlow switches) to rewrite IP address(es) as it forwards the RTP/RTCP packets from the untrusted side to the trusted side (and vice versa)); V4-V6 Interworking, VLAN Tagging, Differentiated Services Code Point (DSCP) marking; Far end NA(P)T (Network Address (and Port) Translation) Learning; and Real-time Transport Protocol (RTP) Inactivity detection. These services need to be provided independent of whether the flow is relayed or requires media processing. IN the SDN network where these media services are realized by rules or instructions programmed into the SDN programmable switches (e.g., OpenFlow switches), the system reduces back haul costs and the need for dedicated media boxes for providing media relay services. Offloading relay aspects to a switch provides a huge cost-advantage for the operator of the system.

In an exemplary method embodiment of the present invention, the method distributes SBC media relay flows by using SDN principles instead of anchoring the media flows on a media aware box. This is achieved by a session aware application identifying the type of media flow to be established at the time of establishment and dynamically creating the flow using programmable switches, e.g., SDN switches, that can be accessed and programmed via a SDN controller using OpenFlow protocol, Open vSwitch Database Management Protocol (OVSDB), Network Configuration Protocol (NETCONF), Cisco Application Specific Integrated Circuit (ASIC) Switch protocol or OPFlex protocol. Various embodiments of the present invention have one or more of the following advantages over conventional systems:

1.) SBC flows are realized from a network wide perspective using the underlying SDN aware network;
2.) Enables a highly scalable and resilient model that is not otherwise realizable with a conventional SBC integrated or distributed SBC model;
3.) Reduces backhaul costs and additional hardware resources for media termination since media relay network elements are no longer required; and
4.) Provides end-to-end Service Level Agreement (SLA) control.

By using SDN principles the media service plane provided by a real time multimedia application provider, e.g., an SBC, becomes a programmable Internet Protocoal transport function. This is in contrast to the classic decomposition approach used in the gateway control architecture used with the Gateway Control Protocol (Megaco, H.248) where the gateway is bounded to a controller.

The Open System Interface 7 layer model will now be discussed and the protocol data unit and general function corresponding to the layer will be introduced. The Open System Interface (OSI) model as mentioned includes seven layers sometimes referred to as levels. The seven layers of the OSI model are layer 1 physical layer, layer 2 data link layer, layer 3 network layer, layer 4 transport layer, layer 5 session layer, layer 6 presentation layer, and layer 7 application layer.

The protocol data unit of the OSI layer 1, physical layer, is a bit. The OSI layer 1 function is the transmission and reception of raw bit streams over a physical medium.

The protocol data unit of the OSI layer 2, data link layer, is the frame. The OSI layer 2 function is the reliable transmission of data frames between two nodes connected by the physical layer.

The protocol data unit of the OSI layer 3, network layer, is the packet. The OSI layer 3 function is the structuring and managing a multi-node network, including addressing, routing and traffic control.

The protocol data unit of the OSI layer 4, transport layer, is the segment for Transmission Control Protocol (TCP) and datagram for User Datagram Protocol (UDP). The OSI layer 4 function is the reliable transmission of data segments between points on a network including segmentation, acknowledgement and multiplexing.

The protocol data unit of the OSI layer 5, session layer, is sometimes just referred to as data. The OSI layer 5 function is managing communication sessions which include for example the continuous exchange of information in the form of multiple back-and-forth transmissions between two nodes.

The protocol data unit of the OSI layer 6, presentation layer, is sometimes just referred to as data. The OSI layer 6 function is translation of data between a networking service and an application which includes character encoding, data compression and encryption/decryption.

The protocol data unit of the OSI layer 7, application layer, similar to the OSI layers 5 and 6 is just referred to as data. The OSI layer 7 function is high-level application programming interfaces (APIs) including resource sharing and remote file access.

SBC media flows, may be, and in one embodiment of the invention are grouped into three basic categories:

1) Type-1—Flows that require media bypass or basic switching (i.e., direct media). They can be serviced by a layer 2 (L2) switch. An L2 layer switch being a switch that operates at the OSI layer 2 data link layer and can modify the contents of that layer.
2) Type-2—Flows that require media relay. They can be serviced by a Level 3 (L3)/Level 4 (L4) switch. L3 and L4 switches are switches that work at the OSI layer 3 network layer and layer 4 transport layer respectively and can modify the contents of the protocol data unit at their respective layers.
3) Type-3—Flows that require media interworking. They are serviced by a L4+ media aware network element. An L4+ media aware network element is a device that operates at the OSI layers 4, 5, 6, or 7. It operates at the transport layer and above and can modify the contents at its respective layer. An example of a media interworking network element is a transcoder.

In the exemplary embodiment of the invention the SBC during media session establishment, e.g., establishment of a Voice Over Internet Protocol call, determines on a per call/media session basis what type of flow is being established (type-1, type-2 or type-3) and then realizes the media relay services to be provided for the flow or redirects the flow to a media aware device, e.g., a media interworking network element such as a transcoder, for media processing. The SBC realizes the media relay service functionality and/or redirection functionality by programming the underlying SDN network to provide the media relay services or redirection service. This is accomplished by the SBC, typically via instructions sent to the SDN controller of the network, installing programming instructions to create a micro flow on programmable switches of the SDN network, e.g., SDN switches such as OpenFlow switches. In this way, the SBC realizes the upstream and downstream flow related policies using the SDN networks capabilities.

Figure 2:
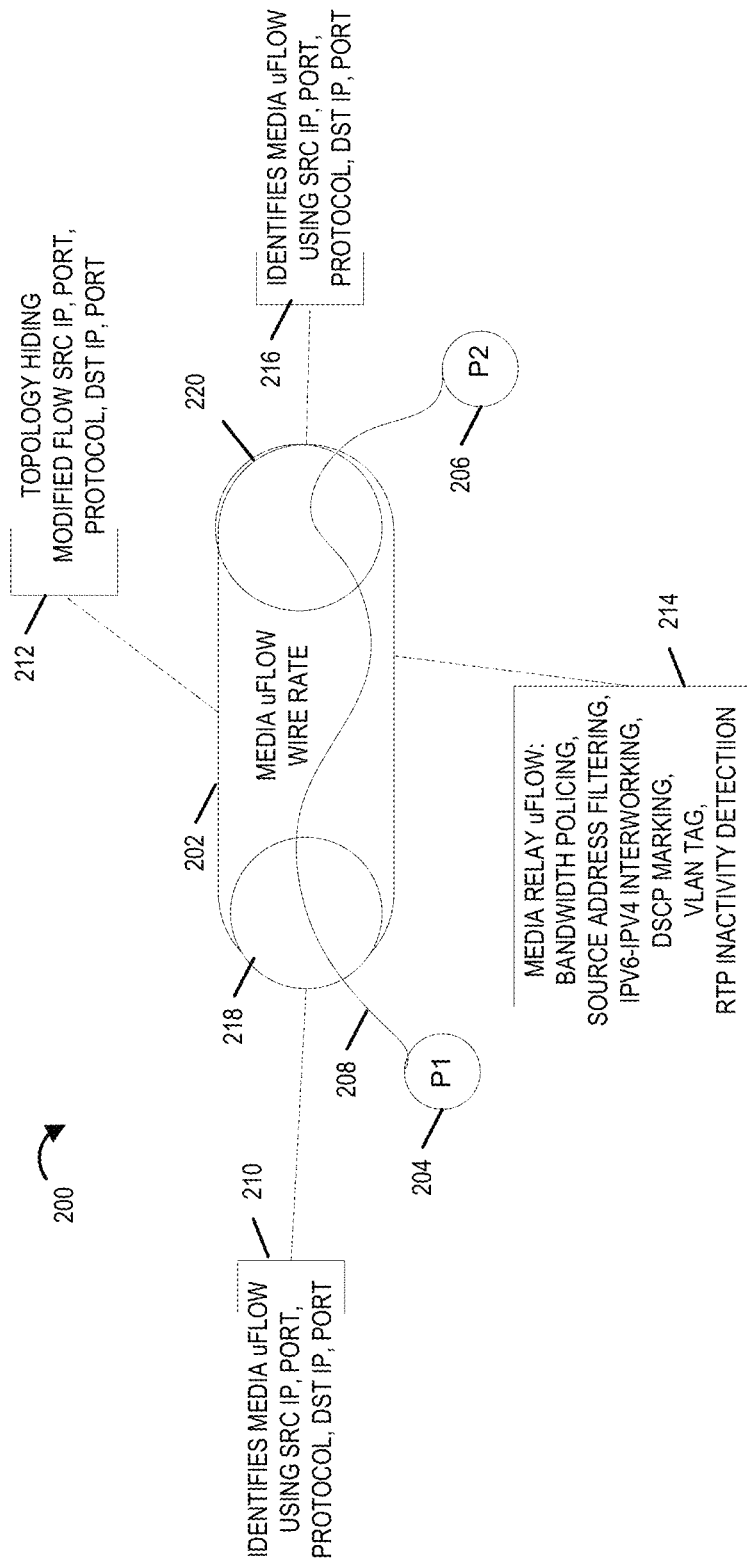
FIG. 2 illustrates various aspects of an exemplary SBC established media microflow.

Diagram 200 of FIG. 2 illustrates various aspects of an SBC media micro flow 202 from an origination device P1 204 (e.g., user device 1) to a destination device P2 206. The SBC media micro flow 202 is realized by identifying the flow using the Internet Protocol 5-tuple 210 (source IP address/transport number, destination IP address/transport number and the IP protocol in use) of received packets 208 in the flow. This is done by an access programmable switch of the SDN network, e.g., an open flow switch on the edge of the SDN network, as the received packets are received by programmable switch. The media microflow is shown as being provided at wire rate which indicates that there is little or no software overhead associated with the transmission and that the data travels at the maximum speed of the hardware. Once the micro flow is identified by the Internet Protocol 5-tuple, the programmable switch provides one or more of the following media relay services 214 by implementing programming instructions installed or caused to be installed by the SBC via the SDN controller: bandwidth policing based on the negotiated codec or using the Session Description Protocol (SDP) b line or local policy determined by the SBC during establishment of the media session, source address filtering, modifying the IP 5-tuple information of the packets in the micro flow for example for IPv6/IPv4 interworking to forward the media flow to the destination, modifying the DSCP marking or vlan tag, identify Far end Network Address and Port Translation and detect any media inactivity procedures such as RTP inactivity detection. The media microflow 202 installed in the programmable switch may, and in some embodiments, includes instructions to perform media microflow service(s) such as topology hiding 212 by modifying the flow source IP address, transport number, protocol and destination IP address and transport number by processing the data packets passing through the programmable switch as the packets of the micro flow 208 are transmitted from the origination device P1 204 to the destination device P2 206. The micro flows are uni-direction flows. If P2 206 was the origination device and P1 204 was the destination device with the packets being sent from P2 to P1 then a 5 tuple 216 would identify such a micro flow in a similar manner and would provide services for that micro flow. The P2 to P1 micro flow would be a different micro flow from the micro flow from P1 to P2 as is evident as the IP 5-tuple which identifies the micro flow would have different source and destination IP addresses and/or port numbers than the micro flow from P1 to P2.

Figure 3:
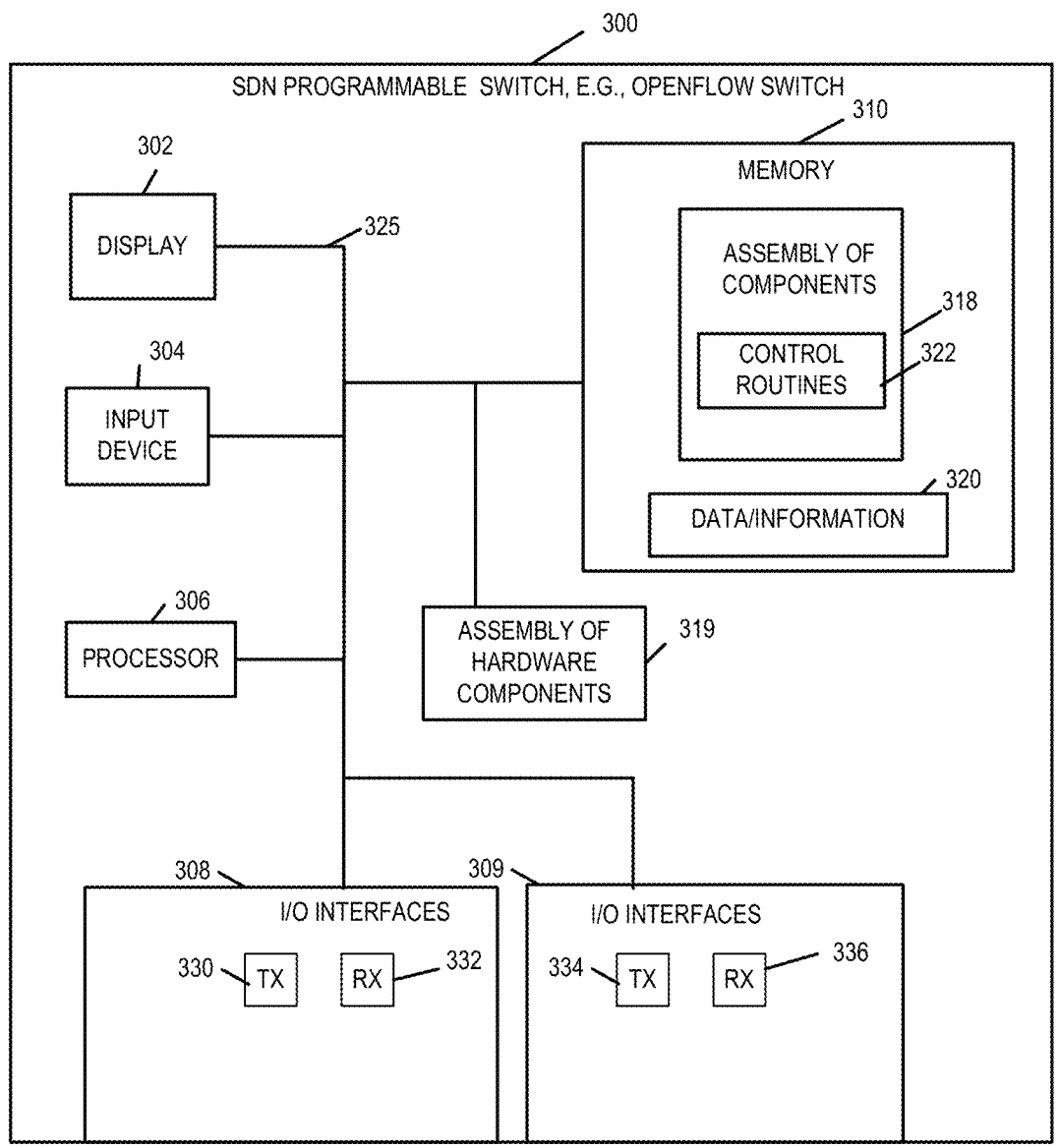
FIG. 3 illustrates an exemplary SDN switch in accordance with an embodiment of the present invention.

FIG. 3 illustrates an exemplary SDN programmable switch 300, e.g., an Openflow switch, in accordance with an embodiment of the present invention. Exemplary SDN programmable switch 300 includes a display 302, an input device 304, a processor 306, e.g., a CPU, input/output (I/O) interfaces 308 and 309, which couple the switch device to a core network or various other devices including for example remote devices, SBC devices, controller, other switch devices, and endpoint devices, such as user equipment, memory 310, and an assembly of modules 319, e.g., circuits corresponding to different modules, coupled together via a bus 325 over which the various elements may interchange data and information. Memory 310 includes an assembly of modules 318, e.g., an assembly of software modules, and data/information 320. The assembly of components 318 includes a control routines component 322 which when processed and executed by the processor 406 controls the operation of the SDN switch 300 to perform various functions and/or one or more steps of the various method embodiments of the invention. The I/O interfaces 308 include transmitters 330 and receivers 332. The I/O interfaces 309 include transmitters 334 and receivers 336. The I/O Interfaces include hardware transmitters and receivers. The switch device is also configured to have a plurality of Internet Protocol (IP) address/transport number pairs, e.g., logical IP address/transport number pairs, for use in exchanging signaling information, e.g., SIP signaling messages for establishing media sessions, and media, e.g., Real-time Protocol Packets of a media session. The switch has a plurality of public IP/transport number pairs as well as private IP/transport number pairs used for media sessions.

The I/O interfaces in some embodiments are configured to communicate in accordance with the Internet Protocol, Transport Control Protocol, User Datagram Protocol (UDP), Session Initiation Protocol (SIP), Session Description Protocol (SDP), OpenFlow protocol and/or one or more proprietary protocols. In some embodiments, the switch 300 includes a communication component configured to operate using IP, TCP, UDP, SIP, SDP, OpenFlow protocol methods. In some embodiments, the communications component is a hardware component, a software component or component including hardware and software components. In some embodiments, the SDN switch 300 includes one or more components for implementing received instructions, e.g., instructions received from an SDN controller, the instructions including for example identifying packets of a media packet flow and performing actions upon the packets of a media packet flow. In some embodiments, the instructions include matching a packet to a flow based on the contents of the IPv4 or IPv6 packet header and modifying the IP address, before forwarding. Furthermore, the SDN switch supports dynamically adding and removing flows in near real-time. In some embodiments, the SDN switch devices 106, 108 and 110 of FIG. 1 are implemented in accordance with SDN switch device 300. In some embodiments, the switch is implemented on hardware such as computer hardware that is deployed in the cloud. In some embodiments, the switch is implemented as a virtual machine on computer hardware that may be deployed in the cloud or on the Internet.

While in the exemplary embodiment, the SDN network uses the OpenFlow protocol and OpenFlow switches, other SDN protocols and programmable switches, such as for example OVSDB, NETCONF, Cisco ASIC and OPFLEX as previously discussed may be used. For explanatory purposes various features of an OpenFlow programmable switch are discussed in connection with FIG. 4.

Figure 5:
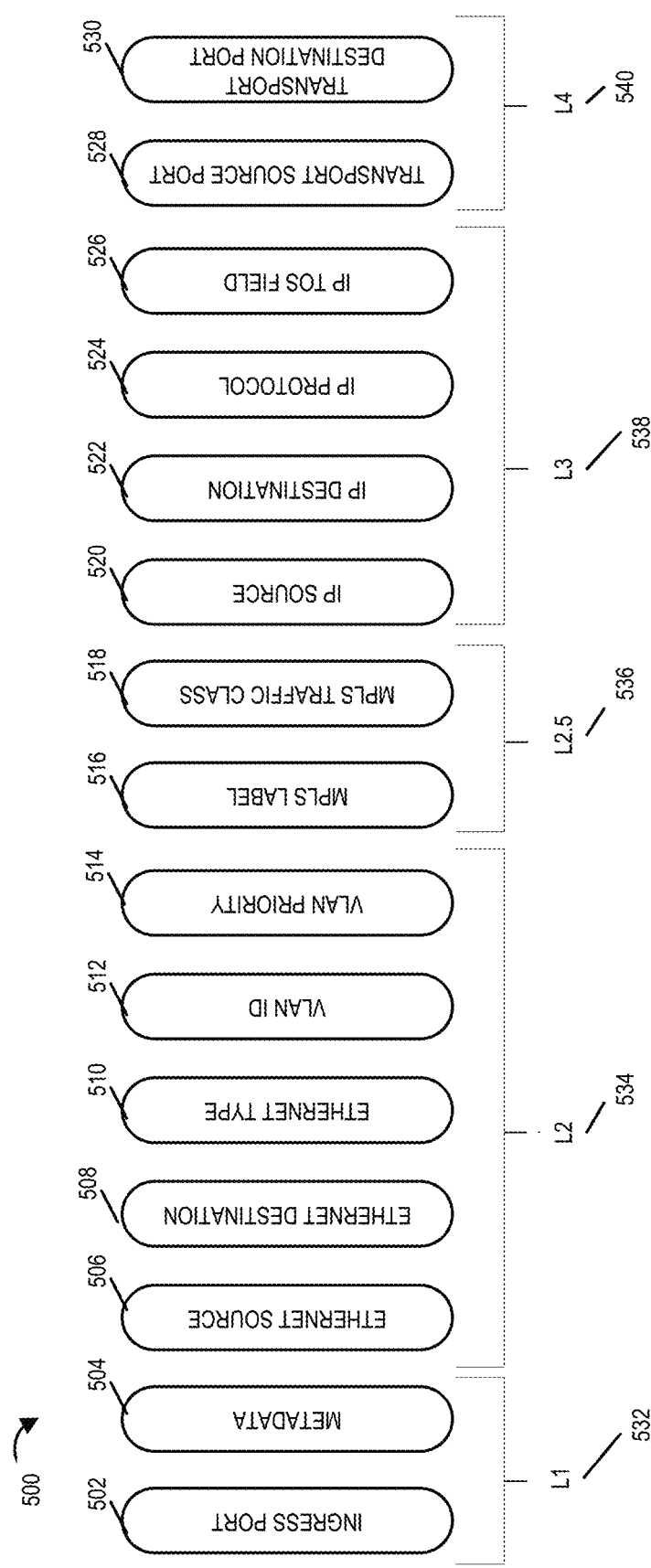
FIG. 5 illustrates the protocol layers which can be modified by an Open Flow switch.

Diagram 500 of FIG. 5 illustrates the protocol layers which an Open Flow switch can modify which include protocol layers 1, 2, 2.5, 3, and 4. The protocol layer 1 or L1 532 fields which the openflow switch can modify include: ingress port 502 and metadata 504. The protocol layer protocol layer 2 or L2 534 fields which the openflow switch can modify include: Ethernet/MAC Source Address 506, Ethernet/MAC Destination Address 508, Ethernet Type 510, VLAN ID 512, VLAN Priority 514. The protocol layer 2.5 or L2.5 536 fields which the openflow switch can modify include: Multiprotocol Label Switching (MPLS) Label 516, MPLS Traffic Class 518. The protocol layer 3 or L3 538 fields which the openflow switch can modify include: IP source address 520, IP destination address 522, IP protocol 524, IP TOS Field 526. The protocol layer 4 or L4 540 fields which the openflow switch can modify include: transport source port 528 and transport destination port 530. References to source port and destination port used herein refer to the transport source port and transport destination port respectively.

Diagram 2300 of FIG. 23 illustrates the structure of an exemplary media packet with an Real-time Protocol payload. It includes the Ethernet packet header 2302 also referred to as MAC packet header, the Internet Protocol (IP) packet header 2304, the User Datagram Protocol (UDP) packet header 2306, the RTP packet header 2308, and the RTP payload 2310. References to media packet header or packet header herein refer to the packet headers attached to the packet payload. The media packet is an RTP packet encapsulated in a UDP packet which is encapsulated in a IP packet which is encapsulated in a Ethernet packet so that it can be communicated through various networks. The real-time media that is included in the RTP packet payload 2310. RTP header contains information related to the payload such as for example the source, size, and encoding type. The Ethernet packet header (also referred to as the MAC packet header) 2302 includes the source and destination MAC addresses. The IP packet header 2304 includes, among other things, the IP source and destination addresses, the VLAN TAG, the protocol type which indicates the type of transport packet being carried (e.g., ICMP, TCP or UDP), Differentiated Services Point Code (DSPC). The UDP packet header 2306 includes the transport source and destination port numbers.

Figure 4:
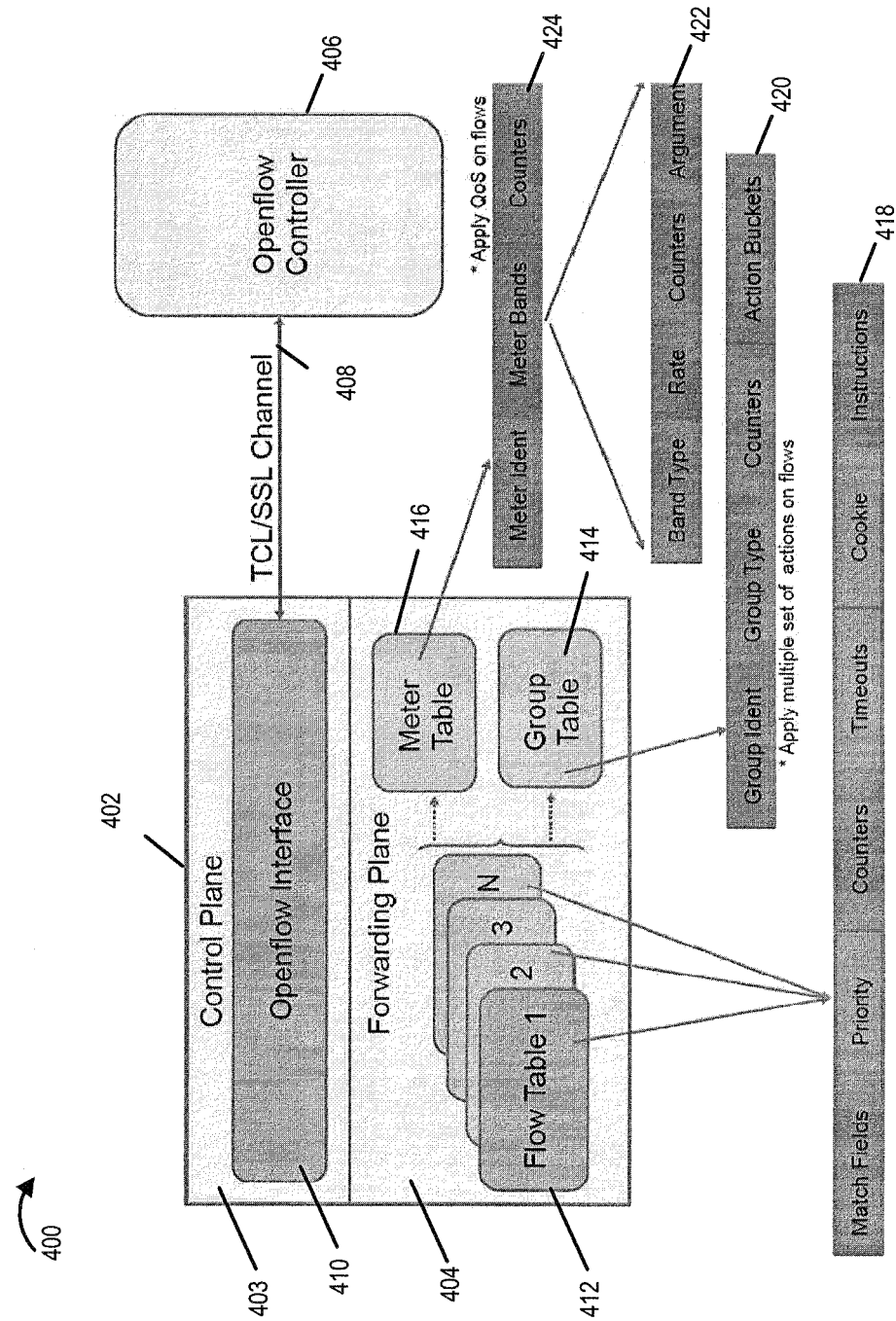
FIG. 4 illustrates an exemplary software controlled logical switch data structures of an SDN switch that is an open flow switch along with an open flow controller.

The diagram 400 of FIG. 4 illustrates typical software controlled logical switch data structures namely for an Openflow switch. A description of an open flow switch and the switch's capabilities can be found in the OpenFlow Switch Specification version 1.5.0 (Protocol Version 0x06 published by the Open Networking Foundation dated Dec. 19, 2014.

In diagram 400 the open flow switch 402 illustrated via its logical data structures includes a control plane 403 and a forwarding plane 404. The open flow switch 402 is coupled via an Openflow Interface 410 which is part of the data plane 404 to an external Openflow Controller 406 (e.g., SDN controller 112 of FIG. 1) via a TCL/SSL (TCL/Secure Socket Layer) Channel 408.

The forwarding plane includes a set of flow tables 412 including Flow Table 1, 2, 3, . . . , N; a group table 414 and a meter table 416. Each of the flow tables of the set of flow tables 412 contains a flow entry. The main components of a flow entry in a flow table are shown in element 418. Each flow table entry contains match fields, priority, counters, timeouts, cookie and instructions. A flow entry may also contain flags. As explained in the OpenFlow Switch Specification version 1.5.0 the match fields are used to match against packets. The match fields include the ingress port and packet headers and optionally other pipeline fields such as metadata specified by a previous table. The priority is used for matching the precedence of the flow entry. The counters are updated when packets are matched. The instructions are used to modify the action set or pipeline processing. A flow entry instruction may, and sometimes does, contain actions to be performed on the packet at some point of the pipeline. The set-field action can be used to specify some header fields to rewrite. The timeouts are the maximum amount of time or idle time before flow is expired by the switch. The cookie is an opaque data value chosen by the SDN OpenFlow controller and is sometime used by the SDN controller to filter flow entries affected by flow statistics, flow modification and flow deletion requests. It is not used when processing packets. The flags alter the way flow entries are managed. A flow table entry is uniquely identified by its match fields and priority. The match fields and priority together identify a unique flow entry in a specific flow table.

The Group table 414 of the forwarding plane 404 includes a group of entries. A flow entry in a flow table can point to a group. Each group entry is identified by its group identifier. The main components of the group entry are shown in group entry 420 and include Group Identifier, Group Type, Counters and Action Buckets.

The meter table 416 which is part of the forwarding plane is a table that consists of meter entries which define per-flow meters which enable the implementation of various simple QoS operations such as for example implementation of bandwidth policing of packet flows and the implementation of microflows. The main components of a meter entry 424 in the meter table 416 include meter identifier, meter bands and counters. The meter identifier is an integer that uniquely identifies the meter. The meter bands are an unordered list of meter bands with each meter band specifying the rate of the band and the way to process the packet. The counters are counters which are updated as packets are processed by the meter. The main components of a meter band are shown in element 422 and include band type, rate, burst, counters and arguments. The band type defines how a packet is processed. the rate is used by the meter to select the meter band. The burst defines the granularity of the meter band. The counters are counters which are updated as packets are processed by a meter band. The meter band entry may also include band type specific arguments.

In some embodiments, the SDN switch, e.g., open flow switch, includes one or more components or logic that may be implemented in software, hardware, e.g., circuits, or a combination of software and hardware to perform the functionality described herein. In some embodiments, a processor and/or device in the switch performs the functionality described herein in connection with SDN switches.

As previously explained the SBC upon determining the type of microflow to be established from a media perspective for a call/media session realizes the SBC media services or redirection services required for the microflow by programming the underlying SDN network and in particular the programmable switches of the SDN network typically by exchanging and/or sending instructions, commands and/or information to the SDN controller which in turn programs, i.e., installs instructions for execution into the programmable switches to implement the policies and instructions provided by the SBC.

The various SBC media relay flow services realized using these SDN principles/capabilities as described in view of the exemplary OpenFlow switches include:
- topology hiding for media flows by address rewrites (of L2/L3 and L4 headers) for each flow entry in the flow table of an OpenFlow switch;
- IPv4 and IPv6 interworking;
- metering of each identified flow using metered table of an OpenFlow Switch for realizing bandwidth policing;
- NAPT (Network Address and Port Translation) detection.
- DSCP marking or DSCP pass-through for each media flow using L2 rewrite;
- Packet statistics counted for each flow;
- Far end NAT traversal using reporting of flow entry match to the SDN controller;
- RTP inactivity detection using Flow entry idle timer expiry;
- RTP forking to support legal interception and recording using Group Table of an OpenFlow switch;
- rogue media detection by receiving packet on a SBC media interface address and UDP port range but no flow exists in them.

Figure 6:
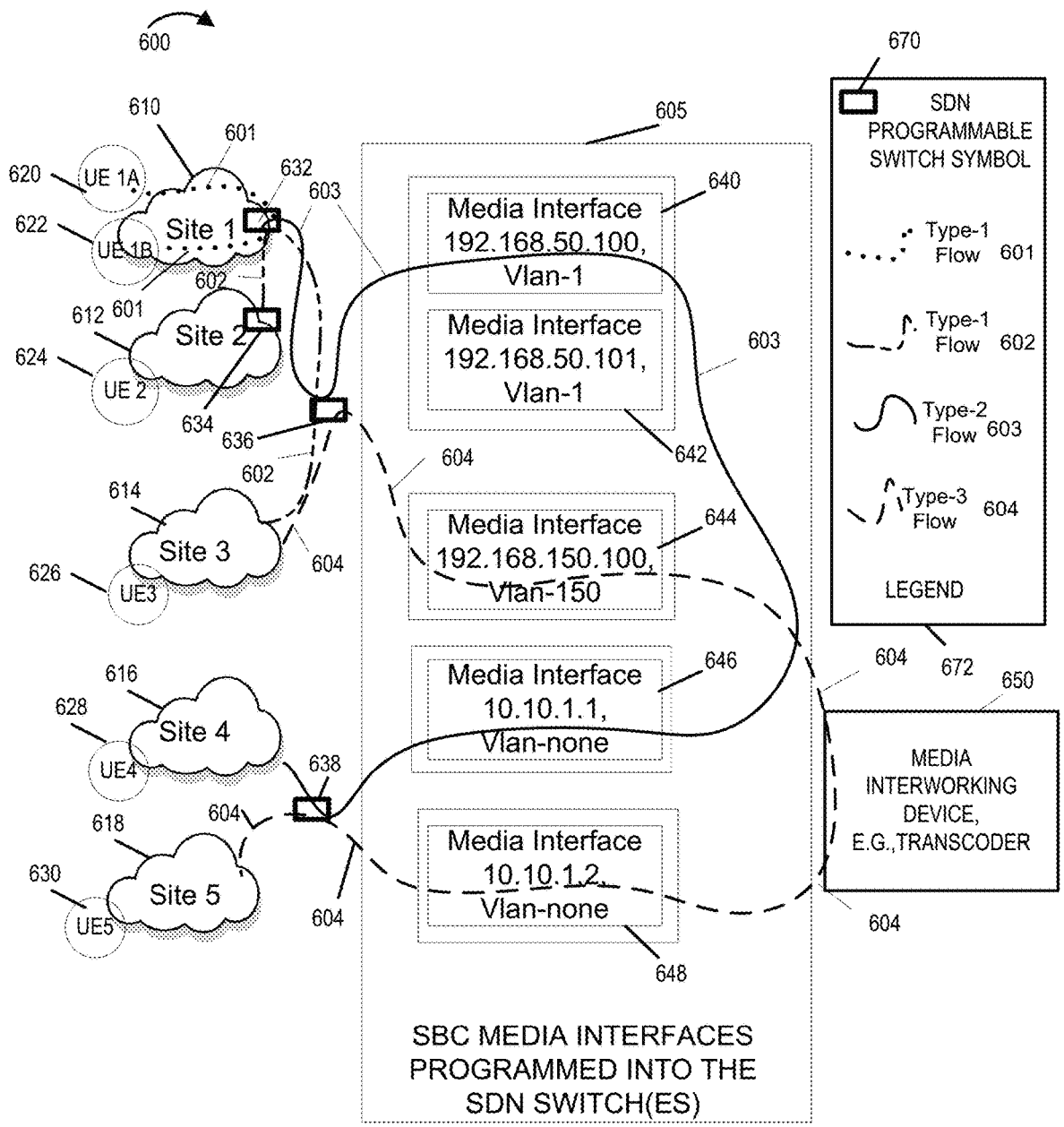
FIG. 6 illustrates exemplary type-1, type-2 and type-3 media flows through SBC media interfaces programmed into SDN switches in accordance with an embodiment of the present invention.

System 600 of FIG. 6 depicts exemplary type-1, type-2 and type-3 micro media flows that are dynamically configured on the programmable switches, e.g., OpenFlow switches, of the system by a SBC via an SDN controller. In the system 600, block 605 is a representation illustrating the media interfaces of an SBC that are programmed into the SDN programmable switches of the SDN network, e.g., OpenFlow switches. Box 672 is a legend for FIG. 6. Legend 672 illustrates symbol 670 used for a SDN programmable switch, e.g., and OpenFlow Switch, in FIG. 6 which as described below includes devices 632, 634, 636, and 638. Legend 672 as shows the symbols used for type-1 flow 601, type-1 flow 602, type-2 flow 603 and type 3 flow 604 which are described in further detail below.

The Site-1 network 610 and Site-2 network 612 share the same Internet Protocol space and same physical link layer. Media Interface 641 includes IP address information 192.168.50.100, VLAN-1. Media Interfaces 640 includes two media interfaces 641 and 641 which interface which are media interfaces to the Site-1 and Site-2 networks 610 and 612 respectively. Media Interface 642 includes IP address information 192.168.50.101, VLAN-1.

Site-1 network 610 and Site-2 network 612 share the same Internet Protocol space but not the same physical link layer as the Site-3 network 614. Media Interface 644 interfaces to the Site-3 network 614 and includes IP address information 192.168.150.100, VLAN-150.

The Site-4 network 616 and Site-5 network 618 do not share the same IP space as the Site-1 network 610, Site-2 network 612 and Site-3 network 614. Media Interface 646 interfaces to the Site-4 network 616 and includes IP address information 10.10.1.1, VLAN-none. Media Interface 648 interfaces to Site-5 network 618 and includes IP address information 10.10.1.2, VLAN-none.

The lines 601, 602, 603, and 604 illustrate how the exemplary media type-1, type-2 and type-3 flows traverse the networks and utilize the different programmed media interfaces of the switch(es) to provide connectivity for devices located in the different Site-1, Site-2, Site-3, Site-4 and Site-5 networks.

UE 1A 620 and UE 1B 622 are user equipment devices, e.g., endpoint devices, connected to the Site 1 network 610. UE 2 624 is a user equipment device, e.g., endpoint device connected to the Site 2 network 612. UE 3 626 is a user equipment device, e.g., an endpoint device connected to the Site 3 network 614. UE 4 628 is a user equipment device, e.g., an endpoint device, connected to the Site 4 network 616. UE 5 is a user equipment device, e.g., an endpoint device, connected to Site 5 network 618. While for explanatory purposes only one or two user equipment devices have been illustrated as being connected to the Site 1 network 610, Site 2 network 612, Site 3 network 614, Site 4 network 616, and Site 5 network 618, it should be understand that each of these networks will typically have a large number of endpoint devices connected to them. The Site 1 network 610, Site 2 network 612, Site 3 network 614, Site 4 network 616, and Site 5 network 618 are not part of the Software Defined Network but are coupled to the Software Defined Network via SDN programmable switches (e.g., OpenFlow switches). Devices 632, 634, 636 and 638 are SDN programmable switches, e.g., OpenFlow switches, which provide connectivity between the Site-1, Site-2, Site-3, Site-4, and Site-5 networks and the SDN network. Media aware device or media interworking device 650 is a device in the SDN network that provides media interworking services such as for example transcoder of media signals where the endpoint devices of a flow are using different codecs. Media interworking device 650 may be, and in some embodiments is, a transcoder including a digital signal processor for processing the media signals it receives.

For the flows depicted in system 600 to be installed on the programmable switches, e.g., OpenFlow switches, the programmable switches are required to have network connectivity with the networks represented by Site 1 610, Site 2 612, Site 3 614, Site 4 616, and Site 5 618.

FIG. 6 depicts Type-1, Type-2 and Type-3 flows established by an SBC from a media perspective. These flows are established dynamically with all the signaling, e.g., SIP control signaling, from the endpoint communications devices terminated on the SBC while the media for the flow is switched either locally between sites or realized via the SDN network in conjunction with a media aware device 150 such as for example a transcoder.

The Type-1 flow consists of two types depending upon whether layer 2 or layer 3 connectivity exists between the sites. For example, endpoint devices UE 1A 620 and UE 1B 622 within Site-1 or endpoint device UE 2 within Site2 have layer 2 (data link layer) connectivity while devices in Site-1, e.g., UE 1A 620 and UE 1B 622 and Site-3, e.g., UE 3 626, have layer 3 (network layer) connectivity.

The Type-2 flow consists of flows where connectivity between the two sites is provided via the SBC providing media services. These sites are not reachable unless the SBC establishes a path between them. The SBC provides layer 3 (network layer) connectivity where IP address space could be disjoint or where they have the same IP address but different virtual lan (vlan) tag.

The Type-3 flow consists of flows where connectivity between the two sites is provided via the SBC providing media services. These sites are not reachable unless SBC establishes a path between them. The SBC provides layer 3 (network layer) connectivity and does media processing/interworking or redirects the flow to a media aware device that does media processing/interworking.

The FIG. 6 system model from a media perspective is dynamically configured on the programmable switches of the SDN network, e.g., OpenFlow switches, by the SBC using the SDN controller. As previously explained, in order for these flows to be installed the programmable switches should have network connectivity with the networks of Site 1 610, Site 2 612, Site 3 614, Site 4 616 and Site 5 616. In some instances the type-1 media flows may not be anchored on programmable SDN switches, e.g., OpenFlow switches, since the flows do not have to pass through devices that are part of the SDN network controlled by SDN controller. It should be noted however that the control signaling for these type-1 flows is still anchored on the SBC.

There are two types of type-1 flows. In first type of type-1 flows, the peer endpoint devices have direct layer-2 (data link layer) connectivity. In the second type of type-1 flows the peer endpoint devices have layer-3 (network layer) connectivity. In both types of type-1 flows, no topology hiding is required. The type-1 flows are direct media sessions/calls. The SBC is used to setup these dynamic media flows but these flows do not require any "flow rewrite". The SBC as part of the control signaling performed in establishing the media flow provides the media address of the endpoint devices to each other.

In the case of the Layer-2 connectivity type-1 flows, no header re-writes occur; layer 2 switching takes place. The endpoint 1 and endpoint-2 share the same physical network. Refer to flow between endpoint devices within Site network 610 and Site 2 network 612. See for example, Type-1 flow 601 between endpoints UE 1A 620 and UE 1B 622 within Site-1 network 610.

It is to be understood that while exemplary embodiments of the invention are described using the Session Initiation Protocol, the invention is also applicable to systems utilizing the ITU-T H.323 standard. Details of which are included in the International Telecommunications Union Recommendation ITU-T H.323 v.7 standard entitled, "Packet-based multimedia communications systems" published by the International Telecommunications Union in Dec. 14, 2009. In such systems the SBC operates as the Gatekeeper. In systems using the H.323 standard, the call setup takes place using the call control messages defined in Recommendation ITU-T H.225.0 according to the call control procedures defined in H.323. See the Recommendation ITU-T H.225.0 v7 entitled, "Call signalling protocols and media stream packetization for packet-based multimedia communication systems" published by the International Telecommunications Union in Dec. 14, 2009 for further details.

Figure 7:
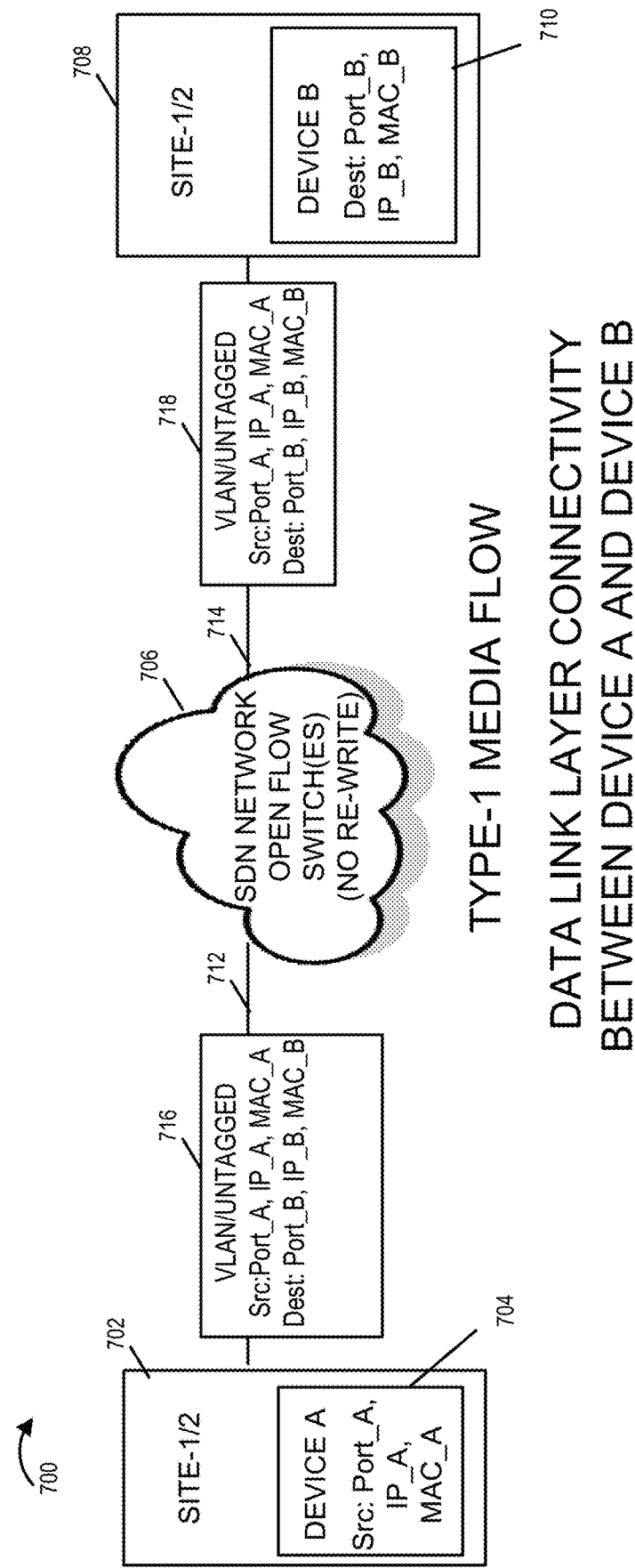
FIG. 7 illustrates an exemplary type-1 media flow in accordance with an embodiment of the present invention.

Diagram 700 of FIG. 7 illustrates a Type-1 flow with layer-2 data link layer connectivity. Diagram 700 includes communications device A 704 located at Site-1/2 702. Site-1/2 is used to refer to either Site-1 or Site-2 and in this example communications device A may be either located at Site 1 610 of FIG. 6 or Site 2 612 of FIG. 6. The communications device A is coupled and/or connected to the Site 1 network 610 or the Site 2 network 612. Communications device B 710 is located at Site-1/2 708. That is communications device B 710 may be either located at Site 1 610 of FIG. 6 or Site 2 612 of FIG. 6. The communications device B 710 is coupled and/or connected to the Site 1 network 610 or the Site 2 network 612.

In the diagram 700 a unidirectional media microflow of packets is transmitted from communications device A 704 via communications link 712 to communications device B 710 via SDN programmable switch(es) in the SDN Network 706 and communication link 714. In this example, there is layer 2 connectivity between the devices within the Site-1 network 610 and the Site 2 network 612 and also between - the devices in the Site-1 network 610 and the Site-2 network 612. In this microflow example, the source address of the communications device A 702 is Port_A, IP_A, MAC_A and the destination address of the communications device B 1010 is Port_B, IP_B, MAC_B.

The unidirectional media microflow is established by the SBC located in the SDN Network. The control signaling for the media session which includes the media microflow is anchored at the SBC. While the control signaling for the media microflow is anchored at the SBC in the SDN network 706, the media microflow is not anchored at the SBC. The SBC acts as a Back-to-Back User Agent (B2BUA) during the call/media session establishment. As a B2BUA, the SBC receives the SIP Invite with SDP offer message from communications device A and SIP response with SDP answer message from communications device B. In systems that utilize H.323 the SBC performs the operations of a gatekeeper during the call establishment process. As the gatekeeper, the SBC receives signaling messages which describe the parameters of the call to be established (addressing information, codec information, bandwidth limitations, etc.

Returning now to the example which uses the Session Initiation Protocol, the SIP Invite message includes a SDP offer message which includes the description of the session being offered, e.g., by communication device A to communications device B. IETF RFC 4566 describes the SDP Session Description Protocol. The SDP message which includes the session description generally includes the following information the session name and purpose, time(s) the session is active, the media comprising the session and information needed to receive the media such as for example, addresses, ports, and formats. With respect to the media and transport information, the SDP message includes information describing the type of media such as for example audio, video and image media data, the transport protocol such as for example Real-time Transport Protocol (RTP)/User Datagram Protocol (UDP)/Internet Protocol (IP), etc. and the format of the media such as for example, H.261 video, MPEG video, etc. In addition, the SDP message includes the IP address and transport port details to which the media data is sent, e.g., the remote IP address and remote port to which the media is being sent. The SDP session description contains a number of lines of text of the form: <type>=<value>. For example, "m=<media> <proto> <fmt>" refers to the media information describing a particular media stream. <media> is the media type which include "audio", "video", "text", "application", and "message." <port> is the transport port to which the media stream is to be sent. <proto> is the transport protocol and <fmt> is the media format description. The SDP offer also identifies the codecs supported. The SDP connection data field or "c" line includes the connection information including the IP address. The m line includes the transport port number.

With respect to an SDP answer, the connection address (in the c line) and port in the m line of the SDP answer indicate the address where the answerer wishes to receive media (in the case of RTP, RTCP will be received on the port which is one higher unless there is an explicit indication otherwise).

The SBC determines from session establishment signaling information including the SDP offer and answer exchange that the media session to be established is VLAN/ UNTAGGED, communications device A source information to be used for the media flow is port: Port_A, Internet Protocol address: IP-A, Media Access Control Address (MAC) (i.e., physical address), MAC_A and the communications device B destination information to be used for the flow is port: Port_B, Internet Protocol address: IP-B, Media Access Control Address (MAC) (i.e., physical address), MAC_B. The SBC is in a trusted relationship with the Site-1 and Site 2 networks 610 and 612 and has been provided with information on the network topology and connectivity between the devices in the Site-1 and Site-networks 610 and 612. The SBC determines from the information in the media session establishment signaling information including the SDP offer answer messages that communications device A and communications device B and/or the network topology information regarding the networks to which the communications device A and communications device B are connected have layer 2 data link layer connectivity and that no header address rewrites are needed for the microflow between communications device A 704 and communications device B 710. Upon determining that no header rewrites are necessary, the SBC sends instructions and/or information to the SDN controller to configure one or more SDN switches of the SDN network that receive packets with the 7-tuple Src: Port_A, IP_A, MAC_A Dest: Port_B, IP_B, MAC_B with protocol type identified as UDP to pass the packets through the switch without re-writing this header information. This is shown in diagram 700 of FIG. 7 with the media data packet 716 of the media microflow transmitted from device A 704 to SDN switch(es) in the SDN network 706 including the information VLAN/UNTAGGED Src: Port_A, IP_A, MAC_A Dest: Port_B, IP_B, MAC_B and the media data packet 718 transmitted from the SDN network 706 switches including the same information unchanged. Though not shown the UDP protocol type included in the packet header information.

In the layer-2 (data link layer) connectivity case just discussed and shown in FIG. 7 no header re-writes occur; layer 2 switches is performed by the SDN switch. The communications device A 704 and communications device B 710 share the same physical network. This example is applicable to flows between the endpoint devices within Site 1 network 610 and Site 2 network 612. See for example, the flow 601 and the portion of the flow from Site 2 switch 634 to Site 1 switch 632 in FIG. 6.

Figure 15:
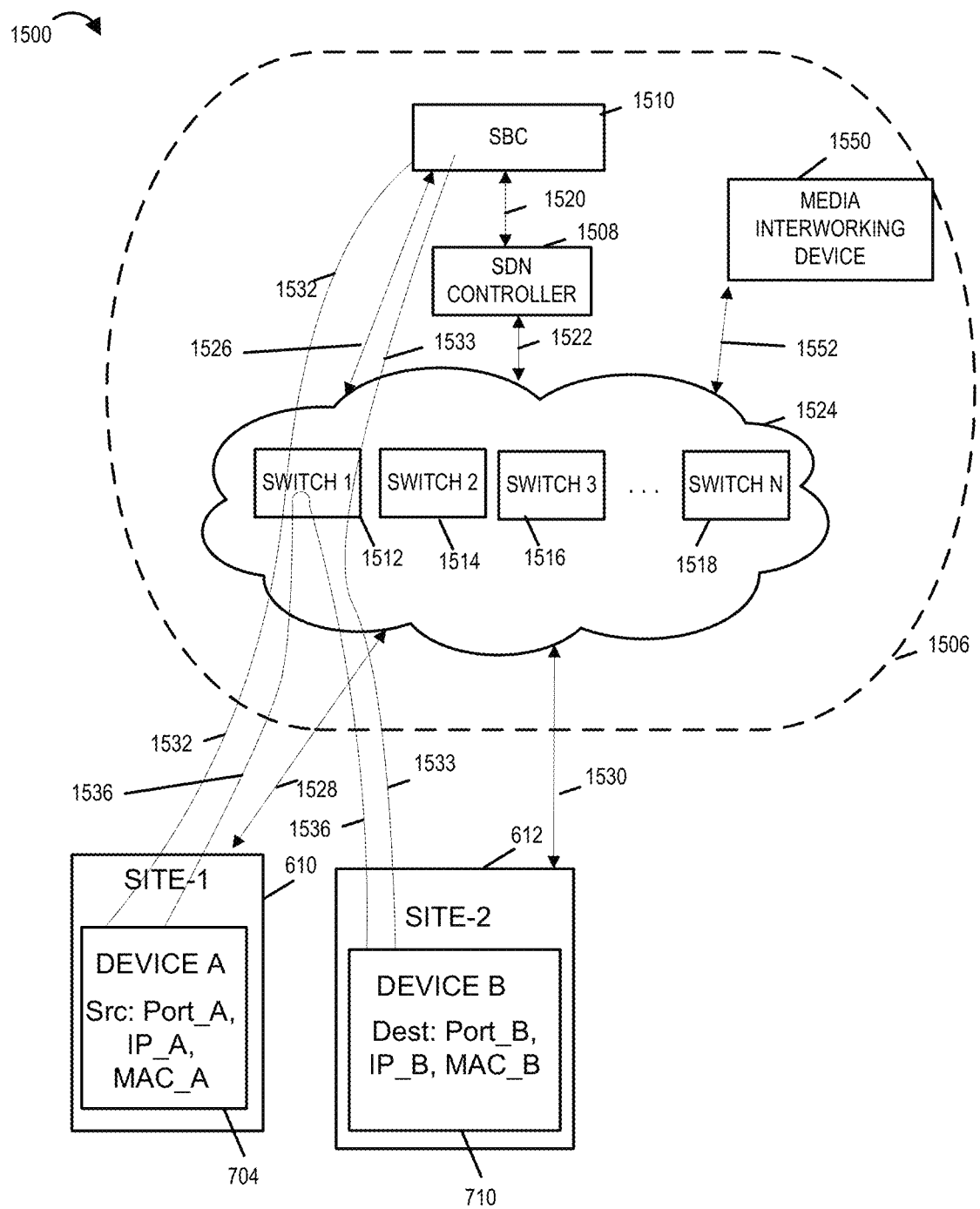
FIG. 15 illustrates an exemplary signaling path and media flow path through an SDN network for the type-1 flow illustrated in FIG. 7.

FIG. 15 illustrates an exemplary system 1500 with exemplary signaling and media flow paths/routes in accordance with an exemplary embodiment of the present invention for a type-1 media flow with layer-2 (data link layer) connectivity between the communications endpoints communications device A and communications device B. The system 1500 includes endpoint communications device A 704 connected to Site-1 network 610, endpoint communications device B 710 connected to Site-2 network 612, a SDN network 1506 including a plurality of communications switches, a SDN controller 1508 and a SBC, e.g., a signaling-SBC (S-SBC) 1510. Media interworking device 1550, e.g., a device which performs transcoding operations is coupled to the cloud 1524 via communications link 1552. Endpoint devices A 704 and B 710 may be, and in some embodiments are, user equipment devices such as for example communications devices (e.g., cell phones, mobile phones, smartphones, IP phones, computers, lap tops, notepads, VOIP phones). The plurality of programmable SDN communications switches include switch 1 1512, switch 2 1514, switch 3 1516, . . . , switch N 1518 where N is a positive number. The programmable communications switches of the SDN network 1506 including switches 1512, 1514, 1516, . . . , 1518 are SDN-enabled/supported switches such as for example SDN-enabled/supported Open Flow switches. The SBC 1510, SDN Controller 1508, and communications switches are part of a software defined network (SDN) system and are coupled together via communications links. The plurality of programmable switches include edge switches and in some embodiments one or more core network programmable communications switches which couple edge switches to other devices and switches in the SDN network. Both the edge switches and the core network communications switches are controlled by the SDN controller 1508. The edge switches which are positioned on the edge of the software defined network, are controlled by the SDN controller 1508 and serve as ingress/egress switches for session initiation requests and media sessions being routed through the software defined network controlled by the SDN controller 1508. In the exemplary embodiment switch 1 1512, 3 1516, and switch N 1518 are edge switches which are positioned on the edge of the software defined network controlled by the SDN controller 1508. While only two endpoint devices 704 and 710 are illustrated as being coupled to the SDN network 1506 via Site-1 and Site-2 networks for purposes of simplifying the example for explanatory purposes, the system 1500 may, and in most embodiments does, include a plurality of endpoint devices coupled to the SDN network 1506. The SBC 1510 is coupled to the SDN controller 1508 via a communications link 1520. In some embodiments, the communication protocol used to communicate between the SDN controller 1508 and SBC 1510 is based on extending a representational state transfer Application Programming Interface (REST API) provided by the SDN Controller to the SBC 1510. The SDN controller 1508 dynamically programs flows in the SDN network 1506.

The cloud 1524 represents communications links of the SDN network that couple/connect the switches of the SDN network 1506 together. The SDN controller 1508 is coupled to the communications switches 1 1512, switch 2 1514, switch 3 1516, . . . , switch N 1518 via communications link 1522 shown as coupled to cloud 1524. SBC 1510 is coupled to the communications switches 1 1512, switch 2 1514, switch 3 1516, . . . , switch N 1518 via communications link 1526 which is illustrated as being connected to cloud 1524. The endpoint device A 704 is coupled to the SDN network 1506 cloud 1524 via communications link 1528. The endpoint device B 710 is coupled to the SDN network 1506 cloud 1524 via communications link 1530. Lines 1532 and 1533 represent signaling traffic communicated between endpoint device A 704 and endpoint device B 710 via switch 1 1512, and SBC 1510 and communications links 1526, 1528, and 1530. It should be noted that the signaling is terminated at the SBC 1510 which acts as a B2BUA for the signaling session. Line 1536 represents the media flow traffic of packets communicated between endpoint A 704 and endpoint B 710 via switch 1 1512 and communications links of the system 1500 including communications links 1528 and 1530.

System 1500 of FIG. 15 illustrates how the SBC implements a media microflow services in this case a media microflow bypass service without anchoring media streams at an external media-aware node (such as for example an SBC) using Software Defined Network principles resulting in higher network efficiency, dynamic real-time routing and re-routing of media streams to achieve optimizations, and optimization of backhaul costs.

At the time of session establishment and as part of installing flow rules on communications switches 1 1512, 2 1514, 3 1516, . . . N 1518 which for example are SDN-enabled Open Flow switches, the signaling plane of the SBC 1510 uses the SDN control plane interface and communications link 1520 to communicate information, requests and/or instructions to the SDN controller 1508. In turn the SDN controller 1508 acts on the received information, requests and/or instructions and communicates instructions to one or more of the plurality of communications switches of the SDN network, e.g., communications switch 1 1512 or switch N 1518 to rewrite as necessary source and destination header address information. In the case of a type-1 medal flow where there is data link layer connectivity between device A and device B no rewrite is required the switch is programmed to pass packets identified as belonging to the media packet flow without rewriting source and destination information in the packet header.

The communications switches are software controlled switches that support programmable unidirectional flows. The software controlled switches are programmed by the SDN controller 1508. One, some, or all of the plurality of communications switches support rewriting of source and destination IP addresses, ports and MAC addresses. As a session with RTP media streams or flows are established, the corresponding flows are established and/or programmed on the switches dynamically. The SBC 1510 then programs one or more of the communications switches (via SDN controller) through which the RTP media streams are programmed to duplicate only the RTCP stream using a Group Table and by modifying the Layer 2 and/or Layer 3 destination transport address (i.e., Ethernet destination which is a layer 2 destination transport address and/or an Internet Protocol (IP) destination address which is a layer 3 destination transport address). Diagram 500 of FIG. 5 illustrates the layer/levels L1, L2, L2.5, L3 and L4 which may be modified by an Open Flow switch.

The SDN network 1506 is configured so that the S-SBC 1510 will anchor session signaling traffic traversing the network. The SDN controller 1508 sends programming instructions to edge communications switches programming them to forward signaling traffic received from outside the SDN network to the SBC 1510.

This is pictorially represented in FIG. 15. The signaling traffic between endpoint A 704 and SBC 1510 is represented by line 1532. Note it passes through switch 1 1512. The signaling traffic between SBC 1510 and endpoint B 710 is represented by line 233 which in this case also passes through switch 1 1512 as devices A and B are connected to the same network. The media traffic (which includes RTP/RTCP flows) is represented by line 1536.

The signaling from endpoint A and endpoint B is anchored at SBC 1510—this is depicted by lines 232 and 233 respectively shown in FIG. 15. The SDN switch one is programmed to identify received packets belonging to the media packet flow sent by device A to device B and pass the packets back out to the network.

Figure 11:
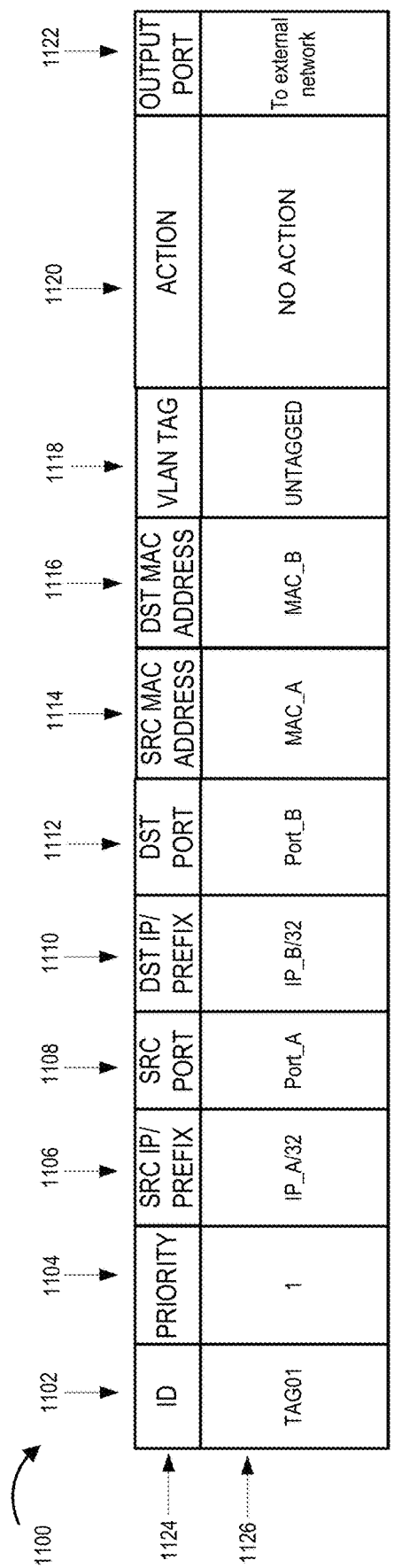
FIG. 11 illustrates exemplary instructions in the form of a flow table entry for a SDN programmable switch for the type-1 media flow illustrated in FIG. 7.

Table 1100 of FIG. 11 illustrates exemplary instructions which when executed by a programmable switch implement a media microflow bypass service. The instructions are in the form of a flow table entry that is installed in one or more SDN switch(es) 1512, 1514, 1516, . . . , 1518 of the SDN network 1506 for the media flow from device A 704 to device B 710 illustrated by line 1536 on FIG. 15. The instructions are installed in at least SDN programmable switch 1 1512 which has an interface to the Site-1 and Site-2 networks 610 and 612. The entries for row 1124 of the table are labels or identifiers which are provided for explanatory purposes. These entries identify the information contained in each of the columns. Each row in the table 1100 contains information relating to a specific table entry. In this example only one row 1126 is illustrated but the flow table typically includes multiple rows. The entries in column 1102 includes table entry identifiers. The entries in column 1104 identify the priority/preference to be applied to the table entry. When the matching criteria of multiple table entries match the table entry with the highest priority action is executed and the tables with the lower priorities actions are not executed. The entries in column 1106 are source IP address/prefix numbers to be used for matching against a received packet's source IP address included in the packet's header information. The IP address shown in table 1100 are shown as IPV4 IP addresses which are 32 bits in length. The invention is also applicable to IPV6 IP addressing in which the IP address are 128 bits in length. When IPV4 IP address are being matched the prefix is 32 bits; when IPV6 addresses are being matched the prefix is 128 bits. The entries in column 1108 are source port numbers to be used for matching against a received packet's source port information included in the packet's header information. The entries in column 1110 are destination IP address/prefix numbers to be used to match against received destination IP address included in the packet's header information. The entries in column 1112 are destination port numbers to be used to match against a received packet's destination port included in the received packet header information. The entries in column 1114 are source MAC address to be used for matching against a received packet's source MAC address included in the packet's header information. The entries in column 1116 are destination MAC address to be used for matching against a received packet's destination MAC address included in the packet's header information. The entries in column 1118 are VLAN TAG to be used for matching against a received packet's VLAN TAG included in the packet's header information. The entries in column 1120 are actions, e.g., IP address/port rewriting, MAC address rewriting, VLAN TAG rewriting, and packet redirection, and/or packet forwarding, to be taken by the SDN programmable switch when the matching criteria for a flow entry are meet and the flow entry has the highest priority of flow table entries with matching criteria, the matching criteria being, e.g., received packet header source IP, source port, source MAC address, destination IP address, destination port, destination MAC address match the corresponding entries in a flow table entry. In most embodiments the type of protocol is also used a matching criteria, e.g., UDP or TCP. The use of one or more of the VLAN TAG, source MAC address and destination MAC address is optional and are not used in all embodiments for matching criteria. Column 1122 identifies the SDN switch output port on which the received packet after any alterations is to be outputted.

The entry (column 1102, row 1126) states "TAG01," as the entries in row 1126 specify a flow table entry 01. The information contained in row 1126 is a flow table entry installed for SBC 1510 with a flow table entry identifier of TAG01 (column 1102, row 1126), priority/preference of 1 (column 1104, row 1126), matching criteria Source IP address/prefix of IP-A/32 (column 1106, row 1126) which is the IP address of device A to be used for sending media packets of the media flow per the agreement in the SDP Offer and Answer exchange, matching criteria source port number of Port_A (column 1108, row 1126) which is the port of device A to be used for the media flow per the agreement in the SDP Offer and Answer exchange, matching criteria of destination IP address/prefix of IP_B/32 (column 1110, row 1126) which is the IP address of the media flow destination device B 710 per the agreement reached in the SDP offer and answer exchange, matching criteria of destination port number of Port_B indicating the port of device B to be used to receive packets of the media per the agreement reached in the SDP offer and answer exchange (column 1112, row 1126), matching criteria Source MAC Address of MAC_A (column 1114, row 1126) which is the MAC address of device A, matching criteria Destination MAC Address of MAC_B (column 1116, row 1126) which is the MAC address of device B, matching criteria VLAN TAG of UNTAGGED (column 1118, row 1126), Action of No Action (column 1120, row 1126) which instructs the SDN switch not to rewrite any of the following header information in received packets that match the matching criteria in the table flow entry for TAG-01 but to just pass the packets through the switch, and output port (column 1122, row 1126) with entry of "to-external-network" indicating that the received packet is to be outputted to the external network from the SDN switch output port that is connected to the external-network (column 1122, row 1126). The TAG01 table entry rule/instruction provides a micro flow bypass service for a type-1 media packet flow where the endpoint devices (devices A and B) of the media packet flow having layer 1 (data link layer connectivity). When a SDN switch with this table entry, e.g., programmable switch 1 1512, receives a packet from device A 704 belonging to the media packet flow, the SDN switch will match the source IP address in the packet header which will be IP-A to the source IP-A/32 (IPV4 32 bit address) in column 1106, row 1126 and find it matches; the SDN switch will match the source port in the packet which will be Port_A to the Port_A entry in column 1108, row 1126 and find a match; the SDN switch will match the destination IP address in the packet header which will be IP_B to the destination IP address entry IP_B/32 entry in column 1110, row 1126 and find a match; the SDN switch will match the source port in the packet header which is Port_A to the entry in column 1112, row 1126 which is Port_A and find a match; the SDN switch will match the source MAC address in the packet header which will be MAC_A to the source MAC address entry in column 1114, row 1126 which is MAC_A and find a match; the SDN switch will match the destination MAC address in the packet header which will be MAC_B to the destination MAC address entry column 1116, row 1126 which is MAC_B and find a match; the SDN switch will match the VLAN TAG in the packet header which is UNTAGGED to the entry in column 1118, row 1126 which is UNTAGGED and find a match. With the matching criteria met the SDN switch will perform the action described in column 1120, row 1126 when the flow entry has the highest priority/preference of matching flow entries in the table. In this example, the column 1104, 1126 priority/precedence entry is 1 and as this is the only entry in the flow table it has the highest value. The action that is then perform by the SDN switch is that of take no action do not rewrite the source IP address, source port number, the destination IP address, the destination port number, the source MAC address, the destination MAC address, the VLAN TAG but instead pass the packet through without rewrites on these fields and then output the packet to the external network as identified in column 1122, row 1126. In this case the site-1 network 610 and site-2 network 620 are part of the same physical network and switch 1 1512 can implement a media bypass microflow service by passing the received packet without rewrites toward the destination device B.

Figure 8:
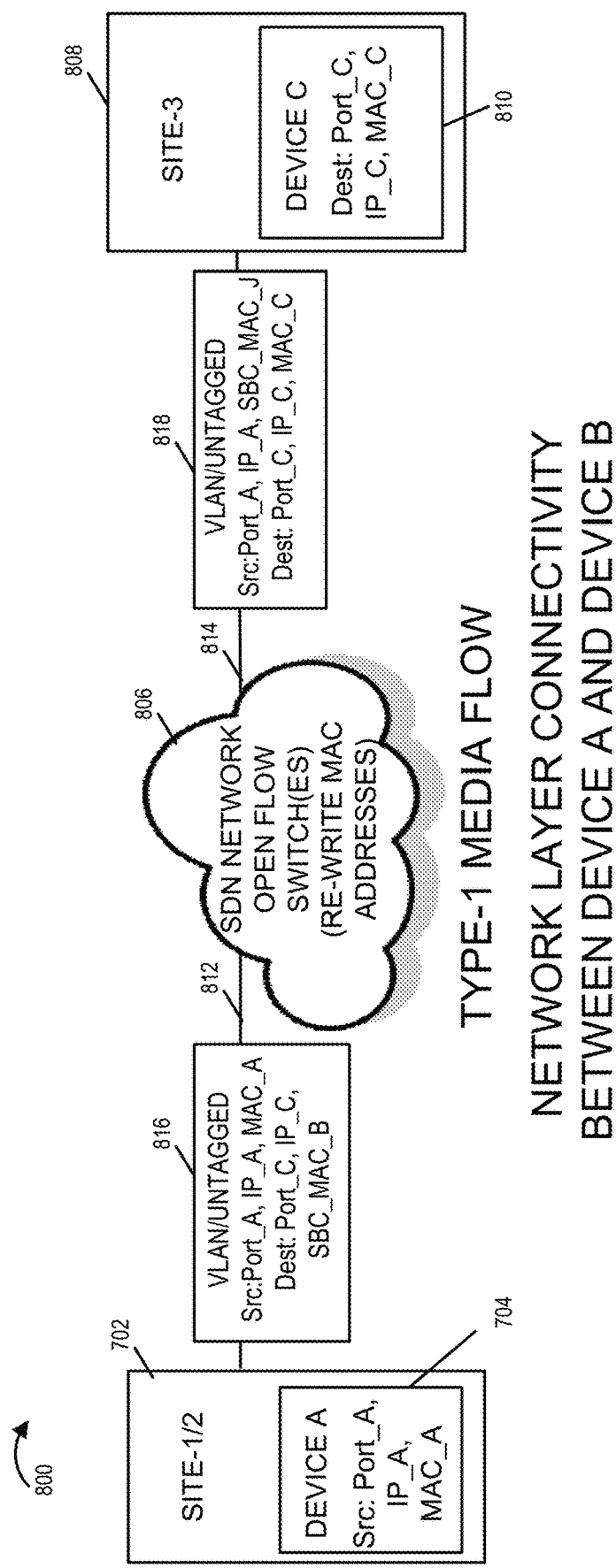
FIG. 8 illustrates another exemplary type-1 media flow in accordance with an embodiment of the present invention.

Diagram 800 of FIG. 8 illustrates a Type-1 flow with layer-3 network layer connectivity. Diagram 800 includes communications device A 704 located at Site-1/2 702. That is communications device A may be either located at Site 1 610 of FIG. 6 or Site 2 612 of FIG. 6. The communications device A 704 is coupled and/or connected to the Site 1 network 610 or the Site 2 network 612. Communications device C 810 is located at Site-3 808. Site-3 808 is Site-3 614 of FIG. 6. The communications device C 810 is coupled and/or connected to the Site-3 network 614. The Site-1 network 610 and Site-3 networks 614 share the same Internet Protocol (IP) address space. The Site-2 network 612 and Site-3 network 614 also share the same Internet Protocol (IP) space. Therefore communication device A 704 and communications device C 810 are directly reachable. That is they are part of the same Internet Protocol network however, in this case the Site-1 and Site 2 networks which share the same Ethernet (physical) network is a different Ethernet network than the Site-3 network 614. The Site-1 and Site 2 networks are connected to the Site-3 network via Layer 2/Layer devices. As a result, the Ethernet Address (i.e., the MAC address will need to be rewritten for a media flow from Site-1/2 to Site 3). In this microflow example, the source address of the communications device A 704 is Port_A, IP_A, MAC_A and the destination address of the communications device C 810 is Port_C, IP_C, MAC_C.

In the diagram 800 a unidirectional media microflow of packets is transmitted from communications device A 704 via communications link 712 to communications device C 810 via SDN programmable switch(es) in the SDN Network 806 and communication link 814. In this example, there is layer 3 network connectivity between the devices in the Site-1 network 610/Site 2 network 612 and the Site 3 network 614.

The unidirectional media microflow is established by the SBC located in the SDN Network 806. The session control signaling for the media session which includes the media microflow is anchored at the SBC. While the session control signaling for the media microflow is anchored at the SBC in the SDN network 806, the media microflow is not anchored at the SBC. The SBC acts as a Back-to-Back User Agent (B2BUA) during the call/media session establishment. As a B2BUA, the SBC receives the SIP Invite with SDP offer message from communications device A and SIP response with SDP answer message from communications device C. The SBC determines from the signaling information for establishing the media flow including the SDP offer and answer messages that the media session to be established from the perspective of packets sent by the device A 704 will include the information VLAN/UNTAGGED, communications device A source information to be used for the media flow is port: Port_A, Internet Protocol address: IP-A, Media Access Control Address (MAC) (i.e., physical address), MAC_A and the destination information of media packets sent from device A 704 to device C 810 is destination port: Port_C, Internet Protocol address: IP-C, Media Access Control Address (MAC) (i.e., physical address), SBC_MAC_B. The SBC is in a trusted relationship with the Site-1 and Site 2 networks 610 and 612 as well as the Site-3 network 808 and has been provided with information on the network topology and connectivity between the devices in the Site-1 and Site-networks 610 and 612 and the devices in the Site-3 network. For example, the SBC may be, configured to include the network topology including the device addresses and connectivity included in the networks. The SBC determines from the network topology information accessible to it and the signaling information to establish the media packet flow which includes the SDP offer and answer messages that communications device A and communications device C have layer 3 network layer connectivity and that the MAC addresses in headers of the received media packets of the media packet flow will need to be rewritten as communications device A 704 and communications device C 810 are in different Ethernet networks. Upon determining that the MAC address rewrites are necessary, the SBC sends instructions and/or information to the SDN controller to configure SDN switches of the SDN network that receive packets identified as including the 6-tuple Src: Port_A, IP_A, MAC_A Dest: Port_C, IP_C, SBC_MAC_B to rewrite the packets MAC headers so that Src: MAC_A is rewritten to be Src: SBC_MAC_J and Dest: SBC_MAC_B is rewritten to be Dest: MAC_C. This is shown in diagram 800 of FIG. 8 with the media data packet 816 of the media microflow transmitted from communications device A 804 to SDN switch(es) in the SDN network 806 including the information VLAN/UNTAGGED Src: Port_A, IP_A, MAC_A Dest: Port_C, IP_C, SBC_MAC_B and the media data packet 818 transmitted from the SDN network 806 switches including the information VLAN/UNTAGGED Src: Port_A, IP_A, SBC_MAC_J Dest: Port_C, IP_C, MAC_C. The programmable switches in this case are programmed to perform a media bypass operation wherein only the MAC addresses are rewritten. In this case the SBC has one media interface to the Site 1/2 Ethernet network 702 in which the SBC_MAC_B address is recognized and another media interface to the Site-3 808 Ethernet network 808 in which the SBC_MAC_J is a MAC address assigned to the SBC. In some embodiments, the SBC sends instructions and/or information to the SDN controller to configure SDN switches of the SDN network that receive packets identified as including the 5-tuple to SDN including Src: Port_A, IP_A, VLAN tag, Dest: Port_C, IP_C to identify the packets instead of a 6-tuple. The 5-tuple excluding the MAC addresses. In such an embodiment, the operator has statically configured in the SBC that trunks that service endpoints in Site-1/2 have direct connectivity. The SBC acts as a gateway for networks that do not have Internet Protocol connectivity. Enterprises that have direct Internet Protocol connectivity are connected via the underlying SDN aware layer-2 network acting as a gateway between the two enterprises. In such cases, the SBC sets up the path using the SDN switches.

In the layer-3 (network layer) connectivity case just discussed and shown in FIG. 8 the source and destination MAC headers are rewritten by the SDN switch(es) to re-direct the flow through the network but the source and destination Port and IP addresses are not rewritten by the SDN switch(es). In this type-1 flow layer-3 connectivity case only MAC headers are rewritten to re-direct the flows through the network. The communications devices or endpoints IP address are directly reachable but they are part of two different networks connected by Layer-2/Layer-3 devices. See for example, the flow 602 in FIG. 6 where UE 2 624 in Site-2 612 sends media packets to UE 3 626 in Site-3 614.

Figure 16:
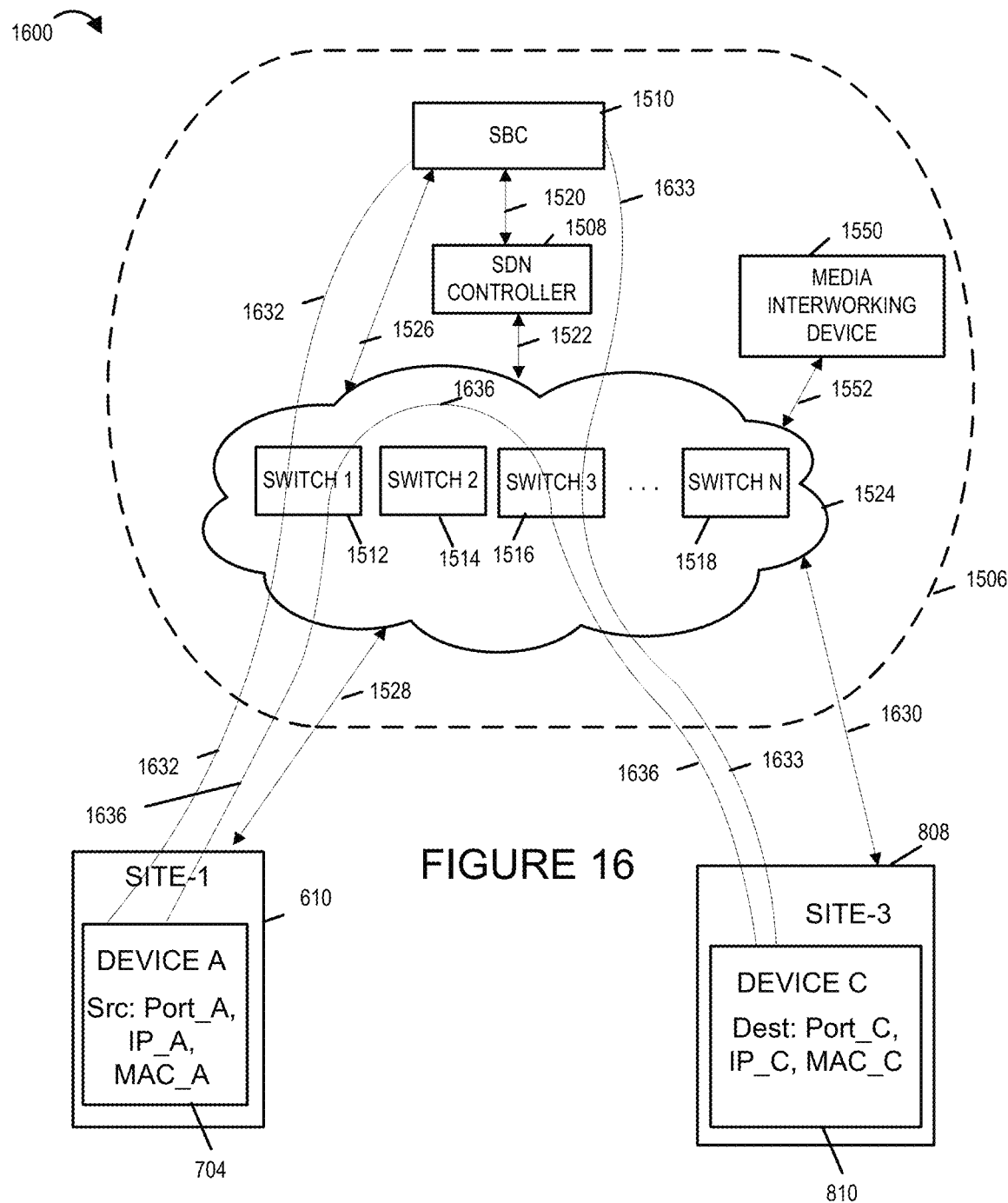
FIG. 16 illustrates an exemplary signaling path and media flow path through an SDN network for the type-1 flow illustrated in FIG. 8.

FIG. 16 illustrates an exemplary system 1600 with exemplary signaling and media flow paths/routes in accordance with an exemplary embodiment of the present invention for a type-1 media flow with layer-3 (network layer) connectivity between the communications endpoints communications device A 704 connected to Site-1 network 610 and communications device C 810 which in this example is connected to Site-3 network 808, e.g., network 614 of system 600 of FIG. 6.

Lines 1632 and 1633 represent signaling traffic communicated between endpoint device A 704 and endpoint device C 810 via switch 1 1512, SBC 1510, switch 3 1516 and communications links 1526, 1528, and 1630. It should be noted that the signaling is terminated at the SBC 1510 which acts as a B2BUA for the signaling session. Line 1636 represents the media flow traffic of packets communicated between endpoint A 704 and endpoint C 810 via switch 1 1512, switch 3 1516 and communications links of the system 1600 including communications links 1528 and 1630. Switch 1 1512 has an interface to Site-1 network 610 and Switch 3 has an interface to the Site-3 network 808. Switch 1 1512 is programmed to provide a media bypass service wherein the switch 1 1512 rewrites the MAC address header of received packets of the media packet flow thereby allowing the media packets of the media packet flow to bypasses the SBC. The media packets of the packet flow do not flow through the SBC but flow through the programmable switches of the SDN network. In this way while the SBC MAC addresses SBC_MAC_B and SBC_MAC_J are used in communicating the packets of the packet flow the packets of the packet flow are not routed through the SBC. The SBC 1510 has provided the micro flow bypass service via programming of the SDN switches by sending instructions/information to the SDN controller 1508 which controls the SDN controller 1508 to send instructions to the SDN Switch(es), e.g., switch 1 1512 to perform the rewrite of the MAC source and destination in media packets that are identified by the SDN switch as belonging to the media packet flow.

Figure 12:
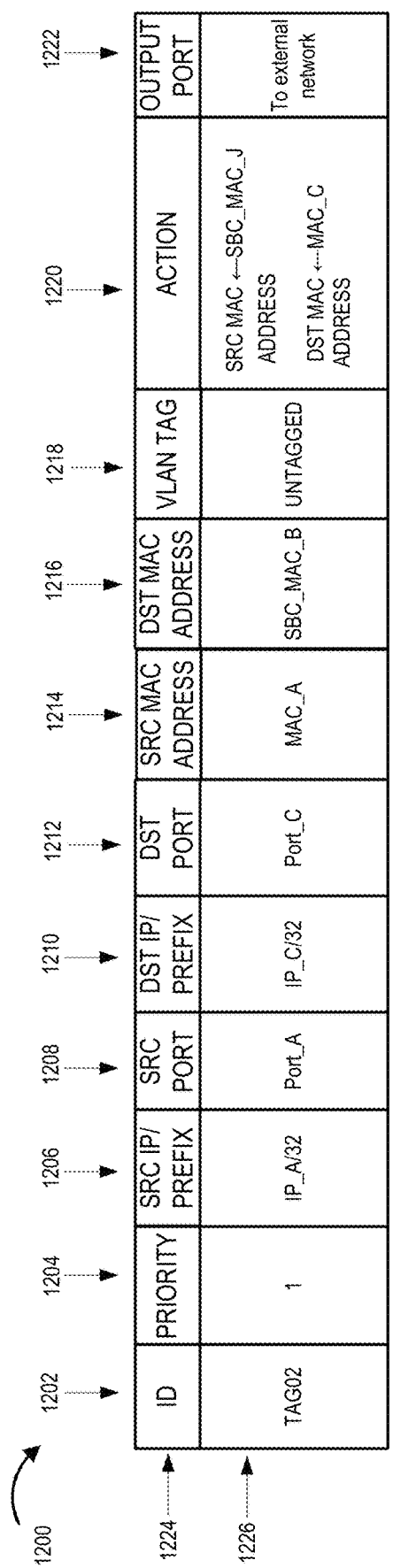
FIG. 12 illustrates exemplary instructions in the form of a flow table entry for a SDN programmable switch for the type-1 media flow illustrated in FIG. 8.

Table 1200 of FIG. 12 illustrates exemplary instructions which when executed by a programmable switch implement a media bypass service in which the source MAC address and destination MAC address are rewritten. The instructions are in the form of a flow table entry that is installed in one or more SDN switch(es) 1512, 1514, 1516, . . . , 1518 of the SDN network 1506 for the media flow from device A 704 to device C 810 illustrated by line 1636 on FIG. 16. The instructions are installed in at least SDN programmable switch 1 1512 which has an interface to the Site-1 network 610 and is connected with switch 3 1516 via the SDN network which has an interface to the Site 3 network 808. The entries for row 1224 of the table are labels or identifiers which are provided for explanatory purposes. These entries identify the information contained in each of the columns. Each row in the table 1200 contains information relating to a specific table entry. In this example only one row 1226 is illustrated but the flow table typically includes multiple rows. The entries in column 1202 includes table entry identifiers. The entries in column 1204 identify the priority/preference to be applied to the table entry. As previously explained in connection with table 1100, when the matching criteria of multiple table entries match the table entry with the highest priority's action is executed and the table entries with the lower priorities do not have their actions executed. The entries in column 1206 are source IP address/prefix numbers to be used for matching against a received packet's source IP address included in the packet's header information. As with table 1100, the IP addresses shown in table 1200 are shown as IPV4 IP addresses which are 32 bits in length. The invention is also applicable to IPV6 IP addressing in which the IP addresses are 128 bits in length. When IPV4 IP address are being matched the prefix is 32 bits; when IPV6 addresses are being matched the prefix is 128 bits. The entries in column 1208 are source port numbers to be used for matching against a received packet's source port information included in the packet's header information. The entries in column 1210 are destination IP address/prefix numbers to be used to match against received destination IP address included in the packet's header information. The entries in column 1212 are destination port numbers to be used to match against a received packet's destination port included in the received packet header information. The entries in column 1214 are source MAC address to be used for matching against a received packet's source MAC address included in the packet's header information. The entries in column 1216 are destination MAC address to be used for matching against a received packet's destination MAC address included in the packet's header information. The entries in column 1218 are VLAN TAG to be used for matching against a received packet's VLAN TAG included in the packet's header information. The entries in column 1220 are actions, e.g., IP address/port rewriting, MAC address rewriting, VLAN TAG rewriting, and packet redirection, and/or packet forwarding, to be taken by the SDN programmable switch when the matching criteria for a flow entry are met and the flow entry has the highest priority of flow table entries with matching criteria, the matching criteria being, e.g., received packet header source IP, source port, source MAC address, destination IP address, destination port, destination MAC address, match the corresponding entries in a flow table entry. The switches use the matching criteria to identify received packets of the media packet flow. In most embodiments the type of protocol is also used as a matching criteria, e.g., UDP or TCP. In this example, the protocol type is UDP and while not shown in the table matching on the protocol type is performed. The use of one or more of the VLAN TAG, source MAC address and destination MAC address is optional and while used in this example are not used in all embodiments as they are not necessary for all embodiments as matching criteria to uniquely identify a media flow. Column 1222 identifies the SDN switch output port on which the received packet after any alterations is to be outputted.

The entry (column 1202, row 1226) states "TAG02," as the entries in row 1226 specify a flow table entry 02. The information contained in row 1226 is a flow table entry installed for SBC 1510 with a flow table entry identifier of TAG02 (column 1202, row 1226), priority/preference of 1 (column 1204, row 1226), matching criteria Source IP address/prefix of IP-A/32 (column 1206, row 1226) which is the IP address of device A to be used for sending media packets of the media flow per the agreement in the SDP Offer and Answer exchange, matching criteria source port number of Port_A (column 1208, row 1226) which is the port of device A to be used for sending media packets of the media flow per the agreement in the SDP Offer and Answer exchange, matching criteria of destination IP address/prefix of IP_C/32 (column 1210, row 1226) which is the IP address of the media flow destination device C 810 per the agreement reached in the SDP offer and answer exchange, matching criteria of destination port number of Port_C indicating the port of device C to be used to receive packets of the media flow per the agreement reached in the SDP offer and answer exchange (column 1212, row 1226), matching criteria Source MAC Address of MAC_A (column 1214, row 1226) which is the MAC address of device A, matching criteria Destination MAC Address of SBC_MAC_B (column 1216, row 1226) which is the MAC address of SBC interface to the Site-1 610, matching criteria VLAN TAG of UNTAGGED (column 1218, row 1226), Action (column 1220, row 1226) of rewrite Source MAC address to be SBC_MAC_J which is the SBC MAC address of the SBC interface to Site-3 network 808 and rewrite the Destination MAC address to be MAC_C the MAC address of device C 810; and output port (column 1222, row 1226) with entry of "to-external-network" indicating that the received packet is to be outputted to the external network from the SDN switch output port that is connected to the external-network (column 1222, row 1226) the external network being Site-3 network 808.

The TAG02 table entry rule/instruction provides a micro flow bypass service for a type-1 media packet flow where the endpoint devices (devices A and C) of the media packet flow having layer 1 (data link layer connectivity). When a SDN switch with this table entry, e.g., programmable switch 1 1512, receives a packet from device A 704 belonging to the media packet flow, the SDN switch will match the source IP address in the packet header which will be IP-A to the source IP-A/32 (IPV4 32 bit address) in column 1206, row 1226 and find it matches; the SDN switch will match the source port in the packet which will be Port_A to the Port_A entry in column 1208, row 1226 and find a match; the SDN switch will match the destination IP address in the packet header which will be IP_C to the destination IP address entry IP_C/32 entry in column 1210, row 1226 and find a match; the SDN switch will match the source port in the packet header which is Port_A to the entry in column 1212, row 1226 which is Port_A and find a match; the SDN switch will match the source MAC address in the packet header which will be MAC_A to the source MAC address entry in column 1214, row 1226 which is MAC_A and find a match; the SDN switch will match the destination MAC address in the packet header which will be SBC_MAC_B to the destination MAC address entry column 1216, row 1226 which is SBC-_MAC_B and find a match; the SDN switch will match the VLAN TAG in the packet header which is UNTAGGED to the entry in column 1218, row 1226 which is UNTAGGED and find a match. With the matching criteria met the SDN switch will perform the action described in column 1220, row 1226 when the flow entry has the highest priority/preference of matching flow entries in the table. In this example, the column 1204, 1226 priority/precedence entry is 1 and as this is the only entry in the flow table it has the highest value. The action that is then performed by the SDN switch, i.e. Switch 1 1512, is that of rewrite the MAC source address and MAC destination address. In some embodiments, the Action may include instructions not to rewrite the source IP address, source port number, the destination IP address, the destination port number, the VLAN TAG, the protocol type but in most switches this will not be necessary as it is a default operation not to modify these fields of the packet unless instructed to but instead pass the packet through without rewrites on these fields. Once the MAC source and destination address have been rewritten the SDN switch outputs the packet toward the destination device C in the external network as identified in column 1222, row 1226. The SDN controller will have installed routing table instructions in the switch to forward the rewritten packet to switch 3 1516 which is connected to the Site-3 network 808 via communications link 1530 and has an interface to the Site-3 network 808.

In this case the site-1 network 610 and site-3 network 808 share the same Internet Protocol space but are different Ethernet networks wherein the device A MAC address is not recognized in the Site-3 network 808 and the MAC_A address is not recognized in the Site-1 610 Ethernet network. Switch 1 1512 implements the media bypass microflow service by passing the received packets of the media flow toward the destination device C after rewriting only the MAC source and destination addresses in the packet header.

Figure 9:
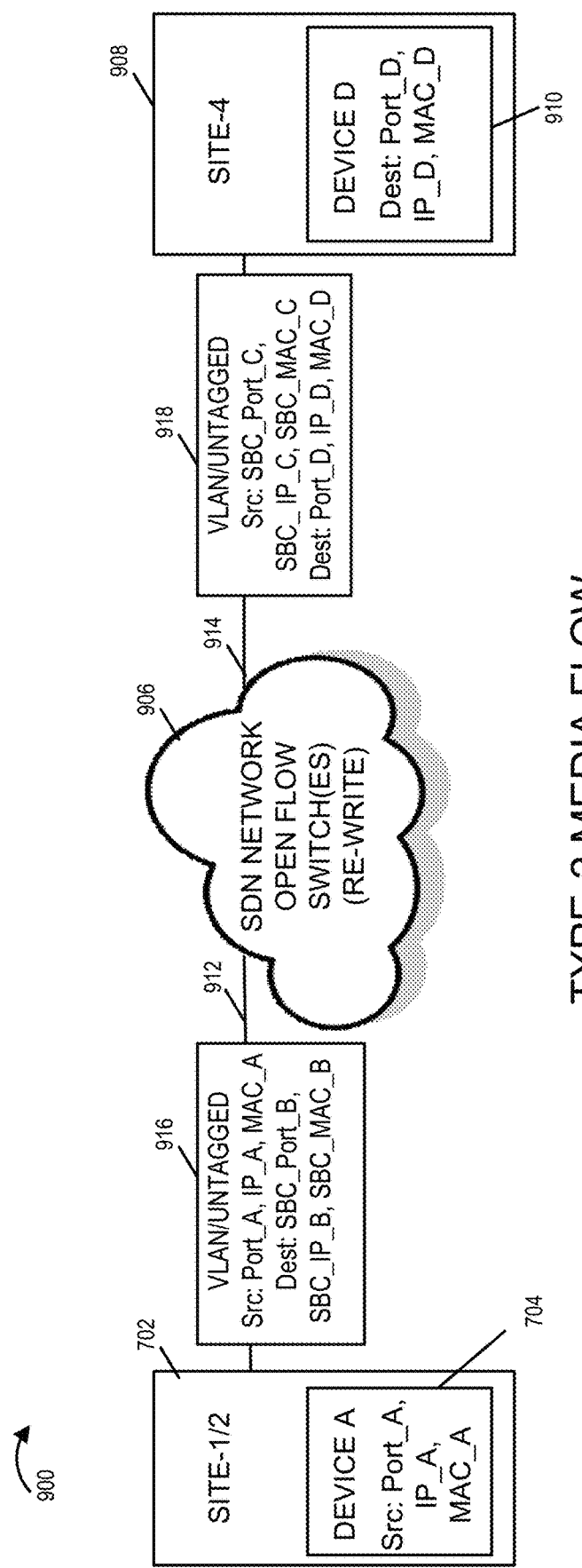
FIG. 9 illustrates an exemplary type-2 media flow in accordance with an embodiment of the present invention.

Diagram 900 of FIG. 9 illustrates a Type-2 flow in which the media services provided include topology hiding with Internet Protocol connectivity (e.g., Network Address and Port Translation functionality). In this type-2 flow the SBC, e.g., SBC 1510 of FIG. 17 programs the SDN switches via the SDN controller 1508 to rewrite the Internet Protocol header to modify the IP addresses/transport port and layer-2 (data link layer) headers.

Diagram 900 includes communications device A 704 located at Site-1/2 702. As previously discussed that is communications device A may be either located at Site 1 610 of FIG. 6 or Site 2 612 of FIG. 6. The communications device A 704 is coupled and/or connected to the Site 1 network 610 or the Site 2 network 612. Communications device D 910 is located at Site-4 908. That is communications device D 910 is located at Site-4 616 of FIG. 6. The communications device D 910 is coupled and/or connected to the Site-4 network 616. The communication device A 704 and communications device D 910 do not have directly addressable IP addresses, they do not share the same IP address space and are not directly reachable from one another. The Site-1 network 610 and Site-4 networks 616 do not share the same Internet Protocol (IP) address space. The Site-2 network 612 and Site-4 network 616 also do not share the same Internet Protocol (IP) space. That is they are not part of the same Internet Protocol network.

In the diagram 900 a unidirectional media microflow of packets is transmitted from communications device A 704 via communications link 912 to communications device D 910 via SDN programmable switch(es) in the SDN Network 906 and communication link 914.

The unidirectional media microflow is established by the SBC located in the SDN Network 906. The session control signaling, e.g., SIP signaling, for the media session which includes the media microflow is anchored at the SBC. While the session control signaling for the media microflow is anchored at the SBC in the SDN network 906, the media microflow is not anchored at the SBC. The SBC acts as a Back-to-Back User Agent (B2BUA) during the call/media session establishment. As a B2BUA, the SBC receives the session control signaling including SIP Invite message with SDP offer message from communications device A 704 and SIP response message with SDP answer message from communications device D 910.

The SBC determines from the session signaling information for establishing the media flow including the SDP offer and answer messages that the media session to be established from the perspective of packets sent by the device A 704 will include source information to be used for the media flow is port: Port_A, Internet Protocol address: IP-A, Media Access Control Address (MAC) (i.e., physical address): MAC_A and the destination information to be used for packets of the flow sent from device A 704 will be destination port: SBC_Port_B, Internet Protocol address: SBC_IP_B, Media Access Control Address (MAC) (i.e., physical address): SBC_MAC_B and VLAN/UNTAGGED.

The SBC is in a trusted relationship with the Site-1 and Site 2 networks 610 and 612 as well as the Site-4 network 908 and has been provided with information on the network topology and connectivity between the devices in the Site-1 and Site-2 networks 610 and 612 and the devices in the Site-4 network 616. For example, the SBC may be, configured to include the network topology including the device addresses and connectivity included in the networks. The SBC determines from the network topology information accessible to it and the signaling information to establish the media packet flow which includes the SDP offer and answer messages that communications device A 704 and communications device D 910 will require topology hiding/NAPT functionality wherein the SBC will use IP addresses, ports, MAC addresses allocated/assigned to the SBC to perform topology hiding/NAPT functionality necessary to establish a connection between communications device A 704 and communications device D 910.

Upon determining that topology hiding/NAPT functionality is necessary, the SBC sends instructions and/or information to the SDN controller that control the SDN controller to configure SDN switches of the SDN network 906 that receive packets with the 6-tuple Src: Port_A, IP_A, MAC_A Dest: SBC_Port_B, SBC_IP_B, SBC_MAC_B are rewritten to be Src: SBC_Port_C, SBC_IP_C, SBC_MAC_C Dest: Port_D, IP_D, MAC_D. This is shown in diagram 900 of FIG. 9 with the media data packet 916 of the media microflow transmitted from communications device A 904 to SDN switch(es) in the SDN network 906 including the information VLAN/UNTAGGED Src: Port_A, IP_A, MAC_A Dest: SBC_Port_B, SBC_IP_B, SBC_MAC_B and the media data packet 918 transmitted from the SDN network 906 switch(es) including the information VLAN/UNTAGGED Src: SBC_Port_C, SBC_IP_C, SBC_MAC_C Dest: Port_D, IP_D, MAC_D.

In the type-2 flow case just discussed and shown in FIG. 9 source and destination port, IP address and MAC address header information is rewritten by the SDN switch receiving the packet to perform topology hiding/NAPT functionality without the media flow being anchored on the SBC. This makes the SDN network more efficient and faster as the media packets of the microflow bypass the SBC as the media services are performed by the underlying SDN switches which have been programmable by the SBCs via the SDN network controller to perform the requested media services. It relieves congestion at the SBC and allows the SBC to focus its resources on providing signaling services, e.g., SIP signaling processing, to support additional call/media sessions. An example of a type-2 media flow is flow 603 shown in FIG. 6. While the example of the type-2 media flow in FIG. 9 was a case where the origination device, device A 704, and destination device, device D 910, did not share the same IP address space, in the type-2 case where the origination device and destination device do share the same IP address but do have different VLAN tags, the SDN switches are programmed to rewrite the VLAN TAG as required. In cases where the origination and destination devices of the flow require VLAN TAG rewrite where the IP address space is not shared the instructions programmed on the SDN switch(es) will also rewrite the VLAN TAG. Though not shown the type of protocol is also typically used to identify the media flow in this example the type of flow is UDP.

Figure 17:
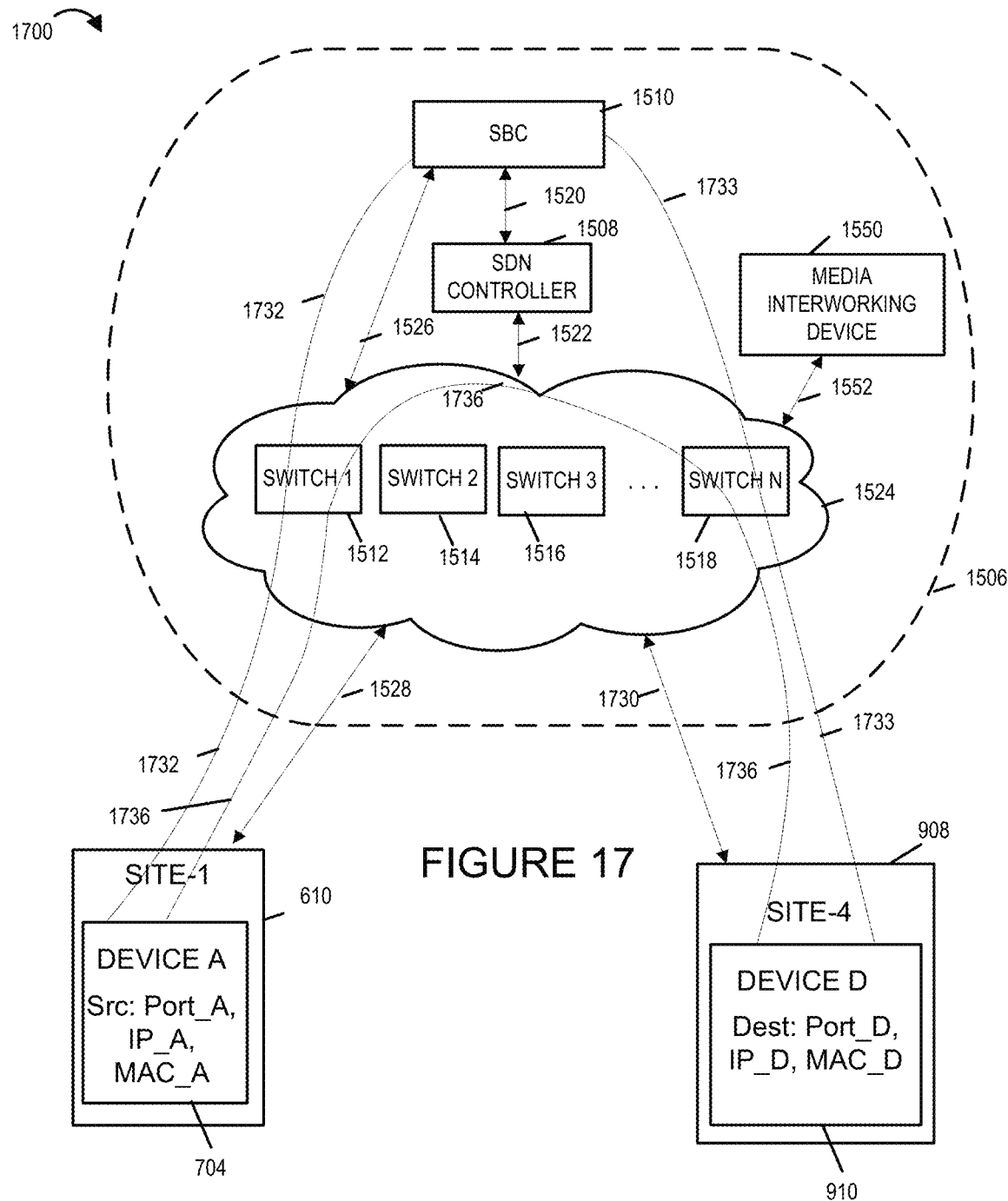
FIG. 17 illustrates an exemplary signaling path and media flow path through an SDN network for the type-2 flow illustrated in FIG. 9.

FIG. 17 illustrates an exemplary system 1700 with exemplary signaling and media flow paths/routes in accordance with an exemplary embodiment of the present invention for a type-2 media flow where the endpoint Internet Protocol address spaces are not reachable directly. The communications endpoints communications device A 704 connected to Site-1 network 610 and communications device D 910 which in this example is connected to Site-4 network 908, e.g., network 616 of system 600 of FIG. 6.

Lines 1732 and 1733 represent session control signaling traffic (e.g., SIP traffic) communicated between endpoint device A 704 and endpoint device D 910 via switch 1 1512, SBC 1510, switch N 1518 and communications links 1526, 1528, and 1730. It should be noted that the signaling is terminated at the SBC 1510 which acts as a B2BUA for the signaling session. Line 1736 represents the media flow traffic of packets communicated between endpoint device A 704 and endpoint D 910 via switch 1 1512, switch N 1518 and communications links of the system 1500 including communications links 1528 and 1730. Switch 1 1512 is programmed to provide a media relay service wherein the switch 1 1512 rewrites the source IP address, source port and source MAC address and destination IP address, destination port number and destination MAC address of received packets of the media packet flow thereby allowing the media packets of the media packet flow to bypass the SBC. The media packets of the packet flow do not flow through the SBC but flow through the programmable switches of the SDN network which have been programmable to provide the media relay services using IP addresses, port, and MAC addresses supplied by the SBC. In this way while the SBC allocated/assigned SBC-IP_B, SBC_Port_B, SBC_MAC_B and SBC-IP_C, SBC_Port_C and SBC_MAC_C are used in communicating the packets of the media packet flow the packets of the packet flow are not routed through the SBC. The SBC 1510 has provided the micro flow relay service via programming of the SDN switches by sending instructions/information to the SDN controller 1508 which controls the SDN controller 1508 to send instructions to the SDN Switch(es), e.g., switch 1 to perform the rewrite of the source and destination IP addresses, port number and MAC addresses in media packets that are identified by the SDN switch as belonging to the media packet flow. The instructions include information by which the SDN switches can identify the flow. In many instances the identifying information includes the source IP address, port and MAC address and destination IP address, port and MAC address of the flow and the protocol type used for the flow which in our example is UDP. As previously discussed the VLAN TAG may also be used in identifying the flow. As also previously discussed the VLAN TAG may, and in some embodiments, is rewritten to allow for the communications of packets from the origination device to the destination device.

Figure 13:
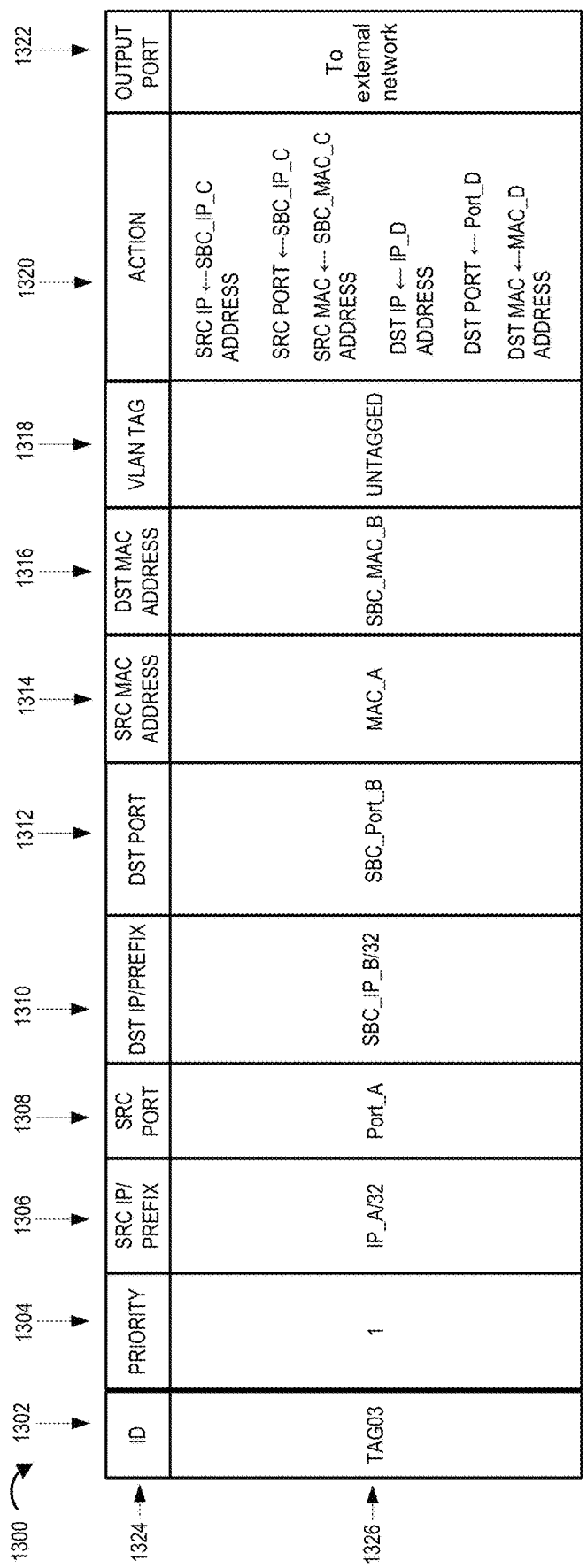
FIG. 13 illustrates exemplary instructions in the form of a flow table entry for a SDN programmable switch for the type-2 media flow illustrated in FIG. 9.

Table 1300 of FIG. 13 illustrates exemplary instructions which when executed by a programmable switch implement a media relay service in which the source IP address, source port, source MAC address and destination IP address, destination port, and destination MAC address are rewritten. The instructions are in the form of a flow table entry that is installed in one or more SDN switch(es) 1512, 1514, 1516, . . . , 1518 of the SDN network 1506 for the media flow from device A 704 to device D 910 illustrated by line 1736 on FIG. 17. The instructions are installed in at least SDN programmable switch 1 1512 which has an interface to the Site-1 network 610 and is connected with switch N via the SDN network which has an interface to the Site 4 network 908. Though switch N has been used for explanatory purposes it should be understood that if switch 3 1516 or one of the other switches in the SDN network has an interface to the Site-4 network then that switch may be used in the media path instead of switch N 1518. The entries for row 1324 of the table are labels or identifiers which are provided for explanatory purposes. These entries identify the information contained in each of the columns. Each row in the table 1300 contains information relating to a specific table entry. In this example only one row 1326 is illustrated but the flow table as previously discussed typically includes multiple rows. The entries in column 1302 includes table entry identifiers. The entries in column 1304 identify the priority/preference to be applied to the table entry. As previously explained in connection with table 1100, when the matching criteria of multiple table entries match the table entry with the highest priority's action is executed and the table entries with the lower priorities do not have their actions executed. The entries in column 1306 are source IP address/prefix numbers to be used for matching against a received packet's source IP address included in the packet's header information. As with table 1100, the IP addresses shown in table 1300 are shown as IPV4 IP addresses which are 32 bits in length. The invention is also applicable to IPV6 IP addressing in which the IP address are 128 bits in length. When IPV4 IP address are being matched the prefix is 32 bits; when IPV6 addresses are being matched the prefix is 128 bits. The entries in column 1308 are source port numbers to be used for matching against a received packet's source port information included in the packet's header information. The entries in column 1310 are destination IP address/prefix numbers to be used to match against received destination IP address included in the packet's header information. The entries in column 1312 are destination port numbers to be used to match against a received packet's destination port included in the received packet header information. The entries in column 1314 are source MAC address to be used for matching against a received packet's source MAC address included in the packet's header information. The entries in column 1316 are destination MAC address to be used for matching against a received packet's destination MAC address included in the packet's header information. The entries in column 1318 are VLAN TAG to be used for matching against a received packet's VLAN TAG included in the packet's header information. The entries in column 1320 are actions, e.g., IP address/port rewriting, MAC address rewriting, VLAN TAG rewriting, and packet redirection, and/or packet forwarding, to be taken by the SDN programmable switch when the matching criteria for a flow entry are meet and the flow entry has the highest priority of flow table entries with matching criteria, the matching criteria being, e.g., received packet header source IP, source port, source MAC address, destination IP address, destination port, destination MAC address, match the corresponding entries in a flow table entry. The switches use the matching criteria to identify received packets of the media packet flow. In most embodiments the type of protocol is also used as a matching criteria, e.g., UDP or TCP. In this example, the protocol type is UDP and while not shown in the table matching on the protocol type is performed. The use of one or more of the VLAN TAG, source MAC address and destination MAC address as previously explained is optional and while used in this example are not used in all embodiments as they are not necessary for all embodiments as matching criteria to uniquely identify a media flow. Column 1322 identifies the SDN switch output port on which the received packet after any alterations is to be outputted.

The entry (column 1302, row 1326) states "TAG03," as the entries in row 1326 specify a flow table entry 03. The information contained in row 1326 is a flow table entry installed for SBC 1510 with a flow table entry identifier of TAG03 (column 1302, row 1326), priority/preference of 1 (column 1304, row 1326), matching criteria Source IP address/prefix of IP-A/32 (column 1306, row 1326) which is the IP address of device A to be used for sending media packets of the media flow per the agreement in the SDP Offer and Answer exchange, matching criteria source port number of Port_A (column 1308, row 1326) which is the port of device A to be used for sending media packets of the media flow per the agreement in the SDP Offer and Answer exchange, matching criteria of destination IP address/prefix of SBC_IP_B/32 (column 1310, row 1326) which is the destination IP address allocated to the SBC that is to be used by device A when sending packets of the flow toward the destination device D per the agreement reached in the SDP offer and answer exchange, matching criteria of destination port number is SBC_Port_B indicating the SBC port agreed to be included as the destination port in packets sent from the flow origination device A 704 as part of the media flow per the agreement reached in the SDP offer and answer exchange (column 1312, row 1326), matching criteria Source MAC Address of MAC_A (column 1314, row 1326) which is the MAC address of device A, matching criteria Destination MAC Address of SBC_MAC_B (column 1316, row 1326) which is the MAC address of SBC interface to the Site-1 610, matching criteria VLAN TAG of UNTAGGED (column 1318, row 1326), Action (column 1320, row 1326) is to rewrite: (1) Source IP address to be SBC_IP_C, (2) Source port to be SBC-IP_C, and (3) Source MAC address to SBC-MAC_C which are the SBC IP address, port and MAC address of the SBC interface to Site-4 network 908 and to rewrite the (1) the Destination IP address to IP_D, (2) Destination port to Port_D, (3) Destination MAC address to MAC_D which are the destination address information for the device D 910 in the Site-4 network which was agreed to be used as the receiving address and port information for packets of the media flow; and output port (column 1322, row 1326) with entry of "external network" indicating that the received packet is to be outputted to the external network from the SDN switch output port that is connected to the external-network (column 1322, row 1326) the external network being Site-4 network 908. This will be done via switch N 1518 to which the modified packet is routed from switch 1 1512 to be outputted to the Site-4 network. The SDN network controller having configured the switch 1 1512 with routing instructions to route packets for Site-4 network to the network via switch N 1518.

The TAG03 table entry rule/instruction provides a micro flow relay service for a type-2 media packet flow wherein the micro flow relay service provides topology hiding with IP connectivity. When a SDN switch with this table entry, e.g., programmable switch 1 1512, receives a packet from device A 704 belonging to the media packet flow, the SDN switch will match the source IP address in the packet header which will be IP-A to the source IP-A/32 (IPV4 32 bit address) in column 1306, row 1326 and find it matches; the SDN switch will match the source port in the packet which will be Port_A to the Port_A entry in column 1308, row 1326 and find a match; the SDN switch will match the destination IP address in the packet header which will be SBC_IP_B to the destination IP address entry SBC-IP_B/32 entry in column 1310, row 1326 and find a match; the SDN switch will match the destination port in the packet which will be SBC_Port_B to the entry in column 1312, row 1326 which is SBC_Port_B and will find a match, the SDN switch will match the source MAC address in the packet header which will be MAC_A to the source MAC address entry in column 1314, row 1326 which is MAC_A and find a match; the SDN switch will match the destination MAC address in the packet header which will be SBC_MAC_B to the destination MAC address entry column 1316, row 1326 which is SBC_MAC_B and find a match; the SDN switch will match the VLAN TAG in the packet header which is UNTAGGED to the entry in column 1318, row 1326 which is UNTAGGED and find a match. With the matching criteria met the SDN switch will perform the action described in column 1320, row 1326 when the flow entry has the highest priority/preference of matching flow entries in the table. In this example, the column 1304, 1326 priority/precedence entry is 1 and as this is the only entry in the flow table it has the highest value. The action that is then performed by the SDN switch, i.e. Switch 1 1512, is that of rewrite the source IP address, port and MAC address and the destination IP address, port and MAC address. As previously explained in connection with the media bypass service, in some embodiments, the Action may also include instruction to rewrite the VLAN TAG if necessary. Once the source and destination information of the packet header has been rewritten the SDN switch outputs the packet toward the destination device D 910 in the external network as identified in column 1322, row 1326. The SDN controller will have installed routing table instructions in the switch to forward the rewritten packet to switch N 1518 which is connected to the Site-4 network 908 via communications link 1530 and has an interface to the Site-4 network 808.

In this case device A 704 in site-1 network 610 and device D 910 in site-4 network 908 do not share the same Internet Protocol space and are not directly reachable. The media packet flow between the two devices is a type-2 media packet flow. Switch 1 1512 implements the media relay microflow service by passing the packets of the media flow received from device A 704 toward the destination device D 910 after rewriting the source IP address, port and MAC address and the destination IP address, port and MAC address in the packet header. The media relay micoflow service provides topology hiding with IP connectivity (e.g., NAPT functionality).

Figure 10:
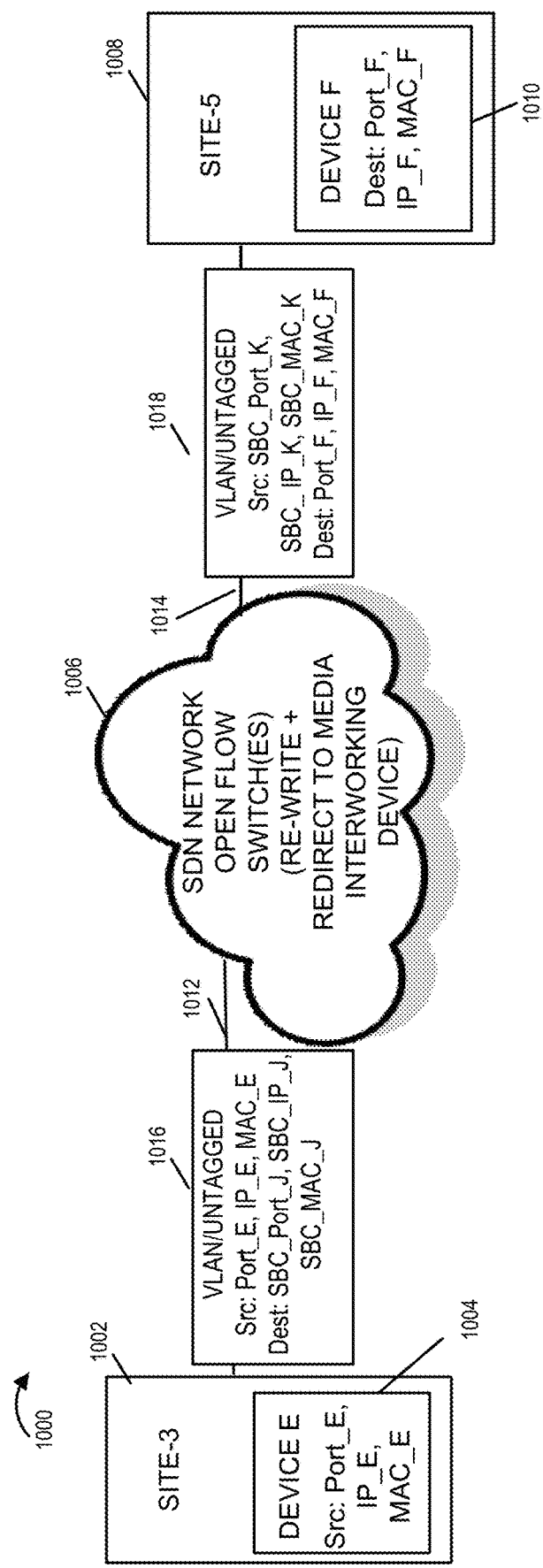
FIG. 10 illustrates an exemplary type-3 media flow in accordance with an embodiment of the present invention.

Diagram 1000 of FIG. 10 illustrates a Type-3 flow in which the media services provided include topology hiding with Internet Protocol connectivity (e.g., Network Address and Port Translation functionality) and with media interworking such as for example providing transcoding functionality. In this type-3 flow the SBC programs the SDN switches via the SDN controller to rewrite the IP to modify the IP addresses/transport port and layer-2 headers towards a media interworking device, such as for example a device that provides transcoding functionality. In this example the media interworking device is sometimes also referred to as a media aware device. The media interworking device is the same as or similar to the media aware device 650 in FIG. 6.

Diagram 1000 includes communications device E 1004 located at Site-3 1002. That is communications device is located at Site 3 614 of FIG. 6. The communications device E 1004 is coupled and/or connected to the Site 3 network 614. Communications device F 1010 is located at Site-5 1008. That is communications device F 1010 is located at Site-5 618 of FIG. 6. The communications device F 1010 is coupled and/or connected to the Site-5 network 618. The communication device E 1004 and communications device F 1010 do not have directly addressable IP addresses, they do not share the same IP address space and are not directly reachable from one another. The Site-3 network 614 and Site-5 networks 618 do not share the same Internet Protocol (IP) address space. That is they are not part of the same Internet Protocol network.

In the diagram 1000 a unidirectional media microflow of packets is transmitted from communications device E 1004 via communications link 1012 to communications device E 1010 via SDN programmable switch(es) in the SDN Network 1006 and communication link 1014.

The unidirectional media microflow is established by the SBC located in the SDN Network 1006. The session control signaling for the media session which includes the media microflow is anchored at the SBC. While the session control signaling for the media microflow is anchored at the SBC in the SDN network 1006, the media microflow is typically not anchored at the SBC. The media microflow however is anchored at a media interworking device which in this example is a separate device from the SBC. In some embodiments, the SBC may be the media interworking device that will provide the media interworking services. In such a case the media microflow is anchored at the SBC as it also provides the media interworking service.

The SBC acts as a Back-to-Back User Agent (B2BUA) during the call/media session establishment. As a B2BUA, the SBC receives the signaling messages including a SIP Invite with SDP offer message from communications device E 1004 and SIP response message with SDP answer message from communications device F 1010. The SBC determines from the session establishment signaling messages including the SDP offer and answer exchange and in cases the network topology that the media session to be established from the perspective of packets sent by the device E 1004 will require topology hiding and media interworking, e.g., transcoding. The communications devices 1004 and 1010 are using different codecs.

The SBC is in a trusted relationship with the Site-3 network 1002 as well as the Site-5 network 1008 and has been provided with information on the network topology and connectivity between the devices in the Site-3 network 1002, e.g., Site-3 network 614, and the devices in the Site-5 network 1008, e.g., Site-5 network 618. For example, the SBC may be, configured to include the network topology including the device addresses and connectivity included in the networks. The SBC determines from the network topology information accessible to it and the signaling information to establish the media packet flow which includes the SDP offer and answer messages that media flow between communications device E 1004 and communications device F 1010 will require topology hiding/NAPT functionality wherein the SBC will use IP addresses, ports, MAC addresses allocated to the SBC to perform topology hiding/NAPT functionality necessary to establish a connection between communications device E 1004 and communications device F 1010. Based on the SDP offer and answer exchange, the SBC also determines that media interworking transcoding will be required as the communications device E 1004 and communications device F 1010 are using different codecs and that the packets of the media microflow will need to be re-directed to a media interworking device (MID) in the SDN network which will provide the media interworking transcoding services.

Upon determining that topology hiding/NAPT functionality and redirection to a media interworking device is required, the SBC sends instructions and/or information to the SDN controller to configure SDN switches of the SDN network 1006 that receive packets with the 6-tuple Src: Port_E, IP_E, MAC_E Dest: SBC_Port_J, SBC_IP_J, SBC_MAC_J are rewritten to Src: SBC_Port_G1, SBC_IP_G, SBC_MAC_G Dest: MID_Port_H1, MID_IP_H, MID_MAC_H and directed to the media interworking device in the SDN network having address MID_Port H1, MID_IP_H and MID_MAC_H for receiving media packets. Also the SBC sends instructions and/or information to the SDN controller to configure SDN switches of the SDN network 1006 to rewrite packets received with the 6-tuple Src: MID_Port_H2, MID_IP_H, MID_MAC_H Dest: SBC_Port G2, SBC_IP_G, SBC_MAC_G to be rewritten to Src: SBC_Port_K, SBC_IP_K, SBC_MAC_K Dest: Port_F, IP_F, MAC_F and directed to communications device E 1010.

In this type-3 media microflow example, the source address of the communications device E 1004 is Port_E, IP_E, MAC_E and the destination address of the communications device E 1010 is Port_F, IP_F, MAC_F. The SBC address information for the SBC interface to Site-3 network 1002 facing the communications device E 1004 is SBC_Port_J, SBC_IP_J, SBC_MAC_J. The SBC interface address information facing the media interworking device is SBC_Port_G1, SBC_IP_G, SBC_MAC_G for sending packets and SBC_Port_G2, SBC_IP_G, SBC_MAC_G for receiving packets from the media interworking device. The SBC interface address information facing the communications device E is SBC-Port_K, SBC_IP_K, SBC_MAC_K. The media interworking device address information for the interface facing the SBC is MID_Port_H1, MID_IP_H, MID_MAC_H for receiving packets from the SBC and MID_Port_H2, MID_IP_H, MID_MAC_H for transmitting packets to the SBC. The SDN switches are programmed to bypass the SBC on packets received from the communications device E 1004 and send the packets to the media interworking device after rewriting the header information so it appears to the media interworking device that the packets came from the SBC. The media interworking device after performing its media interworking services, e.g., transcoding, transmits the packets back toward the SBC using the SBC interface address SBC_Port_G2, SBC_IP_G, SBC_MAC_G. When the packets from the media interworking device are received by an SDN switch the header information is rewritten so that the packets are sent to the communications device 1010 with source address information rewritten to appear as if the packets were from the SBC, i.e., SBC-Port_K, SBC_IP_K, SBC_MAC_K which is the SBC allocated/assigned interface to the Site-5 network 1008.

This is shown in diagram 1000 of FIG. 10 with the media data packet 1016 of the media microflow transmitted from communications device E 1004 to SDN switch(es) in the SDN network 1006 including the information VLAN/UNTAGGED Src: Port_E, IP_E, MAC_E Dest: SBC_Port_J, SBC_IP_J, SBC_MAC_J and the media data packet 1018 transmitted from the SDN network 1006 switches after transcoding has occurred including the information VLAN/UNTAGGED Src: SBC_Port_K, SBC_IP_K, SBC_MAC_K Dest: Port_F, IP_F, MAC_F.

In the type-3 flow example just discussed and shown in FIG. 10 the SDN switches are program by the SBC via the SDN controller to rewrite the IP to modify the IP addresses/transport port and layer-2 headers toward a media interworking device which in this example is a device that provides transcoding services and then rewrite the IP to modify the IP addresses/transport port and layer-2 headers of the packets transmitted from the media interworking device to the SBC after media processing, i.e., transcoding of the media, by the media interworking device so that the media processed packets are transmitted to the communications device E 1010 with a source address allocated/assigned to the SBC. An example of a type-3 media flow is flow 604 shown in FIG. 6. Though not shown the type of protocol of the media flow is also typically used to identify the media flow and in this example the type of flow is UDP.

Figure 18:
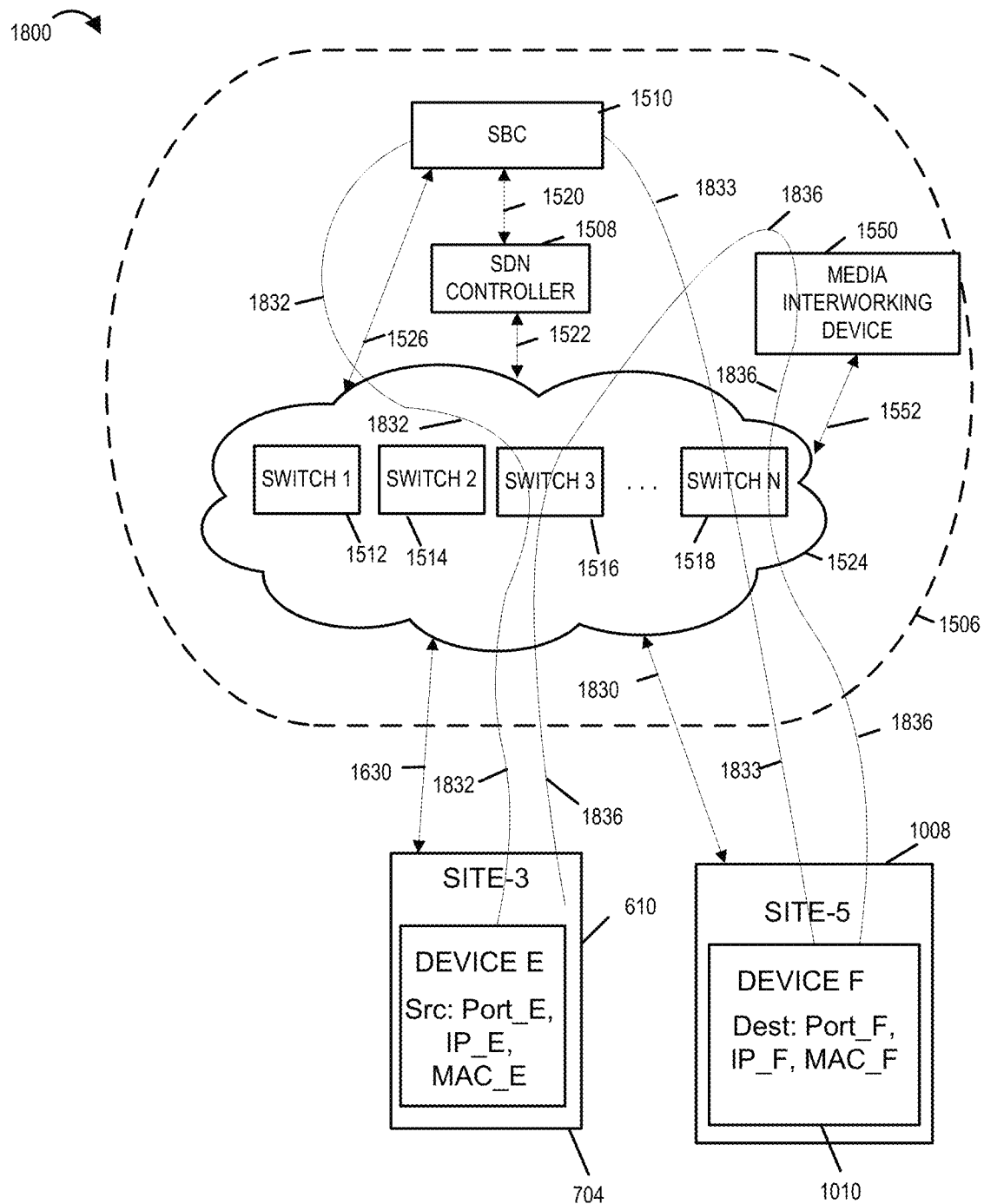
FIG. 18 illustrates an exemplary signaling path and media flow path through an SDN network for the type-3 flow illustrated in FIG. 10.

FIG. 18 illustrates an exemplary system 1800 with exemplary signaling and media flow paths/routes in accordance with an exemplary embodiment of the present invention for a type-3 media flow where the endpoint Internet Protocol address spaces are not reachable directly and the media of the packets of the media packet flow require media interworking in this case transcoding as the endpoint devices device E 1004 and device F 1010 are using different codecs. The communications endpoints communications device E 1004 connected to Site-3 network 1002 which may be the Site-3 network 614 of FIG. 6 and communications device F 1010 which in this example is connected to Site-5 network 1008, e.g., network 618 of system 600 of FIG. 6.

Lines 1832 and 1833 represent session control signaling traffic (e.g., SIP traffic) communicated between endpoint device E 1004 and endpoint device F 1010 via switch 3 1516, SBC 1510, switch N 1518 and communications links 1630, 1526, and 1730. It should be noted that the signaling is terminated at the SBC 1510 which acts as a B2BUA for the signaling session. Line 1736 represents the media flow traffic of packets communicated between endpoint device E 1004 and endpoint F 1010 via switch 3 1516, media interworking device 1530, switch N 1518 and communications links of the system 1800 including communications links 1630, 1552 and 1830. Switch 3 1516 is programmed to provide a media interworking service wherein the switch 3 1516 rewrites the source IP address, source port and source MAC address and destination IP address, destination port number and destination MAC address of received packets of the media packet flow to redirect the media packets of the media packet flow to an media interworking device for media processing, e.g., transcoding. Switch N 1518 is programmed by the SBC via the SDN network controller to rewrite the source IP address, source port, source MAC address and destination IP address, destination port and destination MAC address of packets received from the media interworking device including the transcoded data and send the packets to the destination device. This media interworking service provides topology hiding and media interworking, e.g., transcoding of the media, without requiring the SBC to host the media packets of the media packet flow. Instead while the SDN switches utilize source address and destination information allocated/assigned to the SBC (e.g., IP and MAC addresses and port numbers), the media packets of the media packet flow are able to bypass the SBC. The media packets of the packet flow do not flow through the SBC but flow through the programmable switches of the SDN network (e.g., switch 3 and switch N) which have been programmable to provide the media interworking services using IP addresses, port, and MAC addresses supplied by the SBC. In this way while the SBC allocated/assigned SBC-IP_J, SBC_Port_J, SBC_MAC_J and SBC-IP_G, SBC_Port_G1, SBC_Port_G2, SBC_MAC_G and SBC_Port_K, SBC_IP_K, SBC_MAC_K are used in communicating the packets of the media packet flow the packets of the packet flow are not routed through the SBC. The SBC 1510 has provided the micro flow media interworking service via programming of the SDN switches by sending instructions/ information to the SDN controller 1508 which controls the SDN controller 1508 to send instructions to the SDN Switch(es), e.g., switches 3 and N, to perform the rewrite of the source and destination IP addresses, port number and MAC addresses in media packets that are identified by the SDN switch as belonging to the media packet flow per the instructions. The instructions include information by which the SDN switches can identify the packets of the media flow as it is received from the source device which require media interworking and the packets received by the switch(es) from the media interworking device after the media of the packets has been processed, e.g., transcoded, and which need to sent to the endpoint destination device. In many instances the identifying information includes the source IP address, port and MAC address and destination IP address, port and MAC address of the flow and the protocol type used for the flow which in our example is UDP. As previously discussed the VLAN TAG may also be used in identifying the flow. As also previously discussed the VLAN TAG may, and in some embodiments, is re-written to allow for the communications of packets from the origination device to the destination device. This allows the SBC to be a signaling SBC which only hosts session control signaling flows, e.g., SIP signaling flows, as opposed to media flows.

Table 1400 of FIG. 14 illustrates exemplary instructions which when executed by programmable switch(es) implement a media interworking service in which the source IP address, source port, source MAC address and destination IP address, destination port, and destination MAC address are rewritten to redirect a media flow to to a media interworking device (MID) and then the same or another programmable switch rewrites the media interworked packet's (packet with transcoded data) source IP address, source port, source MAC address and destination IP address, destination port and destination MAC address. The instructions are in the form of a flow table entries that are installed in one or more SDN switch(es) 1512, 1514, 1516, . . . , 1518 of the SDN network 1506 for the media flow from device E 1004 to device E 1010 illustrated by line 1836 on FIG. 18. The instructions for at least TAG04 are installed in at least SDN programmable switch 3 1516 which has an interface to the Site-3 network in which communications device E is located and the instructions for TAG05 is installed in switch N 1518 which has an interface to the Site-5 network in which communications device F 1010 is located. Both switches 3 and N may and in some embodiments do have instructions TAG04 and 05 installed in them. In some embodiments all of the SDN switches have TAG04 and 05 installed in them as these TAG04 and TAG05 rules uniquely identify the media flows upon which actions are to be taken and which rules have priority. By installing all of the rules in one or more switches of the SDN network it also allows the SDN controller to dynamically reconfigure the network so that different SDN switches handles calls from different networks to which they have connections. The entries for row 1424 of the table are labels or identifiers which are provided for explanatory purposes similar to the labels in the previous flow tables. It should be noted for explanatory purposes the column for VLAN TAGGED or UNTAGGED has been used as in this example and in the previous examples the VLAN TAG was untagged and did not require modification. These entries in row 1424 identify the information contained in each of the columns. Each row in the table 1400 contains information relating to a specific table entry. In this example two row 1426 and 1428 are illustrated but the flow table as previously discussed typically will have additional rows. The entries in column 1402 includes table entry identifiers. The entries in column 1404 identify the priority/preference to be applied to the table entry. As previously explained in connection with table 1100, when the matching criteria of multiple table entries match the table entry with the highest priority's action is executed and the table entries with the lower priorities do not have their actions executed. The entries in column 1406 are source IP address/prefix numbers to be used for matching against a received packet's source IP address included in the packet's header information. As with table 1100, the IP addresses shown in table 1400 are shown as IPV4 IP addresses which are 32 bits in length. The invention is also applicable to IPV6 IP addressing in which the IP address are 128 bits in length. When IPV4 IP addresses are being matched the prefix is 32 bits; when IPV6 addresses are being matched the prefix is 128 bits. The entries in column 1408 are source port numbers to be used for matching against a received packet's source port information included in the packet's header information. The entries in column 1410 are destination IP address/prefix numbers to be used to match against received destination IP address included in the packet's header information. The entries in column 1412 are destination port numbers to be used to match against a received packet's destination port included in the received packet header information. The entries in column 1414 are source MAC address to be used for matching against a received packet's source MAC address included in the packet's header information. The entries in column 1416 are destination MAC address to be used for matching against a received packet's destination MAC address included in the packet's header information. The entries in column 1420 are actions, e.g., IP address/port rewriting, MAC address rewriting, VLAN TAG rewriting, and packet redirection, and/or packet forwarding, to be taken by the SDN programmable switch when the matching criteria for a flow entry are meet and the flow entry has the highest priority of flow table entries with matching criteria, the matching criteria being, e.g., received packet header source IP, source port, source MAC address, destination IP address, destination port, destination MAC address, match the corresponding entries in a flow table entry. The switches use the matching criteria to identify received packets of the media packet flow. In most embodiments the type of protocol is also used as a matching criteria, e.g., UDP or TCP. In this example, the protocol type is UDP and while not shown in the table matching on the protocol type is typically performed. The use of one or more of source MAC address and destination MAC address as previously explained is optional and while used in this example are not used in all embodiments as they are not necessary for all embodiments as matching criteria to uniquely identify a media flow. Column 1422 identifies the SDN switch output port on which the received packet after any alterations is to be outputted.

The entry (column 1402, row 1426) states "TAG04," as the entries in row 1426 specify a flow table entry 04. The information contained in row 1426 is a flow table entry installed for SBC 1510 with a flow table entry identifier of TAG04 (column 1402, row 1426), priority/preference of 1 (column 1404, row 1426), matching criteria Source IP address/prefix of IP-A/32 (column 1406, row 1426) which is the IP address of device E to be used for sending media packets of the media flow per the agreement in the SDP Offer and Answer exchange, matching criteria source port number of Port_E (column 1408, row 1426) which is the port of device E to be used for sending media packets of the media flow per the agreement in the SDP Offer and Answer exchange, matching criteria of destination IP address/prefix of SBC_IP_J/32 (column 1410, row 1426) which is the destination IP address allocated to the SBC that is to be used by device E when sending packets of the flow toward the destination device F per the agreement reached in the SDP offer and answer exchange, matching criteria of destination port number is SBC_Port_J indicating the SBC port agreed to be included as the destination port in packets sent from the flow origination device E 1004 as part of the media flow per the agreement reached in the SDP offer and answer exchange (column 1412, row 1426), matching criteria Source MAC Address of MAC_E (column 1414, row 1426) which is the MAC address of device E, matching criteria Destination MAC Address of SBC_MAC_J (column 1416, row 1426) which is the MAC address of SBC interface to the Site-3 1010, Action (column 1420, row 1426) is to rewrite: (1) Source IP address to be SBC_IP_G, (2) Source port to be SBC-IP_G1, and (3) Source MAC address to SBC-MAC_G which are the SBC IP address, port and MAC address of the SBC interface to Site-3 network 1002 and to rewrite the (1) the Destination IP address to MID_IP_H, (2) Destination port to MID_Port_H1, (3) Destination MAC address to MID_MAC_H which are the destination address information for the media interworking device 1550 in the SDN network which will perform the transcoding of the media packets of the media flow as determined during the media flow SDP offer and answer exchange, and output port (column 1422, row 1426) with entry of "MID" indicating that the received packet is to be outputted to the media interworking device from the SDN switch output port that is connected to the SDN network as the packets are being routed to the media interworking device for media processing, e.g., transcoding (column 1422, row 1426).

The TAG04 table entry rule/instruction provides instructions for a micro flow media interworking service for a type-3 media packet flow wherein the micro flow inter service provides topology hiding with IP connectivity in this TAG04 instruction the media packets of the media packet flow received from the origination device E at the SDN switch are identified and routed to a media interworking device for media processing with the source and destination address information rewritten. When a SDN switch with this table entry, e.g., programmable switch 3 1516, receives a packet from device E 1004 belonging to the media packet flow, the SDN switch will match the source IP address in the packet header which will be IP-E to the source IP-E/32 (IPV4 32 bit address) in column 1406, row 1426 and find it matches; the SDN switch will match the source port in the packet which will be Port_E to the Port_E entry in column 1408, row 1426 and find a match; the SDN switch will match the destination IP address in the packet header which will be SBC_IP_J to the destination IP address entry SBC-IP_J/32 entry in column 1410, row 1426 and find a match; the SDN switch will match the destination port in the packet which will be SBC_Port_J to the entry in column 1412, row 1426 which is SBC_Port_J and will find a match, the SDN switch will match the source MAC address in the packet header which will be MAC_E to the source MAC address entry in column 1414, row 1426 which is MAC_E and find a match; the SDN switch will match the destination MAC address in the packet header which will be SBC_MAC_J to the destination MAC address entry column 1416, row 1426 which is SBC_MAC_J and find a match. With the matching criteria met the SDN switch will perform the action described in column 1420, row 1426 when the flow entry has the highest priority/preference of matching flow entries in the table. In this example, the column 1404, 1426 priority/precedence entry is 1 and as this is the only entry in the flow table with this matching criteria it has the highest priority value. The action that is then performed by the SDN switch, i.e. Switch 3 1516, is that of rewrite the source IP address, port and MAC address and the destination IP address, port and MAC address to be source IP address: SBC_IP_G, source port: SBC_IP_G1 source MAC address: SBC_MAC_G, destination IP address: MID_IP_H, destination port: MID_Port_H1, destination MAC address: MID_MAC_H. As previously explained in connection with the media bypass service, in some embodiments, the Action may also include instruction to rewrite the VLAN TAG if necessary. Once the source and destination information of the packet header has been rewritten the SDN switch outputs the packet toward the media interworking device for media processing as identified in column 1422, row 1428.

The entry (column 1402, row 1428) states "TAG05," as the entries in row 1428 specify a flow table entry 05. The information contained in row 1428 is a flow table entry installed for SBC 1510 with a flow table entry identifier of TAG05 (column 1402, row 1428), priority/preference of 1 (column 1404, row 1428), matching criteria Source IP address/prefix of MID_IP_H/32 (column 1406, row 1428) which is the IP address of media interworking device to be used in sending media packets of the media flow that have been processed to a switch of the SDN network, matching criteria source port number of MID_Port_H2 (column 1408, row 1428) which is the port of the media interworking device to be used for sending media packets of the media flow after processing, matching criteria of destination IP address/prefix of SBC_IP_G/32 (column 1410, row 1428) which is the destination IP address allocated to the SBC that is to be used by media interworking device when sending packets of the flow toward the destination device F, matching criteria of destination port number is SBC_Port_G2 indicating the SBC port agreed to be included as the destination port in packets sent from media interworking device after processing (column 1412, row 1428), matching criteria Source MAC Address of MID_MAC_H (column 1414, row 1428) which is the MAC address of media interworking device, matching criteria Destination MAC Address of SBC_MAC_G (column 1416, row 1428) which is the MAC address of SBC interface to the media interworking device, Action (column 1420, row 1428) is to rewrite: (1) Source IP address to be SBC_IP_K, (2) Source port to be SBC-IP_K, and (3) Source MAC address to SBC-MAC_K which are the SBC IP address, port and MAC address of the SBC interface to Site-5 network 1008 and to rewrite the (1) the Destination IP address to IP_F, (2) Destination port to Port_F, (3) Destination MAC address to MAC_F which are the destination address information for the device F 1010 in the Site-5 network which was agreed to be used as the receiving address and port information for packets of the media flow; and output port (column 1422, row 1426) with entry of "external network" indicating that the received packet is to be outputted to the external network from the SDN switch output port that is connected to the external-network (column 1422, row 1428) the external network being Site-5 network 1008. This will be done via switch N 1518 to which the modified packet is routed from the media interworking device 1550 to be outputted to the Site-5 network. The TAG05 rule when implemented on a programmable switch identifies packets of the media packet flow that have been transcoded by the media interworking device, rewrites the source and destination header information and outputs the packets toward the destination device F 1010 in the Site 5 network 1008 as part of the media interworking microflow service being provided by the SBC via the SDN programmable switches.

In some embodiments in which the media interworking device has interfaces to the Site-3 network and Site-5 network the SBC during the media session establishment for the media flow establishes that the flow origination device should use the media interworking device destination address for packets sent and that the flow destination device should expect to receive media interworking device source address as the source of the media packets. In this way the SBC's IP addresses, MAC addresses and ports are not used but instead the media interworking device's address and ports are used.

In this case device E 1004 in site-3 network and device E 1010 in site-5 network do not share the same Internet Protocol space and are not directly reachable. The media packet flow between the two devices is a type-3 media packet flow as it requires media interworking (e.g., transcoding of the media). Switch 3 1516 and Switch N 1518 implement the routing of the media interworking microflow service. Switch 3 1516 rewrites the source and destination information in the packet header redirecting received packets of the media flow to a media interworking device for media processing and Switch N 1518 identifying packets of the media flow being sent by the media interworking device rewrites the source IP address, port and MAC address and the destination IP address, port and MAC address in the packet header and sends the packet to the destination device E in the Site-5 network. The media interworking micoflow service provides topology hiding with IP connectivity (e.g., NAPT functionality) and media interworking via a media interworking device, e.g., a transcoder.

In the examples of FIGS. 7, 8, 9, 10, 15, 16, 17, and 18 all the signaling from the endpoints are routed to the SBC that is used to setup media paths dynamically using the SDN controller. The SBC may be a signaling SBC also referred to a S-SBC. An S-SBC being is a service/component device or application that anchors signaling and exposes signal interface(s) to devices external to the SDN network, e.g., peer devices, communications devices, user equipment devices, etc. and chains in on an as needed basis other SBC service component devices or applications such as transcoder-session border controllers (T-SBCs). In these exemplary embodiments, the SDN controller does not allow any traffic to flow unless it has been programmed to do so by the SBC for the network interfaces that the SBC is controlling. In the exemplary embodiments a single SDN controller is able to identify/control the relevant network elements and endpoints that are involved in the multimedia session. However, in some embodiments of the invention a plurality of SDN network controllers are federated so that end-to-end Quality of Service for example in sessions where some endpoints are within one enterprise SDN network and the other endpoint(s) in the same session are within a different enterprise SDN network both managed by different SDN network controllers.

While the various exemplary embodiments of the invention discussed in connection with systems of FIGS. 15 to 18 indicated that the SBC was in a trusted relationship with the networks in which the communications devices were located and therefore had been provided the various networks network topology information through for example network configuration information programmed into the SBC (e.g., devices MAC addresses, which devices are located in networks, trunking information, device addressing information, Internet Protocol address space usage, network to network connectivity, device connectivity between networks, etc., in some embodiments, the SBC is not in a trusted relationship with respect to one or more networks to which the SBC is providing services and for which the SBC is controlling the network interfaces. In such embodiments, the SDN controller uses a discovery process wherein the SDN controller sends discovery signaling messages to devices in the networks to dynamically and automatically discovery the network topology of the networks to which the SDN network is connected. In some embodiments, the SDN network controller discovery process is also performed on an ongoing periodic basis and is also used to update the network topology of trusted networks to include or update information on changes to the trusted network which have not been provided and configured into the SBC. The SDN controller stores the network topology information in a database accessible to the SBC or provides the SBC a copy of the network topology information and the SBC automatically updates its network configuration information with respect to the network topology information (including connectivity information) provided by the SDN controller.

Figure 19:
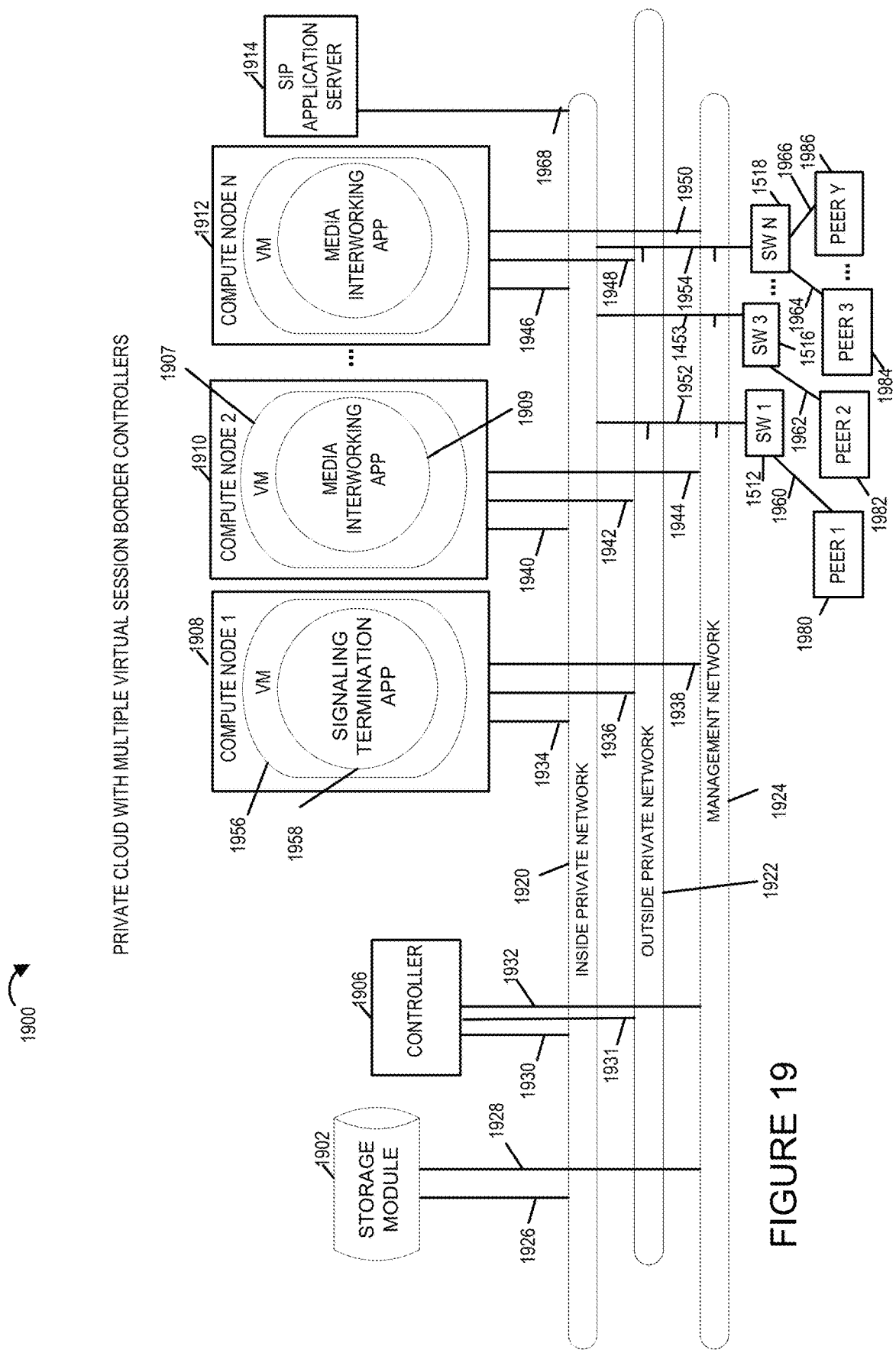
FIG. 19 illustrates an exemplary private cloud system with a virtual signaling termination application and virtual media interworking applications in accordance with an embodiment of the present invention.

FIG. 19 illustrates an exemplary private cloud system 1900 with a virtual signaling termination application (signaling termination APP) 1958 and multiple virtual media interworking applications (media interworking APPs) in accordance with an embodiment of the present invention. The exemplary cloud system 1900 shown is a private cloud but the system may be, and in many embodiments is, implemented in a public cloud. The system includes physical hardware resources including computing, storage, and network that provide processing, storage and connectivity which will be described in further detail below. The computing hardware includes one or more processors and commercial off the shelf (COTS) hardware that is commonly pooled. In some embodiments, the computing hardware is specialized and configured for use as signaling termination applications and media interworking applications, such as for applications that provide transcoding services.

The system includes a storage module 1902, a controller 1906, a plurality of compute nodes, an optional SIP application server 1914, a SIP peer device 1 1980, SIP peer device 2 1982, SIP peer device 3 1984, . . . , SIP peer device Y 1986, SDN switch SW 1 1512, SDN switch 3 1516, . . . , SDN switch N 1518, an inside private communications network 1920, an outside private communications network 1922, a management network 1924, and a plurality of communications links 1926, 1928, 1930, 1931, 1932, 1934, 1936, 1938, 1940, 1942, 1944, 1946, 1948, 1950, 1952, 1953, 1954, 1960, 1962, 1964, . . . , 1966, and 1968. The inside private communications network 1920, the outside private communications network 1922, the management network 1924, and the plurality of communications links 1926, 1928, 1930, 1931, 1932, 1934, 1936, 1938, 1940, 1942, 1944, 1946, 1948, 1950, 1952, 1954, 1960, 1962, 1964, . . . , 1966 and 1968 are used to exchange messages, information and instructions between the various devices, endpoints, nodes and entities in the system.

The plurality of compute nodes includes a compute node 1 1908, a compute node 2 1910, . . . , a compute node N 1912 where N is a positive number. The compute node 1 includes a virtual machine 1956 and a signaling termination application 1958. The compute node running a signaling termination application, e.g., signaling termination APP 1958, is a virtualized signaling termination device. For example, it could be running a signaling session border controller application. Each of the compute nodes 2 1910, . . . , N 1912 include a virtual machine and a media interworking application. For example, compute node 1910 including virtual machine 1907 running media interworking application 1909. The resources, e.g., SIP processing capabilities or media interworking, e.g., transcode capabilities, available to each of the virtual signaling terminal applications and media interworking applications may be, and typically is, different, for example based on how the virtual signaling termination application and/or media interworking application is configured. The compute node 1 1908 is coupled to: the inside private network 1920 via communication link 1934, the outside private network 1922 via communications link 1936, and the management network 1924 via communications link 1938. The compute node 2 1910 is coupled to: the inside private network 1420 via communications link 1940, the outside private network 1922 via communications link 1942, and the management network 1924 via communications link 1944. The compute node N 1912 is coupled to: the inside private network 1920 via communication link 1946, the outside private network 1922 via communications link 1948, and the management network 1924 via communications link 1950.

The storage module 1002 is a storage device, e.g., memory, for storing instructions, information and data. The storage module 1902 is coupled to the inside private network 1020 via communications link 1926 and to the management network 1924 via communications network 1928.

The controller 1906 is an SDN controller that operates to configure and manage the private cloud system. The controller 1906 is coupled to the inside private network 1920 via communications link 1930, the outside private network 1922 via communications link 1931, and the management network 1924 via communications link 1932. In some embodiments, the controller includes an orchestrator device or module, a Virtual Network Function manager device or module, and an element management system device or module. The orchestrator controls the orchestration and management of network function virtualized infrastructure and software resources, and realizing network services on network function virtualized infrastructure. The Virtual Network Function manager device or module operates to control virtual network function lifecycle management including for example instantiation, update, query and termination. A virtual network function as described in the ETSI GS NFV 002 V1.1.1 is a virtualisation of a network function. In this example, the virtualized network functions are signaling termination applications and media interworking applications. The element management system or module performs management functions for one or several of the virtual network functions, e.g., virtual signaling termination application and media interworking application. Each compute node includes one or more processors. In some embodiments, one or more of the compute nodes in the system include a single processor upon which multiple virtual signaling termination applications and/or media interworking applications are instantiated. In some embodiments, each virtual signaling termination application and media interworking application is a set of programming instructions forming a signaling termination application or a media interworking application which is executed on a processor of a compute node.

The SIP application server 1914 is coupled to the inside private network 1920 via communications link 1968.

The SDN switch SW 1 1512 is coupled to the inside private network 1920, the outside private network 1922, and the management network 1924 via communications link 1952. The SDN switch 3 1516 is coupled to the inside private network 1920, the outside private network 1922, and the management network 1924 via communications link 1953. The SDN switch N 1518 is coupled to the inside private network 1920, the outside private network 1922, and the management network 1924 via communications link 1954. Devices, elements and/or items shown in different Figures identified by the same number are to be considered the same or similar and having the same or similar functionality. For example, the SDN switches SW 1 1512, SW 3 1516, . . . , SW N 1518 are to be considered the same as or similar to the SDN switches and peer devices having the same numbers as illustrated in FIGS. 15, 16, 17 and 18 and will not be described in further detail in connection with FIG. 19. The peer 1, peer 2 and peer 3, . . . , peer Y devices are communications devices the same as or similar to the communications devices A, B, C, D, E and F of FIGS. 1500, 1600, 1700, and 1800.

The methods and steps described in connection with the SBCs, media interworking devices, SDN controller and SDN switches of the various embodiments described herein may be, and sometimes are, implemented on the private cloud system 1900 of FIG. 19. In some such embodiments, instead of a private cloud system a public cloud system is employed.

Figures 20, 20B:
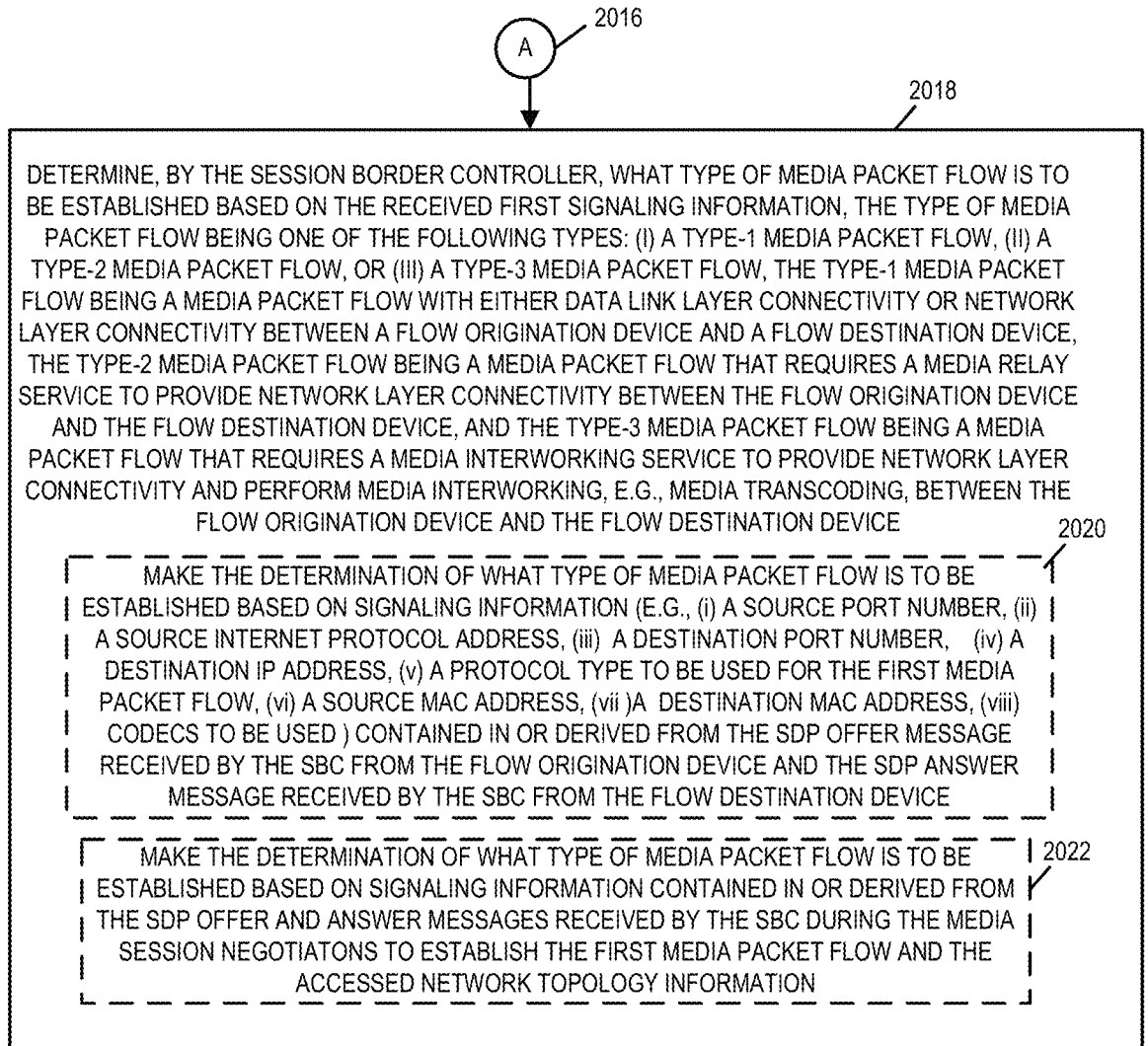
FIG. 20 comprises the combination of FIGS. 20A, 20B, 20C, 20D, 20E and 20F.
FIG. 20B illustrates a second part of a flowchart of an exemplary method in accordance with an embodiment of the present invention.

FIG. 20, comprising the combination of FIGS. 20A, 20B, 20C, 20D, 20E and 20F, is a flowchart 2000 of an exemplary communications method in accordance with an exemplary embodiment. The exemplary method 2000 may be, and in some embodiments is, implemented on devices in the various exemplary systems disclosed in various Figures such as for example systems 100 of FIG. 1, system 600 of FIG. 6, system 700 of FIG. 7, system 800 of FIG. 8, system 900 of FIG. 9, system 1000 of FIG. 10, system 1500 of FIG. 15, system 1600 of FIG. 16, system 1700 of FIG. 17, system 1800 of FIG. 18, and system 1900 of FIG. 19 or on the SBCs, SDNs or programmable switches disclosed in such systems. It is to be understood that the communications method 2000 may be implemented on other systems and that the systems identified are only exemplary. While not discussed the control signaling for establishing the media session may, and typically is, also routed via the SDN switches to the SBC by instructions installed in the programmable SDN switches by the SBC via the SDN controller.

Figure 20A:
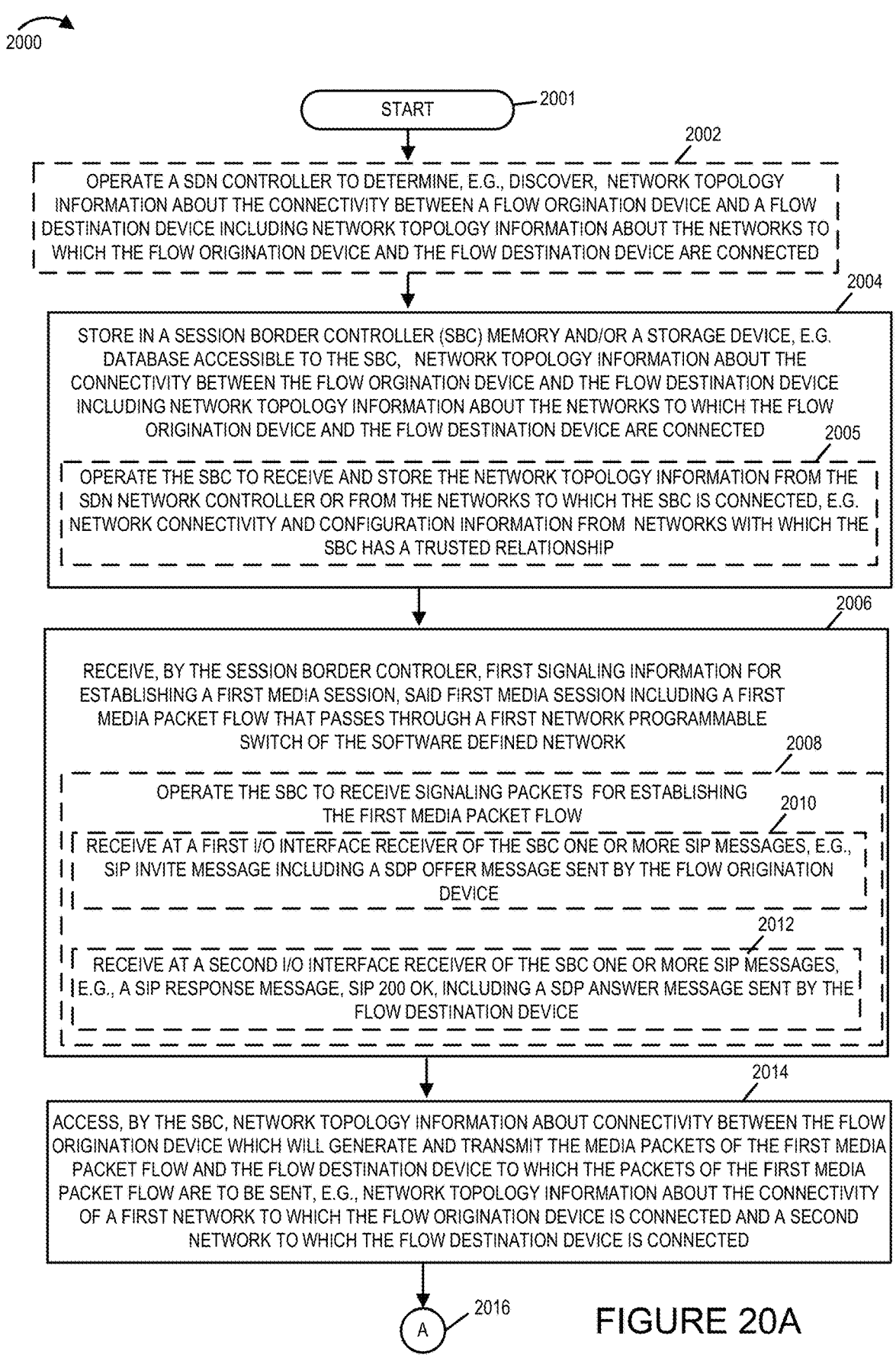
FIG. 20A illustrates a first part of a flowchart of an exemplary method in accordance with an embodiment of the present invention.

Communications method 2000 starts in start step 2001 shown on FIG. 20A and proceeds to optional step 2002. If optional step 2002 is not implemented operation proceeds to step 2004. In step 2002 an SDN controller, e.g., SDN controller 112, is operated to determine, e.g., discover, network topology information about the connectivity between a flow origination device, e.g., endpoint 1 102, and a flow destination device (e.g., endpoint 2 104, including network topology information about the networks to which the flow origination device and the flow destination device are connected. Operation proceeds from optional step 2002 to step 2004.

In step 2004, network topology information about the connectivity between the flow origination device and the flow destination device including the network topology information about the networks to which the flow origination device and the flow destination device are connected is stored in a session border controller (SBC) memory and/or a storage device, e.g., database accessible to the SBC. The network topology information may be, and in some embodiments is, stored in the SBC via system user configuration input, network configuration/topology files provided to the SBC, and/or by the SDN controller. In some embodiments, the step 2004 includes sub-step 2005.

In step 2005, the SBC (e.g., SBC 134) is operated to receive and store the network topology information from the SDN network controller or from the networks to which the SBC is connected, e.g., network connectivity and configuration information from networks with which the SBC has a trusted relationship. Operation proceeds from step 2004 to step 2006.

In step 2006, the SBC is operated to receive first signaling information for establishing a first media session, said first media session including a first media packet flow that passes through a first network programmable switch of the software defined network. In some embodiments, the step 2006 includes sub-step 2008.

In sub-step 2008, the SBC is operated to receive signaling packets for establishing the first media packet flow. In some embodiments, the sub-step 2008 includes sub-steps 2010 and 2012. In sub-step 2010 the SBC is operated to receive at a first I/O interface receiver of the SBC one or more Session Initiation Protocol (SIP) messages, e.g., SIP INVITE message including a SDP offer message sent by the flow origination device. In sub-step 2012, the SBC is operated to receive at a second I/O interface receiver of the SBC one or more SIP messages, e.g., SIP response message, SIP 200 OK, including a SDP answer message sent by the flow destination device. The SBC acts as a B2BUA in this exemplary method and negotiates the parameters, e.g., source and destination address information and codec to be used, for establishing the media session including the parameters for the establishment of the first media packet flow which is a unidirectional flow from the origination device to the destination device. While only one media flow is being discussed in connection with this method is should be understood that multiple media flows may be established and typically at least a flow from the destination device to the origination device is also established when the media session is established. Operation proceeds from step 2006 to step 2014.

In step 2014, the SBC accesses network topology information about connectivity between the flow origination device which will generate and transmit the media packets of the first media packet flow and the flow destination device to which the packets of the first media packet flow are to be sent, e.g., network topology information about the connectivity of a first network (Enterprise network 1 103) to which the flow origination device is connected and a second network (e.g., Enterprise network 2 105) to which the flow destination device is connected. This step is performed during the negotiations to establish/setup the first media packet flow. Operations proceeds from step 2014 shown on FIG. 20A to step 2018 shown on FIG. 8B via connection node A 2016.

In step 2018, the SBC is operated to determine what type of media packet flow is to be established based on the received first signaling information, the type of media packet flow being one of the following types: (i) a type-1 media packet flow, (ii) a type-2 media packet flow or (iii) a type-3 media packet flow. The type-1 media packet flow being a media packet flow with either data link layer connectivity or network layer connectivity between the flow origination device and the flow destination device. The type-2 media packet flow being a media packet flow that requires a media relay service to provide network layer connectivity between the flow origination device and the flow destination device. The type-3 media packet flow being a media packet flow that requires a media interworking service to provide network layer connectivity and perform media interworking, e.g., media transcoding, between the flow origination device and the flow destination device. In some embodiments, the step 2018 includes one or more of the sub-steps 2020 and 2022.

In sub-step 2020, the SBC is operated to make the determination of what type of media packet flow is to be established based on signaling information (e.g., (i) a source port number, (ii) a source Internet Protocol address, (iii) a destination port number, (iv) a destination Internet Protocol address, (v) a protocol type to be used for the first media packet flow (e.g., UDP or TCP), (vi) a source MAC address, (vii) destination MAC address, (viii) codecs to be used by the origination device and the destination device) contained in or derived from the SIP Invite message including the information in the SDP Offer message received by the SBC from the flow origination device and the SIP response message including the information in the SDP Answer message received by the SBC from the flow destination device. In some embodiments, the SBC also uses the VLAN Tag information to determine what type of media packet flow is to be established.

In sub-step 2022, the SBC is operated to make the determination of what type of media packet flow is to be established based on signaling information contained in or derived from the SDP offer and the SDP answer messages received by the SBC during the media session negotiations to establish the first media packet flow and the accessed network topology information. Operation proceeds from step 2018 show on FIG. 20B to step 2026 shown on FIG. 20C via connection node B 2024.

Figure 20C:
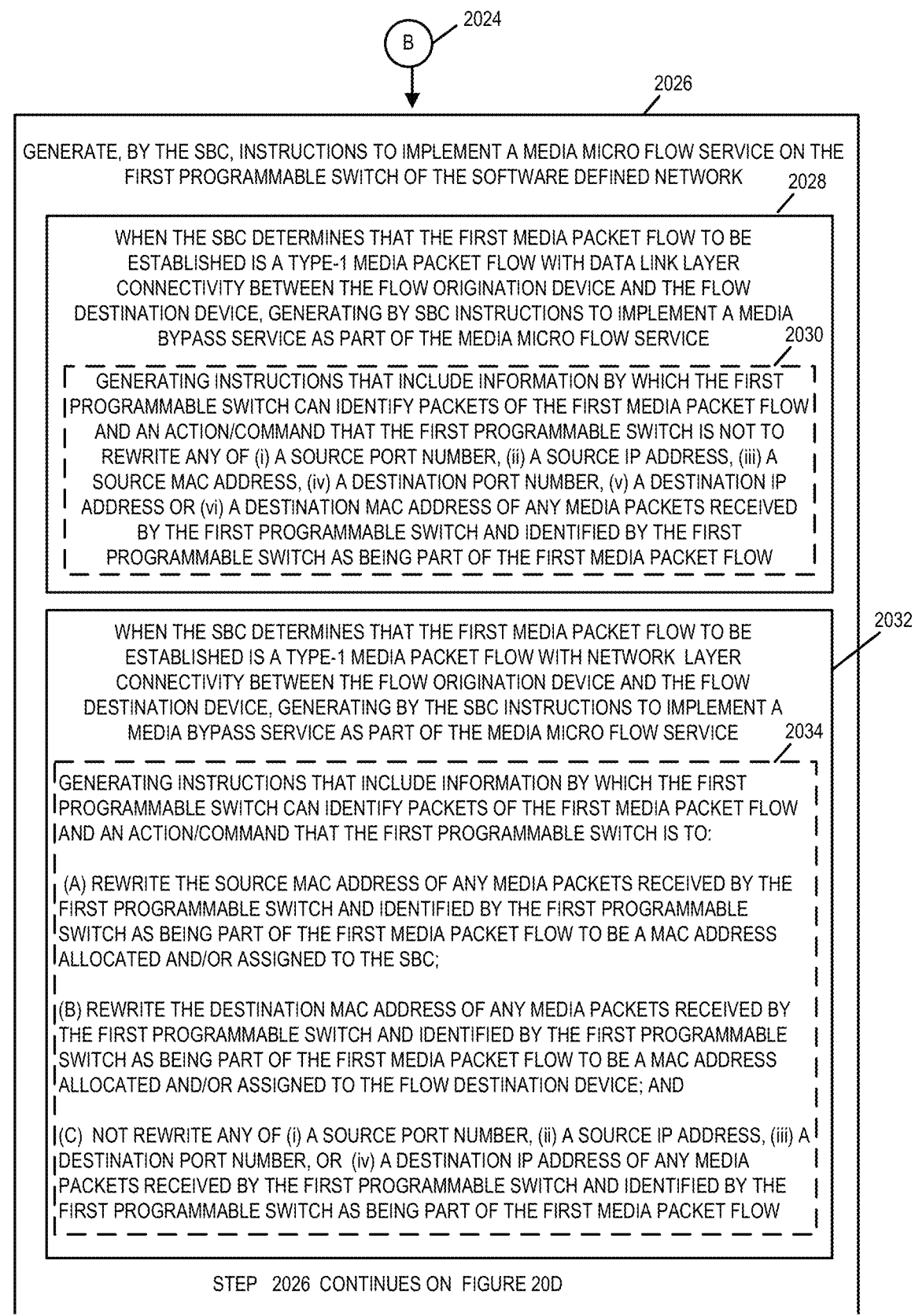
FIG. 20C illustrates a third part of a flowchart of an exemplary method in accordance with an embodiment of the present invention.
Figure 20E:
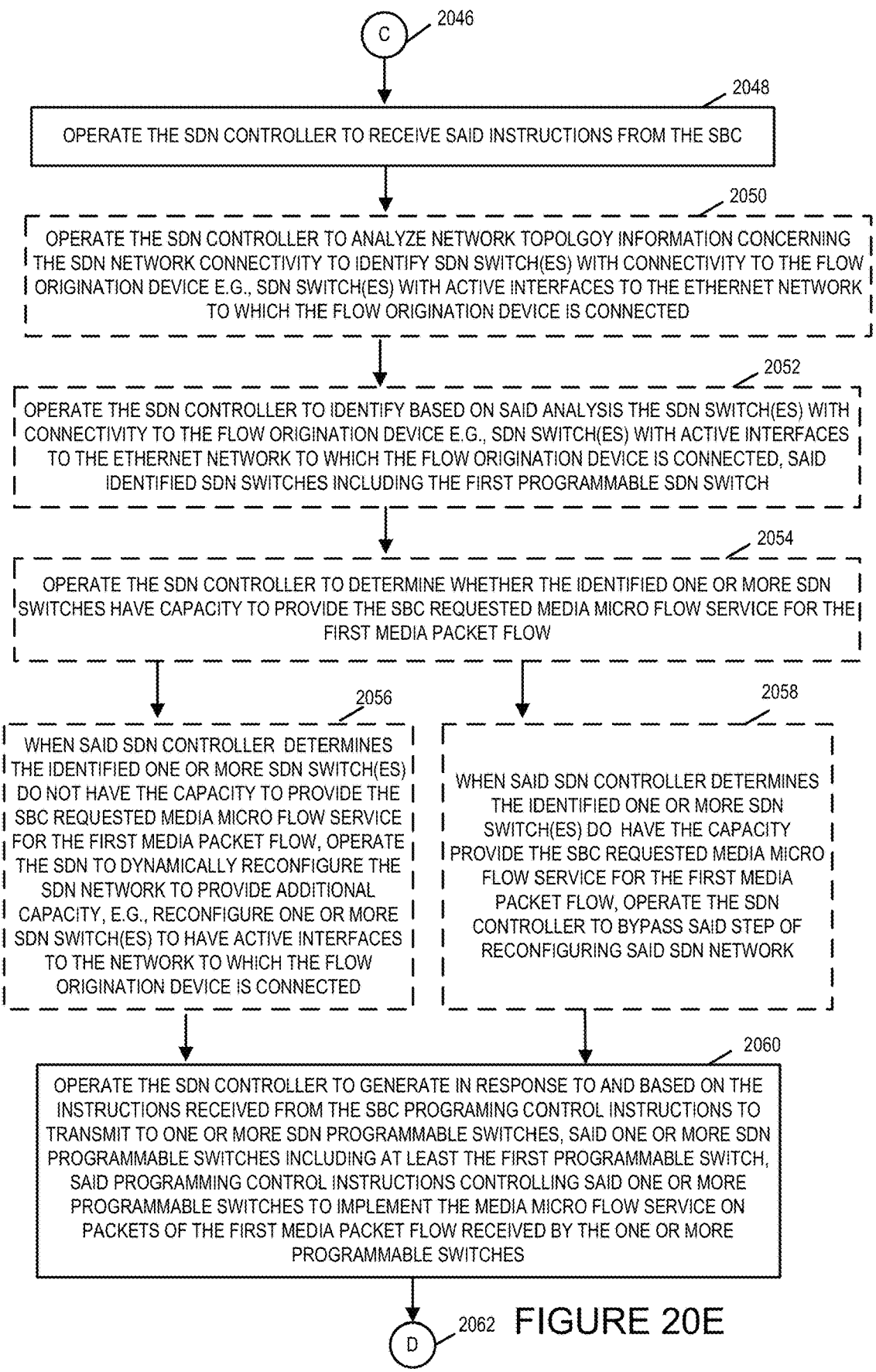
FIG. 20E illustrates a fifth part of a flowchart of an exemplary method in accordance with an embodiment of the present invention.
Figure 20F:
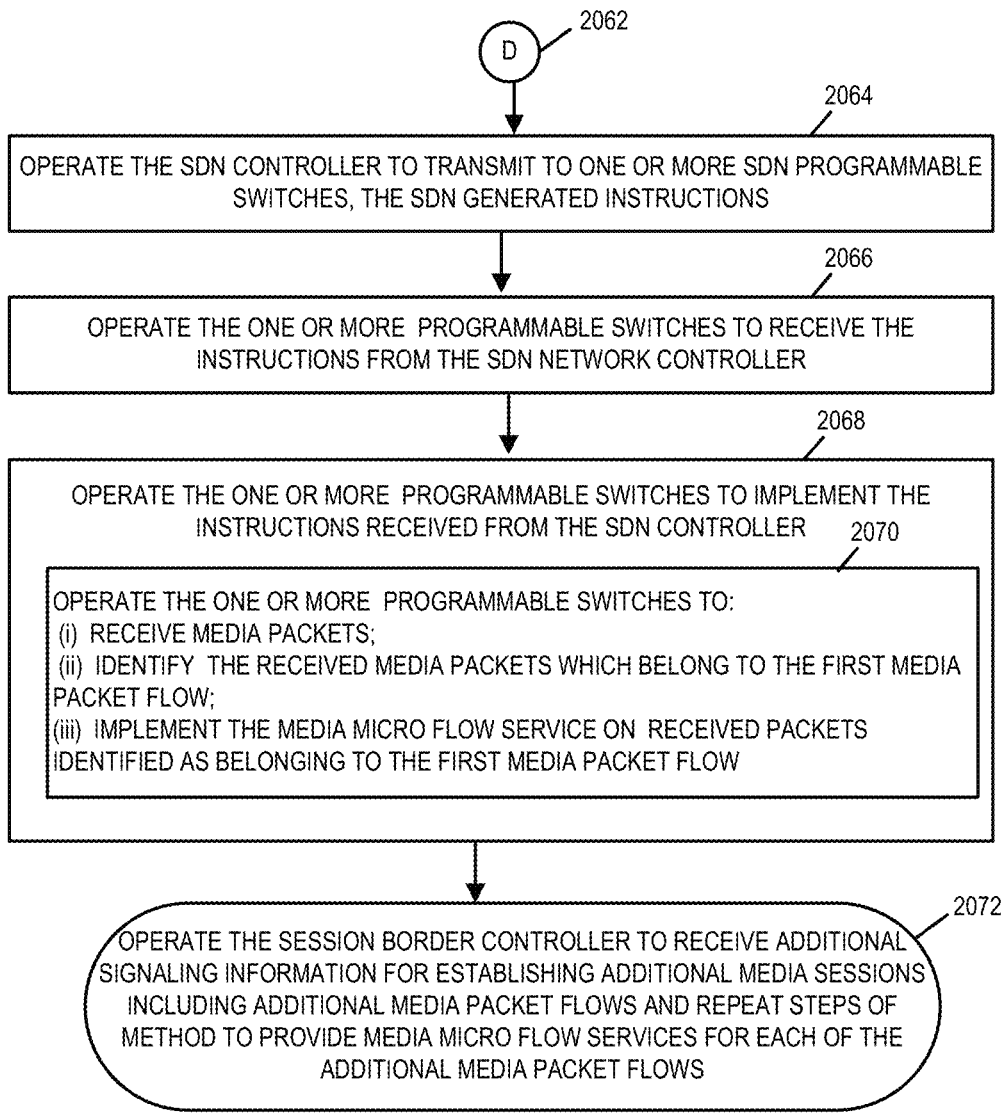
FIG. 20F illustrates a sixth part of a flowchart of an exemplary method in accordance with an embodiment of the present invention.

In step 2026, which is shown on FIGS. 20C and 20D, the SBC is operated to generate instructions to implement a media micro flow service on the first programmable switch of the software defined network. Step 2026 includes sub-steps 2028, 2032, 2038 (shown on FIG. 20D) and step 2042 (shown on FIG. 20D).

In sub-step 2028, when the SBC determines that the first media packet flow to be established is a type-1 media packet flow with data link layer connectivity between the flow origination device and the flow destination device, the SBC is operated to generate instructions to implement a media bypass service as part of the media micro flow service. Step 2028 in some embodiments includes optional sub-step 2030.

In sub-step 2030, the SBC is operated to generate instructions that include information by which the first programmable switch can identify packets of the first media packet flow and an action/command that the first programmable switch is not to rewrite any of (i) a source port number, (ii) a source IP address, (iii) a source MAC address, (iv) a destination port number, (v) a destination IP address, or (vi) a destination MAC address of any media packets received by the first programmable switch and identified by the first programmable switch as being part of the first media packet flow. In some embodiments the SBC is also operated to generate instructions not to change any information in the packet header of any media packets received by the programmable switch and identified by the first programmable switch as being part of the first media packet flow.

In sub-step 2032, when the SBC determines that the first media packet flow to be established is a type-1 media packet flow with network layer (OSI layer 2) connectivity between the flow origination device and the flow destination device, the SBC operated to generate instructions to implement a media by pass service as part of the media micro flow service.

In some embodiments, sub-step 2032 includes sub-step 2034. In sub-step 2034 the SBC is operated to generate instructions that include information by which the first programmable switch can identify packets of the first media packet flow and an action/command that the first programmable switch is to: (a) rewrite the source MAC address of any media packets received by the first programmable switch and identified by the first programmable switch as being part of the first media packet flow to be a MAC address allocated and/or assigned to the SBC, (b) rewrite the destination MAC address of any media packets received by the first programmable switch and identified by the first programmable switch as being part of the first media packet flow to be a MAC address allocated and/or assigned to the flow destination device, and (c) not rewrite any of (i) a source port number, (ii) a source IP address, (iii) a destination port number, or (iv) a destination IP address of any media packets received by the first programmable switch and identified by the first programmable switch as being part of the first media packet flow.

Step 2026 continues on FIG. 20C. In sub-step 2038 shown on FIG. 20C, when the SBC determines that the first media packet flow to be established is a type-2 media packet flow, the SBC is operated to generate instructions to implement a media relay service as part of the media micro flow service. Sub-step 2038 includes in some embodiments sub-step 2040. In sub-step 2040, the SBC is operated to generate instructions that include information by which the first programmable switch can identify packets of the first media packet flow and an action/command that the first programmable switch is to perform. The action/command to be performed by the first programmable switch being to: (a) rewrite the source port number, source IP address and source MAC address of any media packets received by the first programmable switch and identified by the first programmable switch as being part of the first media packet flow to be a source port number, source IP address and source MAC address allocated and/or assigned to the flow destination device.

In sub-step 2042, when the SBC determines that the first media packet flow to be established is a type-3 media packet flow, operating the SBC to generate instructions to implement a media interworking service as part of the media micro flow service. In some embodiments, sub-step 2042 includes sub-step 2044. In sub-step 2044, the SBC is operated to generate instructions that include information by which the first programmable switch can identify packets of the first media packet flow and an action/command that the first programmable switch is to: (a) rewrite a source port number, a source IP address and a source MAC address of any media packets received by the first programmable switch as being part of the first media packet flow to be a source port number, source IP address, and source MAC address allocated and/or assigned to the SBC, and (b) rewrite a destination port number, a destination IP address, and a destination MAC address of any media packets received by the first programmable switch and identified by the first programmable switch as being part of the first media packet flow to be a destination port number, destination IP address, and destination MAC address allocated and/or assigned to a media interworking device, e.g., transcoder, to redirect received packets of the first media packet flow to the media interworking device. Operation proceeds from step 2026 to step 2048 shown on FIG. 8E via connection node C 2046.

In step 2048, the SDN controller is operated to receive the instructions from the SBC. Operation proceeds from step 2048 to optional step 2050 when implemented otherwise operation proceeds to step 2060.

In optional step 2050, the SDN controller analyzes network topology information concerning the SDN network connectivity to identify SDN switch(es) with connectivity to the flow origination device, e.g., SDN switches with active interfaces to the Ethernet network to which the flow origination device is connected. Operation proceeds from step 2050 to optional step 2052 when implemented otherwise operation proceeds from step 2050 to step 2060.

In optional step 2052, the SDN is operated to identify based on said analysis the SDN switch(es) with connectivity to the flow origination device, e.g., SDN switch(es) with active interfaces to the network, e.g., Ethernet network, to which the flow origination device is connected, said identified SDN switch(es) including the first programmable SDN switch. Operation proceeds from optional step 2052 to optional step 2054 when implemented otherwise operation proceeds to step 2060.

In optional step 2054, the SDN controller determines whether the one or more identified SDN switch(es) with connectivity to the flow origination device, e.g., SDN switches with active interfaces to the Ethernet network to which the flow origination device is connected, have the capacity, e.g., call/media flow processing capability, to perform the media micro flow service requested in the instructions from the SBC.

In optional step 2056, when the SDN controller determines in optional step 2054 that there is not sufficient capacity, the SDN controller is operated to dynamically reconfigures one or more SDN switches of the SDN network to have connectivity with the flow origination device, e.g., a SDN switch with a physical connection to the Ethernet network to which the flow origination device is connected but with an inactive interface is reconfigured to have an active interface whereby connectivity with the flow origination device is achieved. In some embodiments, the SDN controller will continuously or on a periodic basis monitor the SDN network traffic load (e.g., packets being processed by said SDN switch(es) and other network components versus packet processing capacity of the SDN switch(es) or other network components, calls per second being handled by the switches vs. call handling capacity) to determine when the traffic flowing through various network components, e.g., SDN switch(es), of the SDN network are approaching or exceeding a pre-defined processing limit or threshold for the component and the SDN upon detecting that a component is exceeding the pre-defined limit or threshold will dynamically reconfigure the network to address and relieve if possible the detected potential problem. The pre-defined limit or threshold being set to a level below a components actual processing capacity so that the SDN network can be reconfigured before the actual processing capacity limit of the component is reached or exceeded so as to minimize disruption to the network. Operation proceeds from optional step 2054 to step 2060.

In optional step 2058, when the SDN controller determines in optional step 2054 that there is sufficient capacity, the SDN controller performs a bypass step which bypasses the optional SDN network reconfiguration step 2056 and operation proceeds to step 2060.

In step 2060, the SDN controller is operated to generate in response to and based on the instructions received from the SBC programming control instructions to transmit to one or more SDN programmable switches, said one or more SND programmable switches including at least the first programmable switch, said programming control instructions controlling said one or more programmable switches to implement the media micro flow service on packets of the first media packet flow received by the one or more programmable switches. Operation proceeds from step 2060 to step 2064 shown on FIG. 20F via connection node D 2062.

In step 2064, the SDN controller is operated to transmit to one or more SDN programmable SDN switches, the SDN controller generated instructions. In embodiments in which optional step 2052 was performed the one or more SDN switches to which the SDN instructions are transmitted is typically the one or more SDN switches identified as having connectivity with the flow origination device. In embodiments in which optional step 2056 was performed the one or more SDN switches additionally typically includes the additional SDN switch(es) which were reconfigured to have connectivity with the flow origination device, e.g., a SDN switch which was reconfigured to have an activate interface on the network to which the flow origination device is connected. Operation proceeds from step 2064 to step 2066.

In step 2066, the one or more programmable switches to which the SDN controller transmits instructions are operated to receive the instructions from the SDN network controller. Operation proceeds from step 2066 to step 2068.

In step 2068, the one or more programmable switches that received the SDN instructions are operated to implement the instructions received from the SDN controller. In some embodiments step 2068 includes sub-step 2070.

In sub-step 2070, the one or more programmable switches are operated to: (i) receive media packets, (ii) identify the received media packets which belong to the first media packet flow, and (iii) implement the media micro flow service on received packets identified by the receiving programmable switch as belonging to the first media packet flow. Operation proceeds from step 2068 to step 2072

In step 2072, the session border controller is operated to receive additional signaling information for establishing additional media sessions including additional media packet flow and the steps of the method are repeated to provide media micro flow services for each of the additional media packet flows.

In some embodiments such as those in which the SDN controller cannot reconfigure additional SDN programmable switches to have connectivity with the network to which the flow origination device is connected the SDN controller generates instructions for the ingress SDN switches which are connected to the network to which the flow origination device is connected to pass all packets identified as belonging to the first media packet flow to another programmable switch, e.g., a core switch or edge switch, in the SDN network without performing any processing other than for identifying the packet belongs to the first media packet flow. The SDN network then transmits the instructions generated in response to the SBC instructions/commands to a programmable SDN switch that will receive the first media packet flow from the ingress SDN switches. The programmable SDN switch that receives the instructions will then implement the media micro service requested by the SBC for the first media packet flow. In this way the SDN controller has offloaded the processing required for implementing the media microflow service from the ingress switch or switches which may not have had the capacity to perform the requested service. It should be noted that for media bypass services that do not require any action other than passing the packet this redirection of the packet from a first ingress SDN switch to another switch would not be done as it would only add to the processing overhead in the SDN network but the redirection to another SDN switch would be done when media micro flow service does require an action in which rewriting and/or redirection to a media interworking device is required such as for example, media micro flow relay service, media micro flow interworking service and media micro flow bypass service with MAC address rewrite. The ability for the SDN network to dynamically reconfigure the programmable switch(es) already in the SDN network to perform the requested media micro flow services provide an advantage over the standard SBC which has fixed media resources that are dedicated to the performing these services. While the SDN network can be reconfigured on the fly to adapt and/or adjust to congestion or increases in the number of flows requiring media micro flow services occurring at different times and at different points in the SDN network (e.g., different ingress SDN switches supporting different networks to which the SDN network is coupled, the standard SBC cannot. The architecture of the various embodiments of the present invention provide dynamic scalability for providing media micro flow services, such as media bypass, media relay and media interworking services not possible with existing SBCs that have dedicated resources for these providing these services. In the case of such SBCs with dedicated resources for scaling to occur additional resources need to be dedicated.

For explanatory purposes the method 2000 describes first signaling information that includes session establishment information for a media session with a single media packet flow, the first media packet flow. The first signaling information may, and in most embodiments, does include information for a plurality of media packet flow. For example, a VOIP call will include a first unidirectional media packet flow from a first device, e.g., calling party device, to a second device, called party device, and a second unidirectional media packet flow from the second device to the first device. The method 2000 may be used to setup the second media packet flow and provide media services to the second media packet flow using the same steps for setting up the first media packet flow. The method is applicable to multiple media packet flows identified in the signaling information.

In some method embodiments of the invention an SBC is installed into a pre-existing SDN network which includes an SDN controller and a plurality of SDN programmable switches but does not include an SBC. The SBC sending programming instructions to the SBC so that all the signaling from endpoints under the control of the SBC are routed to the SBC which is used to setup media paths dynamically using the SDN controller. The SDN controller is programmed to not allow any traffic to flow unless it has been programmed to do so by the SBC for the network interfaces that the SBC is controlling. The SBC is then able to provide media micro flow services to the devices under its control using the SDN switches for example as described in method 2000. In this way the SDN network is able to provide media services to devices in enterprise networks which are not part of the SDN network but are under the control of the SBC. In some embodiments, the SBC is a signaling SBC with a block of allocated/assigned IP addresses and ports and in some embodiments MAC addresses which are used for providing media micro flow services but for which no actual media hardware interface exists on the signaling SBC and which are not used for receiving or sending media packets to or from the SBC but which are used to program SDN switches to provide media micro flow services. In some embodiments, the SBC is a signaling SBC which is instantiated on a compute node in a cloud system such as illustrated in FIG. 19.

In some embodiments, the SBC has a number of dedicated media resource services that are used for providing media bypass services, media relay services and media interworking services for which the SBC anchors the media packet flows. The SBC has two modes of operation. In the first mode of operation, the SBC provides media services for media packet flows, e.g., media bypass services, media relay services and media interworking services, by anchoring media packet flows at the SBC and providing the service such as for example rewriting of IP addresses. When the SBC detects that that it has reached a threshold wherein the SBC no longer has sufficient dedicated resources to provide a requested media service the SBC switches to a second mode of operation wherein the SBC generates and transmits instructions to the SDN controller to control the SDN controller to install/program/configure SDN programmable switches to perform the requested media service for example in accordance with the method 2000 illustrated in FIG. 20. The SBC continues in the second mode of operation until it determines that it has sufficient media resources available to provide needed media services for new media packet flows being established. In some embodiments, the SBC makes the determination as to whether to operate in the first or second mode of operation to provide a media service for a media packet flow when the media packet flow is being established and the media resources required are known. In this two mode SBC embodiment, existing SBCs with dedicated media resources can be updated to provide additional media services and handle additional media packet flows without having to add additional dedicated hardware to the SBC.

In the second mode of operation, the media packets of media packet flow do not pass through the SBC. It should also be noted that the media packets of the media packet flow do not pass through the SDN controller in either the first or second modes of operation.

In various embodiments, the SBC is a signaling SBC (S-SBC). In some such embodiments, the SBC and the SDN controller communicate using a Representation State Protocol (REST) or a proprietary protocol. In some embodiments, said SDN controller and said first programmable switch communicate using Open Flow protocol, e.g., when said first programmable switch is an OpenFlow switch.

Figure 21:
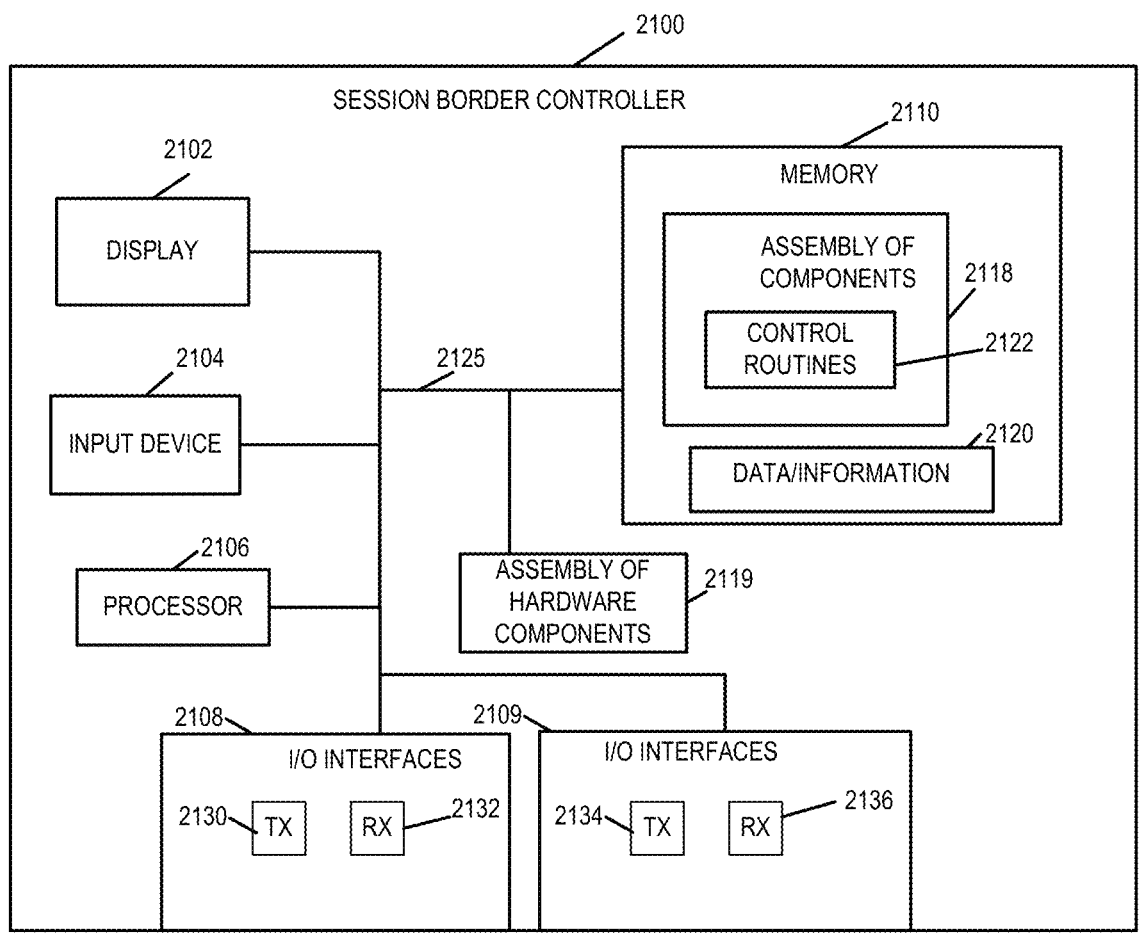
FIG. 21 illustrates an exemplary SBC in accordance with an embodiment of the present invention.

FIG. 21 illustrates an exemplary embodiment of a Session Border Controller (SBC) 2100 in accordance with one embodiment of the present invention. Exemplary session border controller 2100 includes an optional display 2102, an input device 2104, a processor 2106, e.g., a CPU, input/output (I/O) interfaces 2108 and 2109, which couple the SBC 2100 to other device in the SDN network and system 100 such as for example SDN controller 112, and the SDN switches 106, 108, 100, memory 2110, and an assembly of hardware components 2119, e.g., circuits corresponding to different components or modules, coupled together via a bus 2125 over which the various elements may interchange data and information. Memory 2110 includes an assembly of components 2118, e.g., an assembly of software components, and data/information 2120. The assembly of components 2118 includes a control routines component 2122 which when processed and executed by the processor 2106 controls the operation of the SBC 2100 to perform various functions and/or one or more steps of the various method embodiments of the invention. The I/O interfaces 2108 include transmitters 2130 and receivers 2132. The I/O interfaces 2109 include transmitters 2134 and receivers 2136. The I/O Interfaces include hardware transmitters and receivers. The SBC 2100 is also configured to have a plurality of Internet Protocol (IP) address/port number pairs, e.g., logical IP address/port pairs, for use in exchanging signaling information, e.g., SIP signaling messages for establishing media sessions, and in some embodiments, media, e.g., Real-time Protocol Packets of a media session. In some embodiments, a single public IP address/port pair is used for all signaling, e.g., SIP signaling relating to establishing sessions.

The I/O interfaces in some embodiments are configured to communicate in accordance with the Internet Protocol (IP), Transport Control Protocol (TCP), User Datagram Protocol (UDP), Session Initiation Protocol (SIP), Session Description Protocol (SDP), Openflow protocol and/or one or more proprietary signaling protocols. In some embodiments, the SBC 2100 includes a communication component configured to operate using one or more IP, TCP, UDP, SIP, SDP, SDN Openflow and/or proprietary protocol methods. The SBC communicates with the SDN Controller in some embodiments using a protocol that is not bounded. In some embodiments, the communication component is a hardware module, a software module or a module including hardware and software components. In some embodiments, the SBC 134 and SBC 1510 are implemented in accordance with SBC 2100 of FIG. 21. In some embodiments, the SBC 2100 is implemented as a virtual machine operating on a computing device in the cloud.

Figure 22:
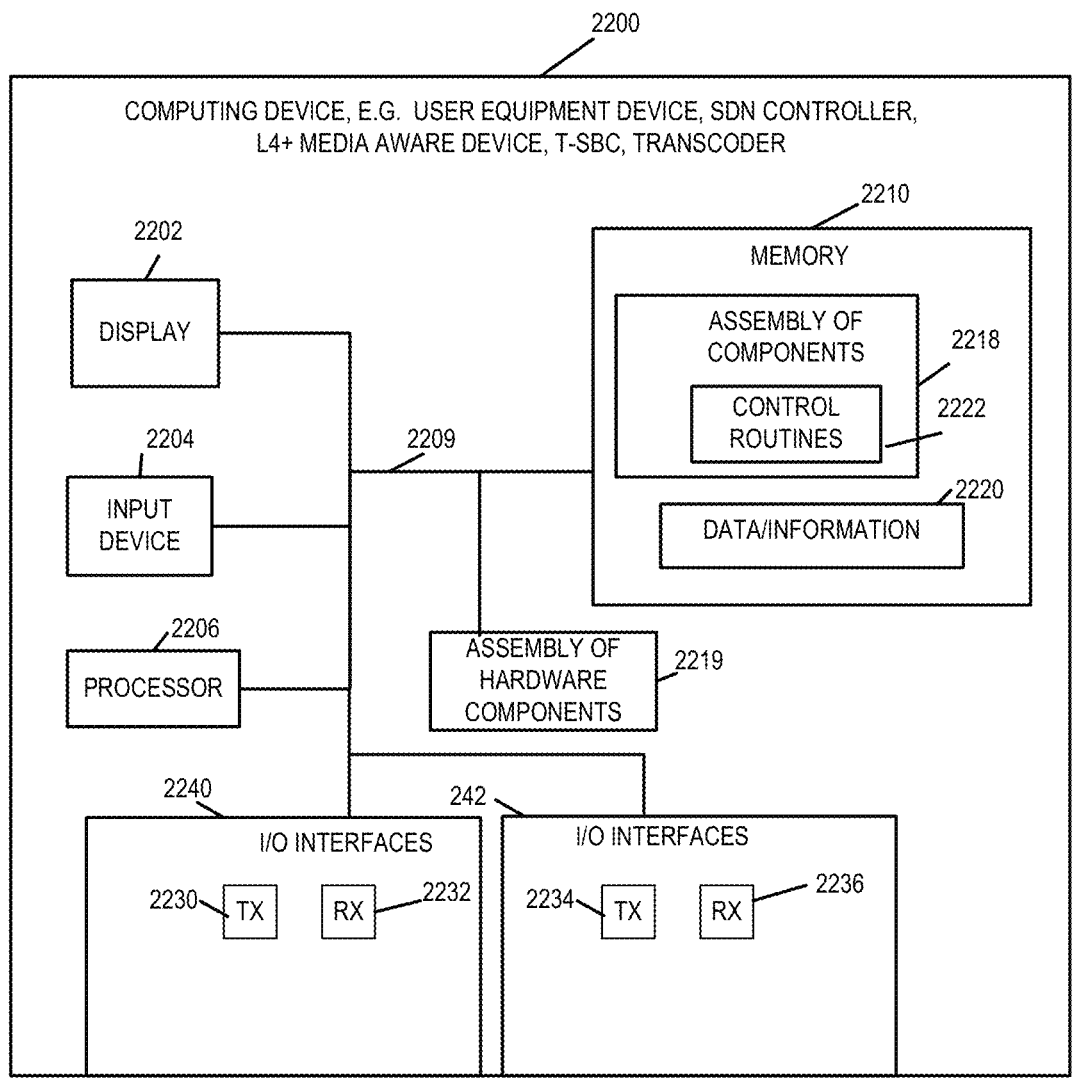
FIG. 22 illustrates an exemplary computing device in accordance with an embodiment of the present invention.

FIG. 22 illustrates an exemplary embodiment of a computing device that may be, and in some embodiments is, used to implement devices of various systems described in the Figures including devices in system 100 of FIG. 1, system 600 of FIG. 6, system 1500 of FIG. 15, system 1600 of FIG. 16, system 1700 of FIG. 17, system 1800 of FIG. 18, e.g., a communications device or user equipment device (e.g., a User Equipment (UE) device such as for example, a computer or smartphone), a SDN controller, or a media aware device, media interworking device, transcoder, or T-SBC (e.g., media interworking device 1550) in accordance with one embodiment of the present invention. Exemplary computing device 2200 includes a display 2202, an input device 2204, a processor 2206, e.g., a CPU, input/output (I/O) interfaces 2240 and 2242, which couple the computing device to the SDN network 2202 or various other networks or devices including e.g. programmable communications switches 106, 108, and 110, memory 2210, and an assembly of components 2219, e.g., circuits corresponding to different components, coupled together via a bus 2209 over which the various elements may interchange data and information. Memory 2210 includes an assembly of components 2218, e.g., an assembly of software components, and data/information 2220. The assembly of software components 2218 includes a control routines component 2222 which when processed and executed by the processor 2206 controls the operation of the computing device 2200 to perform various functions and/or one or more steps of the various method embodiments of the invention. The I/O interface 2240 includes transmitters 2230 and receivers 2232. The I/O interface 2242 includes transmitters 2234 and receivers 2236. The I/O Interfaces include hardware transmitters and receivers. The computing device is also configured to have a plurality of Internet Protocol (IP) address/port number pairs, e.g., logical IP address/port pairs, for use in exchanging signaling information, e.g., SIP signaling messages for establishing media sessions, and media, e.g., Real-time Protocol Packets of a media session. In some embodiments the I/O interfaces include IP address/port pairs. The I/O Interfaces are hardware interfaces. The I/O interfaces in some embodiments are configured to communicate in accordance with the Internet Protocol, Transport Control Protocol (TCP), User Datagram Protocol (UDP), Session Initiation Protocol (SIP), Session Description Protocol (SDP), SDN control protocol (e.g., OpenFlow protocol) and/or other communications protocols. In some embodiments, the computing device 200 includes a communication component configured to operate using SDN, IP, TCP, UDP, SDP, and/or SIP protocol signaling methods. In some embodiments, the communication component is a hardware component, a software component or a component including hardware and software components. In some embodiments, the endpoint 1 multimedia device 1 160 and endpoint 2 multimedia device 2 162 of FIG. 1 and user equipment devices of FIGS. 6-10, 15-19 are user equipment devices implemented in accordance with computing device 2200 of FIG. 22. In some embodiments, the SDN controller 112 of FIG. 1 and SDN controller 1508 of FIGS. 15, 16, 17 and 18 is implemented in accordance with the computing device 2200 illustrated in FIG. 22. In some such embodiments the communication protocol used to communicate between the SDN controller 112 or SDN controller 1508 and various devices such as the SBC 134 or SBC 1510 is based on extending a representational state transfer Application Programming Interface (REST API) provided by the SDN Controller to the device, e.g., SBC. The SDN controller uses OpenFlow protocol or another SDN protocol to dynamically program flows in the SDN switches of the SDN network of system 100 or the system 1600, 1700, 1800 or 1900. In some embodiments, the display 2202 is optional. In some embodiments, the L4+ media aware device also referred to as media interworking device 107 of FIG. 1, 650 of FIG. 6 and 1550 of FIGS. 15, 16, 17 and 18 is implemented in accordance with the computing device 2200 illustrated in FIG. 22.

Set forth below are various exemplary numbered embodiments. Each set of numbered exemplary embodiments is numbered by itself with embodiments in a set referring to previous numbered embodiments in the same set.

List of Exemplary Numbered Method Embodiments:

Method Embodiment 1. A method of operating a session border controller in a software defined network, said method comprising: receiving, by the session border controller, first signaling information for establishing a first media session, said first media session including a first media packet flow that passes through a first network programmable switch of the software defined network; generating, by the session border controller, instructions to implement a media micro flow service on the first programmable switch of the software defined network through which the first media packet flow passes; sending, from the session border controller, said instructions to a software defined network (SDN) controller which controls said first network programmable switch.

Method Embodiment 2. The method of method embodiment 1, wherein said signaling information includes signaling packets for establishing the first media packet flow.

Method Embodiment 3. The method of method embodiment 1 further comprising: establishing said first media session between a media flow origination device and a media flow destination device, said first signaling information being SDP offer and answer messages exchanged between a flow origination device and a flow destination device as part of establishing said first media session.

Method Embodiment 4. The method of method embodiment 2, wherein said signaling packets include session initiation protocol (SIP) messages.

Method Embodiment 5. The method of method embodiment 4, wherein said SIP messages include a SIP Invite message including a session description protocol offer message received from a first device included in a first enterprise/device/peering network, said first enterprise/device/peering network being in a trusted relationship with said session border controller.

Method Embodiment 6. The method of method embodiment 5, wherein said SIP messages include a session description protocol answer message included in a SIP provisional response message or final SIP 200 OK message received from a second device included in a second enterprise network, said second enterprise network being in a trusted relationship with said session border controller.

Method Embodiment 7. The method of method embodiment 1, wherein said session border controller does not have knowledge of the first programmable network switch through which packets of the first media packet flow will pass.

Method Embodiment 8. The method of method embodiment 7, wherein said session border controller does not select the programmable network switch through which the first media packet flow will pass.

Method Embodiment 9. The method of method embodiment 7, wherein said instructions sent to said SDN controller control said SDN controller to select one or more programmable network switches through which the media packet flow will pass, said one or more programmable network switches including said first programmable switch.

Method Embodiment 10. The method of method embodiment 9, wherein said instructions sent to said SDN controller control said SDN controller to generate and send control information to the first programmable switch which installs the first media micro flow service on the first programmable switch.

Method Embodiment 11. The method of method embodiment 1 wherein said first media packet flow is a packet flow containing UDP or TCP media packets.

Method Embodiment 12. The method of method embodiment 1, wherein the first media packet flow is a Real-time Transport Protocol packet flow.

Method Embodiment 13. The method of method embodiment 1, wherein said first programmable switch operates using one of the following protocols OpenFlow protocol, OVSDB protocol, OPFlex protocol, or NETCONF protocol.

Method Embodiment 14. The method of method embodiment 1, wherein said first programmable switch is one of the following: an OpenFlow programmable switch, an OVSDB programmable switch, a NETCONF switch, a Cisco ASIC programmable switch or an OPFlex programmable switch.

Method Embodiment 15. The method of method embodiment 1 further comprising: determining, by the session border controller, what type of media packet flow is to be established based on the received first signaling information prior to generating said instructions to implement said first media micro flow service on the first programmable switch of the software defined network through which the packets of the first media packet flow passes.

Method Embodiment 16. The method of method embodiment 15 wherein said type of media packet flow is one of the following: (i) a type-1 media packet flow, (ii) a type-2 media packet flow, or (iii) a type-3 media packet flow, said type-1 media packet flow being a media packet flow with either data link layer connectivity or network layer connectivity between a flow origination device and a flow destination device, said type-2 media packet flow being a media packet flow that requires a media relay service to provide network layer connectivity between said flow origination device and said flow destination device, and said type-3 media packet flow being a media packet flow that requires a media interworking service to provide network layer connectivity and perform media interworking between said flow origination device and said flow destination device.

Method Embodiment 17. The method of method embodiment 16 wherein the received signaling information upon which the session border controller determines what type of media packet flow is to be established includes signaling information contained in or derived from an SDP offer message received by the SBC from the flow origination device and an SDP answer message received by the SBC from the flow destination device, said first media packet flow originating at the flow origination device and terminating at the flow destination device.

Method Embodiment 18. The method of method embodiment 17 wherein said signaling information contained in or derived from said SDP offer message and said SDP answer message used in determining the type of flow includes: (i) a source transport number, (ii) a source IP address, (iii) a destination transport number, (iv) a destination IP address, and (v) a protocol type to be used for sending media packets of the first media packet flow from the flow origination device to the flow destination device.

Method Embodiment 19. The method of method embodiment 17 wherein said signaling information contained in said SDP offer message and said SDP answer message used in determining the type of flow includes trunk information that identifies an Internet Protocol interface and VLAN tag being used for the media flow.

Method Embodiment 20. The method of method embodiment 18 or 19 wherein said signaling information contained in said SDP offer message and said SDP answer message used in determining the type of flow further includes the codecs or bandwidth modifier to apply to the media flow negotiated to be used by the flow origination device and the flow destination device for the first media packet flow.

Method Embodiment 21. The method of method embodiment 18 further comprising: accessing, by the SBC, network topology information about connectivity between said flow origination device and said flow destination device; and wherein said determining, by the session border controller, what type of media packet flow is to be established is further based on said accessed network topology information.

Method Embodiment 22. The method of method embodiment 21 wherein said flow origination device is connected to a first network and said flow destination device is connected to a second network, said first and second network being different from each other and from said SDN network.

Method Embodiment 23. The method of method embodiment 22 wherein said network topology information is information about the network topology of the first network and the second network.

Method Embodiment 24. The method of method embodiment 23 wherein said network topology information is stored in memory included in the SBC or a storage device to which the SBC is coupled, said network topology information being provided by said first and second network operators or by said SDN network controller.

Method Embodiment 25. The method of method embodiment 24 further comprising: discovering by said SDN network controller the topology of networks connected to the SDN networks including said first network and said second network.

Method Embodiment 26. The method of method embodiment 16 wherein:

when said session border controller determines that the first media packet flow to be established is a type-1 media packet flow with data link layer connectivity between said flow origination device and said flow destination device, said generating said instructions to implement said media micro flow service includes generating instructions to implement a media bypass service as part of the media micro flow service.

Method Embodiment 27. The method of method embodiment 26, wherein said media bypass service is a service that does not re-write any of: (i) a source transport number, (ii) a source Internet Protocol (IP) address, (iii) a source Media Access Control (MAC) address, (iv) a destination transport number, (v) a destination Internet Protocol (IP) address, or (vi) Virtual Local Area Network (vlan) tag of any media packets received by the first programmable switch and identified by the first programmable switch as being part of said first media packet flow.

Method Embodiment 28. The method of method embodiment 27 wherein said instructions include information (e.g., 5-Tuple—Source transport number, Source IP address, transport protocol, Destination transport number, Destination IP address) identifying packets of the first media packet flow.

Method Embodiment 29. The method of method embodiment 28 wherein said information identifying packets of the first media packet flow include a source transport number, a source IP address, a transport protocol, a destination transport number, and a destination IP address which will be included in a packet header of packets of the first media packet flow.

Method Embodiment 30. The method of method embodiment 16 wherein: when said session border controller determines that the first media packet flow to be established is a type-1 media packet flow with network layer connectivity between said flow origination device and said flow destination device, said generating said instructions to implement said media micro flow service includes generating instructions to implement a media bypass service as part of the media micro flow service.

Method Embodiment 31. The method of method embodiment 30, wherein said instructions include a matching criteria and an action to be taken when a received packet includes header information that matches said matching criteria.

Method Embodiment 32. The method of method embodiment 31, wherein the matching criteria and the action to be taken are included in a table flow entry installed by the SDN controller in the first programmable switch.

Method Embodiment 33. The method of method embodiment 30, wherein said media bypass service is a service that re-writes a source MAC address and a destination MAC address of media packets received by the first programmable switch and identified by the first programmable switch as being part of said first media packet flow.

Method Embodiment 34. The method of method embodiment 33, wherein said source MAC address is rewritten to be a MAC address corresponding to the SBC and the destination MAC address is rewritten to be a MAC address corresponding to said destination device.

Method Embodiment 35. The method of method embodiment 34, wherein said media bypass service is a service that does not re-write any of: (i) a source transport number, (ii) a source Internet Protocol (IP) address, (iii) a source Media Access Control (MAC) address, (iv) a destination transport number, (v) a destination Internet Protocol (IP) address, or (vi) a destination Media Access Control (MAC) address of any media packets received by the first programmable switch and identified by the first programmable switch as being part of said first media packet flow.

Method Embodiment 36. The method of method embodiment 16, wherein: when said session border controller determines that the first media packet flow to be established is a type-2 media packet flow, said generating said instructions to implement said media micro flow service includes generating instructions to implement a media relay service as part of the media micro flow service.

Method Embodiment 37. The method of method embodiment 36, wherein said media relay service is a service that provides Network Address and Port Number Translation services.

Method Embodiment 38. The method of method embodiment 3, wherein said media relay service is a service that re-writes a source transport number, a source IP address, a source MAC address, a destination transport number, a destination IP address and a destination MAC address of media packets received by the first programmable switch and identified by the first programmable switch as being part of said first media packet flow.

Method Embodiment 39. The method of method embodiment 36, wherein said media relay service is a service that also re-writes a virtual local area network tag (VLAN tag) when the SBC determines that the flow origination device and the flow destination device are located in different virtual area networks.

Method Embodiment 40. The method of method embodiment 16, wherein: when said session border controller determines that the first media packet flow to be established is a type-3 media packet flow, said generating said instructions to implement said media micro flow service includes generating instructions to implement a media interworking service as part of the media micro flow service.

Method Embodiment 41. The method of method embodiment 40, wherein said media interworking service is a service that re-writes a source transport number, a source IP address, a source MAC address, a destination transport number, a destination IP address and a destination MAC address of media packets received by the first programmable switch and identified by the first programmable switch as being part of said first media packet flow to redirect the received media packets of the first media packet flow to a media interworking device.

Method Embodiment 42. The method of method embodiment 41, wherein said media packets of the first media packet flow are Real-time Transport Protocol packets containing audio data and wherein said media interworking device is a device that performs audio transcoding of audio data contained in packets of the first media packet flow received by the media interworking device from said first programmable switch.

Method Embodiment 43. The method of method embodiment 42, wherein said SBC is the media interworking device.

Method Embodiment 44. The method of method embodiment 1 wherein said SBC is a signaling SBC.

Method Embodiment 45. The method of method embodiment 44 wherein said signaling SBC is a software application instantiated on a compute node in a cloud network.

Method Embodiment 46. The method of method embodiment 1 wherein said SBC does not anchor the first media packet flow.

Method Embodiment 47. The method of method embodiment 1 wherein packets of the first media packet flow are not received by the SBC but signaling packets corresponding to the first media packet flow are received by the SBC.

Method Embodiment 48. The method of method embodiment 47 wherein packets of the first media packet flow are not received by the SDN controller.

Method Embodiment 49. The method of method embodiment 47 wherein said SDN controller does not receive session initiation signals for the session of which the first media packet flow is a part.

Method Embodiment 50. The method of method embodiment 1, wherein the first media packet flow is a Real-time Transport Protocol (RTP) packet flow; and wherein said step of generating, by the session border controller, instructions to implement the media micro flow service includes generating instructions to implement one or more of the following actions: (i) bandwidth policing of packets received by the first programmable switch and identified as belonging to the first media packet flow, (ii) detection of RTP packet flow inactivity of the first media packet flow by the first programmable switch; (iii) rogue media detection of packets received by the first programmable switch having an SBC media interface address and UDP port range but for which no media flow exists, (iv) forking of received packets identified as belonging to the first media packet flow to a recordation device by the first programmable switch, and (v) performing DSCP marking or pass-through for received packets identified as belonging to the first media packet flow.

Method Embodiment 51. The method of method embodiment 50, wherein said instructions include identifying information by which the first programmable switch can identify packets on which the one or more actions are to be implemented.

Method Embodiment 52. The method of method embodiment 51, wherein said identifying information is a matching criteria, said matching criteria for use by the first programmable switch to identify which received packets belong to the first media packet flow.

Method Embodiment 53. The method of method embodiment 52, wherein said matching criteria includes packet source identification information, packet destination identification information and a protocol type.

Method Embodiment 54. The method of method embodiment 53, wherein said packet source identification information includes a source IP address, a source transport number, and a source MAC address; wherein said packet destination identification information includes a destination IP address, a destination transport number, and a destination MAC address.

Method Embodiment 55. A communications method including: operating a session border controller (SBC) in a software defined network to receive first signaling information for establishing a first media session, said first media session including a first media packet flow that passes through a first network programmable switch of the software defined network; operating the SBC to generate instructions to implement a media micro flow service on the first programmable switch of the software defined network through which the first media packet flow passes; operating the SBC to send said instructions to a software defined network (SDN) controller which controls said first network programmable switch; operating the SDN controller to receive the instructions for the media micro flow service from the SBC; operating the SDN controller to identify one or more SDN programmable switches on which to install the instructions for the media micro flow service; operating the SDN controller to install the instructions for the media micro flow service on one or more of the identified SDN programmable switches.

Method Embodiment 56. The method of method embodiment 55 further comprising: operating the SDN controller to determine whether the identified SDN switches have the capacity to implement the media micro flow service; and when said SDN controller determines that the identified SDN switches do not have the capacity to implement the media micro flow services dynamically reconfiguring the SDN network.

Method Embodiment 57. The communications method of method embodiment 55 further comprising installing a session border controller (SBC) into a pre-existing software defined network (SDN) that does not include a SBC prior to operating the SBC to receive first signaling information for establishing a first media session, said first media session including a first media packet flow that passes through a first network programmable switch of the software defined network.

Method Embodiment 58. The communications method of method embodiment 55 wherein said SBC has a first mode of operation and a second mode of operation and said SBC has a number of dedicated media resources that are used for providing media bypass services, media relay services and media interworking services for media packet flows which are anchored at the SBC, the method further comprising: operating the SBC to receive second signaling information for establishing a second media session, said second media session including a second media packet flow that passes through a second network programmable switch of the software defined network; operating the SBC to determine a type of media micro flow service that is to be provided to the second media packet flow, said type of media micro flow service being a media bypass service, a media relay service or a media interworking service; operating the SBC to determine if the SBC has sufficient dedicated media resources to provide the second media micro flow service; and when said SBC has sufficient media resources operating the SBC in said first mode of operation; and when said SBC does not have sufficient media resources operating the SBC in said second mode of operation.

Method Embodiment 59. The method of method embodiment 58 wherein said first mode of operation includes operating the SBC to anchor said second media packet flow and provide a media micro flow service to said second media packet flow.

Method Embodiment 60. The method of method embodiment 58 wherein said second mode of operation includes operating the SBC to: i) generate instructions to implement a media micro flow service on the second programmable switch of the software defined network through which the second media packet flow passes; and ii) send said instructions to the software defined network (SDN) controller which controls said second network programmable switch.

List of Exemplary Numbered Apparatus Embodiments:

Apparatus Embodiment 1. A session border controller (SBC) comprising: one or more processors configured to control the SBC to: receive first signaling information for establishing a first media session, said first media session including a first media packet flow that passes through a first network programmable switch of the software defined network; generate instructions to implement a media micro flow service on the first programmable switch of the software defined network through which the first media packet flow passes; send said instructions to a software defined network (SDN) controller which controls said first network programmable switch.

Apparatus Embodiment 2. The session border controller of apparatus embodiment 1, wherein said signaling information includes signaling packets for establishing the first media packet flow.

Apparatus Embodiment 3. The session border controller of apparatus embodiment 1 wherein said one or more processors are further configured to control said SBC to: establish said first media session between a media flow origination device and a media flow destination device, said first signaling information being SDP offer and answer messages exchanged between a flow origination device and a flow destination device as part of establishing said first media session.

Apparatus Embodiment 4. The session border controller of apparatus embodiment 2, wherein said signaling packets include session initiation protocol (SIP) messages.

Apparatus Embodiment 5. The session border controller of apparatus embodiment 4, wherein said SIP messages include a SIP Invite message including a session description protocol offer message received from a first device included in a first enterprise/device/peering network, said first enterprise/device/peering network being in a trusted relationship with said session border controller.

Apparatus Embodiment 6. The session border controller of apparatus embodiment 5, wherein said SIP messages include a session description protocol answer message included in a SIP provisional response message or final SIP 200 OK message received from a second device included in a second enterprise network, said second enterprise network being in a trusted relationship with said session border controller.

Apparatus Embodiment 7. The session border controller of apparatus embodiment 1, wherein said session border controller does not have knowledge of the first programmable network switch through which packets of the first media packet flow will pass.

Apparatus Embodiment 8. The session border controller of apparatus embodiment 7, wherein said session border controller does not select the programmable network switch through which the first media packet flow will pass.

Apparatus Embodiment 9. The session border controller of apparatus embodiment 7, wherein said instructions sent to said SDN controller control said SDN controller to select one or more programmable network switches through which the media packet flow will pass, said one or more programmable network switches including said first programmable switch.

Apparatus Embodiment 10. The session border controller of apparatus embodiment 9, wherein said instructions sent to said SDN controller control said SDN controller to generate and send control information to the first programmable switch which installs the first media micro flow service on the first programmable switch.

Apparatus Embodiment 11. The session border controller of apparatus embodiment 1 wherein said first media packet flow is a packet flow containing UDP or TCP media packets.

Apparatus Embodiment 12. The session border controller of apparatus embodiment 1, wherein the first media packet flow is a Real-time Transport Protocol packet flow.

Apparatus Embodiment 13. The session border controller of apparatus embodiment 1, wherein said first programmable switch operates using one of the following protocols OpenFlow protocol, OVSDB protocol, OPFlex protocol, or NETCONF protocol.

Apparatus Embodiment 14. The session border conroller of apparatus embodiment 1, wherein said first programmable switch is one of the following: an OpenFlow programmable switch, an OVSDB programmable switch, a NETCONF switch, a Cisco ASIC programmable switch or an OPFlex programmable switch.

Apparatus Embodiment 15. The session border controller of apparatus embodiment 1 wherein said one or more processors are further configured to control said session border controller to: determine what type of media packet flow is to be established based on the received first signaling information prior to generating said instructions to implement said first media micro flow service on the first programmable switch of the software defined network through which the packets of the first media packet flow passes.

Apparatus Embodiment 16. The session border controller of apparatus embodiment 15 wherein said type of media packet flow is one of the following: (i) a type-1 media packet flow, (ii) a type-2 media packet flow, or (iii) a type-3 media packet flow, said type-1 media packet flow being a media packet flow with either data link layer connectivity or network layer connectivity between a flow origination device and a flow destination device, said type-2 media packet flow being a media packet flow that requires a media relay service to provide network layer connectivity between said flow origination device and said flow destination device, and said type-3 media packet flow being a media packet flow that requires a media interworking service to provide network layer connectivity and perform media interworking between said flow origination device and said flow destination device.

Apparatus Embodiment 17. The session border controller of apparatus embodiment 16 wherein the received signaling information upon which the session border controller determines what type of media packet flow is to be established includes signaling information contained in or derived from an SDP offer message received by the SBC from the flow origination device and an SDP answer message received by the SBC from the flow destination device, said first media packet flow originating at the flow origination device and terminating at the flow destination device.

Apparatus Embodiment 18. The session border controller of apparatus embodiment 17 wherein said signaling information contained in or derived from said SDP offer message and said SDP answer message used in determining the type of flow includes: (i) a source transport number, (ii) a source IP address, (iii) a destination transport number, (iv) a destination IP address, and (v) a protocol type to be used for sending media packets of the first media packet flow from the flow origination device to the flow destination device.

Apparatus Embodiment 19. The session border controller of apparatus embodiment 17 wherein said signaling information contained in said SDP offer message and said SDP answer message used in determining the type of flow includes trunk information that identifies an Internet Protocol interface and VLAN tag being used for the media flow.

Apparatus Embodiment 20. The session border controller of apparatus embodiment 18 or 19 wherein said signaling information contained in said SDP offer message and said SDP answer message used in determining the type of flow further includes the codecs or bandwidth modifier to apply to the media flow negotiated to be used by the flow origination device and the flow destination device for the first media packet flow.

Apparatus Embodiment 21. The session border controller of apparatus embodiment 18 wherein said one or more processors is further configured to control said session border controller to: access network topology information about connectivity between said flow origination device and said flow destination device; and wherein said to determine what type of media packet flow is to be established is further based on said accessed network topology information.

Apparatus Embodiment 22. The session border controller of apparatus embodiment 21 wherein said flow origination device is connected to a first network and said flow destination device is connected to a second network, said first and second network being different from each other and from said SDN network.

Apparatus Embodiment 23. The session border controller of apparatus embodiment 22 wherein said network topology information is information about the network topology of the first network and the second network.

Apparatus Embodiment 24. The session border controller of apparatus embodiment 23 wherein said network topology information is stored in memory included in the SBC or a storage device to which the SBC is coupled, said network topology information being provided by said first and second network operators or by said SDN network controller.

Apparatus Embodiment 25. The session border controller of apparatus embodiment 24 further comprising: discovering by said SDN network controller the topology of networks connected to the SDN networks including said first network and said second network.

Apparatus Embodiment 26. The session border controller of apparatus embodiment 16 wherein: when said session border controller determines that the first media packet flow to be established is a type-1 media packet flow with data link layer connectivity between said flow origination device and said flow destination device, said generating said instructions to implement said media micro flow service includes generating instructions to implement a media bypass service as part of the media micro flow service.

Apparatus Embodiment 27. The session border controller of apparatus embodiment 26, wherein said media bypass service is a service that does not re-write any of: (i) a source transport number, (ii) a source Internet Protocol (IP) address, (iii) a source Media Access Control (MAC) address, (iv) a destination transport number, (v) a destination Internet Protocol (IP) address, or (vi) Virtual Local Area Network (vlan) tag of any media packets received by the first programmable switch and identified by the first programmable switch as being part of said first media packet flow.

Apparatus Embodiment 28. The session border controller of apparatus embodiment 27 wherein said instructions include information (e.g., 5-Tuple—Source transport number, Source IP address, transport protocol, Destination transport number, Destination IP address) identifying packets of the first media packet flow.

Apparatus Embodiment 29. The session border controller of apparatus embodiment 28 wherein said information identifying packets of the first media packet flow include a source transport number, a source IP address, a transport protocol, a destination transport number, and a destination IP address which will be included in a packet header of packets of the first media packet flow.

Apparatus Embodiment 30. The session border controller of apparatus embodiment 16 wherein: when said session border controller determines that the first media packet flow to be established is a type-1 media packet flow with network layer connectivity between said flow origination device and said flow destination device, said generating said instructions to implement said media micro flow service includes generating instructions to implement a media bypass service as part of the media micro flow service.

Apparatus Embodiment 31. The session border controller of apparatus embodiment 30, wherein said instructions include a matching criteria and an action to be taken when a received packet includes header information that matches said matching criteria.

Apparatus Embodiment 32. The session border controller of apparatus embodiment 31, wherein the matching criteria and the action to be taken are included in a table flow entry installed by the SDN controller in the first programmable switch.

Apparatus Embodiment 33. The session border controller of apparatus embodiment 30, wherein said media bypass service is a service that re-writes a source MAC address and a destination MAC address of media packets received by the first programmable switch and identified by the first programmable switch as being part of said first media packet flow.

Apparatus Embodiment 34. The session border controller of apparatus embodiment 33, wherein said source MAC address is rewritten to be a MAC address corresponding to the SBC and the destination MAC address is rewritten to be a MAC address corresponding to said destination device.

Apparatus Embodiment 35. The session border controller of apparatus embodiment 34, wherein said media bypass service is a service that does not re-write any of: (i) a source transport number, (ii) a source Internet Protocol (IP) address, (iii) a source Media Access Control (MAC) address, (iv) a destination transport number, (v) a destination Internet Protocol (IP) address, or (vi) a destination Media Access Control (MAC) address of any media packets received by the first programmable switch and identified by the first programmable switch as being part of said first media packet flow.

Apparatus Embodiment 36. The session border controller of apparatus embodiment 16, wherein: when said session border controller determines that the first media packet flow to be established is a type-2 media packet flow, said generating said instructions to implement said media micro flow service includes generating instructions to implement a media relay service as part of the media micro flow service.

Apparatus Embodiment 37. The session border controller of apparatus embodiment 36, wherein said media relay service is a service that provides Network Address and Port Number Translation services.

Apparatus Embodiment 38. The session border controller of apparatus embodiment 36, wherein said media relay service is a service that re-writes a source transport number, a source IP address, a source MAC address, a destination transport number, a destination IP address and a destination MAC address of media packets received by the first programmable switch and identified by the first programmable switch as being part of said first media packet flow.

Apparatus Embodiment 39. The session border controller of apparatus embodiment 36, wherein said media relay service is a service that also re-writes a virtual local area network tag (VLAN tag) when the SBC determines that the flow origination device and the flow destination device are located in different virtual area networks.

Apparatus Embodiment 40. The session border controller of apparatus embodiment 16, wherein: when said session border controller determines that the first media packet flow to be established is a type-3 media packet flow, said generating said instructions to implement said media micro flow service includes generating instructions to implement a media interworking service as part of the media micro flow service.

Apparatus Embodiment 41. The session border controller of apparatus embodiment 40, wherein said media interworking service is a service that re-writes a source transport number, a source IP address, a source MAC address, a destination transport number, a destination IP address and a destination MAC address of media packets received by the first programmable switch and identified by the first programmable switch as being part of said first media packet flow to redirect the received media packets of the first media packet flow to a media interworking device.

Apparatus Embodiment 42. The session border controller of apparatus embodiment 41, wherein said media packets of the first media packet flow are Real-time Transport Protocol packets containing audio data and wherein said media interworking device is a device that performs audio transcoding of audio data contained in packets of the first media packet flow received by the media interworking device from said first programmable switch.

Apparatus Embodiment 43. The session border controller of apparatus embodiment 42, wherein said SBC is the media interworking device, said one or more processors further configured to control the SBC to perform audio transcoding of audio data contained in packets of the first media packet flow.

Apparatus Embodiment 44. The session border controller of apparatus embodiment 1 wherein said SBC is a signaling SBC.

Apparatus Embodiment 45. The session border controller of apparatus embodiment 44 wherein said signaling SBC is a software application instantiated on a compute node in a cloud network.

Apparatus Embodiment 46. The session border controller of apparatus embodiment 1 wherein said SBC does not anchor the first media packet flow.

Apparatus Embodiment 47. The session border controller of apparatus embodiment 1 wherein packets of the first media packet flow are not received by the SBC but signaling packets corresponding to the first media packet flow are received by the SBC.

Apparatus Embodiment 48. The session border controller of apparatus embodiment 47 wherein packets of the first media packet flow are not received by the SDN controller.

Apparatus Embodiment 49. The session border controller of apparatus embodiment 47 wherein said SDN controller does not receive session initiation signals for the session of which the first media packet flow is a part.

Apparatus Embodiment 50. The session border controller of apparatus embodiment 1, wherein the first media packet flow is a Real-time Transport Protocol (RTP) packet flow; and wherein said to generate instructions to implement the media micro flow service includes generating instructions to implement one or more of the following actions: (i) bandwidth policing of packets received by the first programmable switch and identified as belonging to the first media packet flow, (ii) detection of RTP packet flow inactivity of the first media packet flow by the first programmable switch; (iii) rogue media detection of packets received by the first programmable switch having an SBC media interface address and UDP port range but for which no media flow exists, (iv) forking of received packets identified as belonging to the first media packet flow to a recordation device by the first programmable switch, and (v) performing DSCP marking or pass-through for received packets identified as belonging to the first media packet flow.

Apparatus Embodiment 51. The session border controller of apparatus embodiment 50, wherein said instructions include identifying information by which the first programmable switch can identify packets on which the one or more actions are to be implemented.

Apparatus Embodiment 52. The session border controller of apparatus embodiment 51, wherein said identifying information is a matching criteria, said matching criteria for use by the first programmable switch to identify which received packets belong to the first media packet flow.

Apparatus Embodiment 53. The session border controller of apparatus embodiment 51, wherein said matching criteria includes packet source identification information, packet destination identification information and a protocol type.

Apparatus Embodiment 54. The session border controller of apparatus embodiment 52, wherein said packet source identification information includes a source IP address, a source transport number, and a source MAC address; wherein said packet destination identification information includes a destination IP address, a destination transport number, and a destination MAC address.

List of Exemplary Numbered System Embodiments:

System Embodiment 1. A communications system including: a session border controller (SBC) in a software defined network that includes a first processor, said first processor configured to control the session border controller to: i) receive first signaling information for establishing a first media session, said first media session including a first media packet flow that passes through a first network programmable switch of the software defined network, ii) generate instructions to implement a media micro flow service on the first programmable switch of the software defined network through which the first media packet flow passes, and iii) send said instructions to a software defined network (SDN) controller which controls said first network programmable switch, the SDN controller including a second processor configured to control the SND controller to: i) receive the instructions for the media micro flow service from the SBC, ii) identify one or more SDN programmable switches on which to install the instructions for the media micro flow service, and iii) install the instructions for the media micro flow service on one or more of the identified SDN programmable switches.

System Embodiment 2. The communications system of system embodiment 1 wherein the second processor is further configured to control the SDN controller to: determine whether the identified SDN switches have the capacity to implement the media micro flow service; and dynamically reconfigure the SDN network when said SDN controller determines that the identified SDN switches do not have the capacity to implement the media micro flow services.

System Embodiment 3. The communications system of system embodiment 1 wherein said software defined network is a pre-existing network that has operated without a session border controller into which the session border controller (SBC) is installed.

System Embodiment 4. The communications system of system embodiment 1 wherein said SBC has a first mode of operation and a second mode of operation and said SBC has a number of dedicated media resources that are used for providing media bypass services, media relay services and media interworking services for media packet flows which are anchored at the SBC, the first processor further configured to control the session border controller to: i) receive second signaling information for establishing a second media session, said second media session including a second media packet flow that passes through a second network programmable switch of the software defined network, ii) determine a type of media micro flow service that is to be provided to the second media packet flow, said type of media micro flow service being a media bypass service, a media relay service or a media interworking service, iii) determine if the SBC has sufficient dedicated media resources to provide the second media micro flow service; and iv) when said SBC has sufficient media resources operating the SBC in said first mode of operation; and v) when said SBC does not have sufficient media resources operating the SBC in said second mode of operation.

System Embodiment 5. The communication system of system embodiment 4 wherein said first mode of operation includes operating the SBC to anchor said second media packet flow and provide a media micro flow service to said second media packet flow.

System Embodiment 6. The communication system of system embodiment 4 wherein said second mode of operation includes operating the SBC to: i) generate instructions to implement a media micro flow service on the second programmable switch of the software defined network through which the second media packet flow passes; and ii) send said instructions to the software defined network (SDN) controller which controls said second network programmable switch.

List of Exemplary Numbered Computer Readable Embodiments:

Computer Readable Medium Embodiment 1. A non-transitory computer readable medium including processor executable instructions which when executed by a processor included in a session border controller (SBC) control the session border controller to: receive first signaling information for establishing a first media session, said first media session including a first media packet flow that passes through a first network programmable switch of the software defined network; generate instructions to implement a media micro flow service on the first programmable switch of the software defined network through which the first media packet flow passes; and send said instructions to a software defined network (SDN) controller which controls said first network programmable switch.

The techniques of various embodiments may be implemented using software, hardware and/or a combination of software and hardware. Various embodiments are directed to apparatus, e.g., signaling session border controllers, controllers including SDN controllers, switches including SDN switches, telecommunications systems, network nodes and/or network equipment devices. Various embodiments are also directed to methods, e.g., method of controlling and/or operating devices, signaling session border controllers, user devices, OpenFlow switches, SDN switches, SDN controller, real-time communications entities, telecommunications systems, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., signaling session border controller, switch or controller, including a processor configured to implement one, multiple or all of the steps of one or more methods of the invention.

In some embodiments, the processor or processors, e.g., CPUs, of one or more devices, e.g., communications nodes such as session border controllers are configured to perform the steps of the methods described as being performed by the communications nodes, e.g., signaling session border controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a signaling session border controller, with a processor which includes a component corresponding to each of the steps of the various described methods performed by the device in which the processor is included. In some but not all embodiments a device, e.g., communications node such as a signaling session border controller, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a session border controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method including:
operating a Software Defined Network (SDN) controller in a software defined network to receive instructions from a first Session Border Controller (SBC) to implement a media micro flow service on a first programmable switch through which a first media packet flow will pass;
operating the SDN controller to identify one or more programmable switches on which to install the instructions for the media micro flow service; and
operating the SDN controller to install the instructions for the media micro flow service on one or more of the identified programmable switches, the one or more programmable switches on which the instructions are installed including the first programmable switch through which the first media packet flow will pass.

2. The communications method of claim 1 further comprising:
operating the SDN controller to determine whether the identified programmable switches have the capacity to implement the media micro flow service; and
when said SDN controller determines that the identified programmable switches do not have the capacity to implement the media micro flow service, dynamically reconfiguring the software defined network.

3. The communications method of claim 1 further comprising:
prior to operating the Software Defined Network (SDN) controller in the software defined network to receive instructions to implement the media micro flow service from the first Session Border Controller (SBC), installing the first SBC into the software defined network, the software defined network not including a SBC prior to installation of the first SBC.

4. The communications method of claim 1,
wherein said first media packet flow is one of the following: (i) a type-1 media packet flow, (ii) a type-2 media packet flow, or (iii) a type-3 media packet flow, said type-1 media packet flow being a media packet flow with either data link layer connectivity or network layer connectivity between a flow origination device and a flow destination device, said type-2 media packet flow being a media packet flow that requires a media relay service to provide network layer connectivity between said flow origination device and said flow destination device, and said type-3 media packet flow being a media packet flow that requires a media interworking service to provide network layer connectivity and perform media interworking between said flow origination device and said flow destination device.

5. The communications method of claim 4 wherein the instructions to implement the media micro flow service are based on the media packet flow type of the first media packet flow.

6. The communications method of claim 5 further comprising:
determining, by the first SBC, the media packet flow type of the first media packet flow based on information included in an SDP offer message received by the first SBC from a flow origination device, and information included in an SDP answer message received by the first SBC from a flow destination device, said SDP offer and answer messages being received during the establishment of the first media packet flow, said first media packet flow originating at the flow origination device and terminating at the flow destination device.

7. The communications method of claim 6 further comprising:
accessing, by the first SBC, network topology information about connectivity between said flow origination device and said flow destination device; and
wherein said determining, by the first SBC, the media packet flow type of the first media packet flow is further based on said accessed network topology information.

8. The communications method of claim 7, wherein said flow origination device is connected to a first network and said flow destination device is connected to a second network, said first and second network being different from each other and from said software defined network.

9. The communication method of claim 8, wherein said network topology information is information about the network topology of the first network and the second network.

10. The communications method of claim 9, wherein said network topology information is stored in memory included in the first SBC or a storage device to which the first SBC is coupled, said network topology information being provided by said first and second network operators or by said SDN network controller.

11. The communications method of claim 10 further comprising: discovering by said SDN network controller the topology of networks connected to the software defined network including said first network and said second network.

12. The communications method of claim 7, wherein when said session border controller determines that the first media packet flow to be established is a type-1 media packet flow with data link layer connectivity between said flow origination device and said flow destination device, said instructions to implement said media micro flow service including instructions to implement a media bypass service as part of the media micro flow service.

13. The communications method of claim 1,
wherein the first media packet flow is a Real-time Transport Protocol (RTP) packet flow; and
wherein said instructions include implementation of one or more of the following actions by the first programmable switch: (i) bandwidth policing of packets received by the first programmable switch and identified as belonging to the first media packet flow, (ii) detection of RTP packet flow inactivity of the first media packet flow by the first programmable switch; (iii) rogue media detection of packets received by the first programmable switch having a session border controller media interface address and User Datagram Protocol port range but for which no media flow exists, (iv) forking of received packets identified as belonging to the first media packet flow to a recordation device by the first programmable switch, and (v) performing Differentiated Services Code Point marking or pass-through for received packets identified as belonging to the first media packet flow.

14. A communications system including:
a Software Defined Network (SDN) controller in a software defined network including a first processor, said first processor operating said SDN controller to:
receive instructions from a first Session Border Controller (SBC) to implement a media micro flow service on a first programmable switch through which a first media packet flow will pass;
identify one or more SDN programmable switches on which to install the instructions for the media micro flow service; and install the instructions for the media micro flow service on one or more of the identified programmable switches, the one or more programmable switches on which the instructions are installed including the first programmable switch through which the first media packet flow will pass.

15. The communications system of claim 14, wherein said first processor further operates the SDN controller to:
determine whether the identified programmable switches have the capacity to implement the media micro flow service; and
when said SDN controller determines that the identified switches do not have the capacity to implement the media micro flow service, dynamically reconfiguring the software defined network.

16. The communications system of claim 14, wherein said first processor prior to operating the Software Defined Network (SDN) controller in the software defined network to receive instructions to implement the media micro flow service from the first Session Border Controller (SBC), operates the SDN controller to install the first session border controller (SBC) into the software defined network, the software defined network not including a SBC prior to installation of the first SBC.

17. The communications system of claim 14, wherein said first media packet flow is one of the following: (i) a type-1 media packet flow, (ii) a type-2 media packet flow, or (iii) a type-3 media packet flow, said type-1 media packet flow being a media packet flow with either data link layer connectivity or network layer connectivity between a flow origination device and a flow destination device, said type-2 media packet flow being a media packet flow that requires a media relay service to provide network layer connectivity between said flow origination device and said flow destination device, and said type-3 media packet flow being a media packet flow that requires a media interworking service to provide network layer connectivity and perform media interworking between said flow origination device and said flow destination device.

18. The communications systems of claim 17, wherein the instructions to implement the media micro flow service are based on the media packet flow type of the first media packet flow.

19. The communications system of claim 18, wherein said first processor further operates said SDN network controller to discover the topology of networks connected to the software defined network, said topology of the networks connected to the software defined network including the topology of a first network and a second network, said first network including an origination device and said second network including a destination device, said first media packet flow originating at said origination device and terminating at said destination device.

20. A non-transitory computer readable medium including processor executable instructions which when executed by a processor included in a Software Defined Network (SDN) controller control the SDN controller to:
receive instructions from a Session Border Controller (SBC) to implement a media micro flow service on a first programmable switch through which a first media packet flow will pass;
identify one or more SDN programmable switches on which to install the instructions for the media micro flow service; and
install the instructions for the media micro flow service on one or more of the identified programmable switches, the one or more programmable switches on which the instructions are installed including the first programmable switch through which the first media packet flow will pass.

* * * * *